United States Patent
Bapat et al.

(10) Patent No.: US 12,497,449 B2
(45) Date of Patent: Dec. 16, 2025

(54) METHODS OF TREATING AUTOIMMUNE DISEASES USING INTERLEUKIN-17 (IL-17) ANTAGONISTS

(71) Applicant: NOVARTIS AG, Basel (CH)

(72) Inventors: Abhijit Bapat, Mountain Lakes, NJ (US); Thomas Dumortier, Basel (CH); Meryl Mendelson, Larchmont, NY (US); Shephard Mpofu, Oberwil (CH); Luminita Pricop, New York, NY (US)

(73) Assignee: NOVARTIS AG, Basel (CH)

( * ) Notice: Subject to any disclaimer, the term of this patent is extended or adjusted under 35 U.S.C. 154(b) by 817 days.

(21) Appl. No.: 17/761,485

(22) PCT Filed: Sep. 18, 2020

(86) PCT No.: PCT/IB2020/058700
§ 371 (c)(1),
(2) Date: Mar. 17, 2022

(87) PCT Pub. No.: WO2021/053591
PCT Pub. Date: Mar. 25, 2021

(65) Prior Publication Data
US 2022/0363749 A1    Nov. 17, 2022

Related U.S. Application Data

(60) Provisional application No. 62/911,394, filed on Oct. 7, 2019, provisional application No. 62/903,070, filed on Sep. 20, 2019.

(51) Int. Cl.
| | |
|---|---|
| A61K 39/395 | (2006.01) |
| A61K 9/00 | (2006.01) |
| A61K 31/42 | (2006.01) |
| A61K 31/4402 | (2006.01) |
| A61K 31/4706 | (2006.01) |
| A61K 31/519 | (2006.01) |
| A61K 31/573 | (2006.01) |
| A61K 38/13 | (2006.01) |
| A61P 19/02 | (2006.01) |
| C07K 16/24 | (2006.01) |
| A61K 39/00 | (2006.01) |

(52) U.S. Cl.
CPC .......... *C07K 16/244* (2013.01); *A61K 9/0019* (2013.01); *A61K 31/42* (2013.01); *A61K 31/4402* (2013.01); *A61K 31/4706* (2013.01); *A61K 31/519* (2013.01); *A61K 31/573* (2013.01); *A61K 38/13* (2013.01); *A61K 39/3955* (2013.01); *A61P 19/02* (2018.01); *A61K 2039/505* (2013.01); *A61K 2039/54* (2013.01); *A61K 2039/545* (2013.01); *C07K 2317/21* (2013.01); *C07K 2317/76* (2013.01)

(58) Field of Classification Search
CPC .............. A61K 39/3955; A61K 9/0019; C07K 16/244; A61P 19/02
See application file for complete search history.

(56) References Cited

U.S. PATENT DOCUMENTS

| | | |
|---|---|---|
| 5,250,442 A | 10/1993 | Cabezas |
| 6,309,636 B1 | 10/2001 | do Couto et al. |
| 8,119,131 B2 | 2/2012 | Di Padova et al. |
| 9,717,791 B2 | 8/2017 | Guettner et al. |
| 9,744,234 B2 | 8/2017 | Mpofu et al. |
| 2005/0147609 A1 | 7/2005 | Filvaroff |
| 2008/0044423 A1 | 2/2008 | Cochrane et al. |
| 2010/0080812 A1 | 4/2010 | Auer |
| 2010/0266608 A1 | 10/2010 | Cooreman et al. |
| 2012/0045848 A1 | 2/2012 | Haugland et al. |
| 2013/0202610 A1 | 8/2013 | Guettner et al. |
| 2013/0209480 A1 | 8/2013 | Mpofu et al. |
| 2018/0008706 A1 | 1/2018 | Mpofu et al. |

FOREIGN PATENT DOCUMENTS

| | | |
|---|---|---|
| CN | 103936854 A | 7/2014 |
| EP | 3111954 A1 | 1/2017 |
| JP | 2000186046 A | 7/2000 |
| JP | 2000186048 A | 7/2000 |
| NO | 2014/155278 A2 | 10/2014 |
| WO | 2006013107 A1 | 2/2006 |
| WO | 2006096491 A2 | 9/2006 |
| WO | 2007059188 A1 | 5/2007 |
| WO | 2007117749 A2 | 10/2007 |

(Continued)

OTHER PUBLICATIONS

Deodhar et al., Arthritis Rheumatol., Feb. 2025, vol. 77(2):163-170, Epub Oct. 31, 2024.*

(Continued)

*Primary Examiner* — Xiaozhen Xie
(74) *Attorney, Agent, or Firm* — David Goetz

(57) ABSTRACT

The present disclosure relates to methods for treating patients having autoimmune diseases, e.g., methods for treating psoriatic arthritis (PsA) or axial spondyloarthritis (axSpA), e.g., non-radiographic axial spondyloarthritis (nr-axSpA) or ankylosing spondylitis (AS), using IL-17 antagonists, e.g., IL-17 antibodies, such as secukinumab. Also disclosed herein are methods for inhibiting the progression of structural damage in PsA and axSpA patients using IL-17 antagonists, e.g., IL-17 antibodies, such as secukinumab. The present disclosure also provides medicaments, pharmaceutical formulations, dosage forms, and kits for use in the disclosed methods.

42 Claims, 12 Drawing Sheets

Specification includes a Sequence Listing.

(56) References Cited

FOREIGN PATENT DOCUMENTS

| WO | 2007149032 | A1 | 12/2007 | | |
|---|---|---|---|---|---|
| WO | 2008030611 | A2 | 3/2008 | | |
| WO | 2008054603 | A2 | 5/2008 | | |
| WO | 2008121615 | A2 | 10/2008 | | |
| WO | 2008156865 | A2 | 12/2008 | | |
| WO | 2009002859 | A1 | 12/2008 | | |
| WO | 2009149168 | A2 | 12/2009 | | |
| WO | 2009149189 | A2 | 12/2009 | | |
| WO | 2010006060 | A2 | 1/2010 | | |
| WO | 2010056804 | A1 | 5/2010 | | |
| WO | 2010065491 | A2 | 6/2010 | | |
| WO | 2010102251 | A2 | 9/2010 | | |
| WO | 2012045848 | A1 | 4/2012 | | |
| WO | 2012059598 | A2 | 5/2012 | | |
| WO | 2012082573 | A1 | 6/2012 | | |
| WO | WO-2013077907 | A1 * | 5/2013 | ............. | A61P 43/00 |
| WO | 2013158821 | A2 | 10/2013 | | |
| WO | WO-2017068472 | A1 * | 4/2017 | ............. | A61P 37/06 |

OTHER PUBLICATIONS

Kivitz et al., Arthritis Rheumatol., Feb. 2025, vol. 77(2):171-179, Epub Oct. 17, 2024.*

Baraliakos et al., Ann. Rheum. Dis., 2016, vol. 75:408-412.*

Baron-Faust, "The IL-17 Superfamily: What Future for PsA?" Rheumatology Network, Mar. 18, 2014, pp. 1-5, XP055227427, retrieved from internet: URL:http://www.rheumatologynetwork.com/psoriatic-arthritis/il-17-superfamily-what-future-ps.

Weitz et al., "Ustekinumab: Targeting the IL-17 Pathway to Improve Outcomes . . . ," Expert Opinion on Biological Therapy, Apr. 1, 2014, vol. 14, No. 4, pp. 515-526, XP055226577.

Dhavalkumar et al., "Effect of IL-17A Blockade with Secukinumab in Autoimmune Diseases," Annals of the Rheumatic Diseases, BMJ Group, GB, Apr. 1, 2013, vol. 72, pp. ii116-ii123, XP009174221.

Gaffen et al., "The IL-23-IL-17 Immune Axis: From Mechanisms to Therapeutic Testing," Journal of Immunology, Aug. 22, 2014, vol. 14, No. 9, pp. 585-600, XP055227747.

Gottlieb et al., "Secukinumab Reduces Hscrp Levels in Subjects with Moderate-to-Severe Plaque . . . ," Annals of the Rheumatic Diseases, Jan. 1, 2014, pp. 1-1, XP055227757.

Gottlieb et al., "Secukinumab Shows Substantial Improvement in Both Psoriasis Symptoms . . . ," American Colleage pf Rheumatology Meeting Abstracts, Jan. 1, 2013, pp. 1-4, XP055227813.

Mcinnes et al., "Anti-Interleukin 17A Monoclonal Antibody Secukinumab Reduces Signs and Symptoms . . . ," Arthritis & Rheumatism: 75th Annual Scientific Meeting of the American-College-of-Rheumatology/46th Annual Scientifi Meeting, Wiley, US; Chicago, IL, USA, Jan. 1, 2011; vol. 63, Suppl. S10, p. S306; XP008147787.

Baraliakos et al., "Long Term Effects of Secukinumab on MRI Findings . . . ," Ann Rheum Dis, 2016, vol. 75, pp. 408-412.

Clinical Trials Identifier No. NCT04209205, "Study to Demonstrate the Efficacy, Safety and Tolerability of Intravenous Secukinumab . . . ," First Posted: Dec. 24, 2019, U.S. Library of National Medicine, Clinicaltrials.gov.

ACR Call for Late-Breaking Abstracts, Guidelines for Submission, Nov. 10-14, 2022.

ACR/ARHP Call for abstracts Guidelines, Oct. 2010.

Aletaha, et al., 2010 Rheumatoid arthritis classifi cation criteria: an American College of Rheumatology/European League Against Rheumatism collaborative initiative, Annals of Rheumatic Diseases, 2010, 1580-1588, 69.

Amgen Wyeth Press Release, Jul. 24, 2003, Enbrel Is First Biologic to Receive FDA Approval For the Treatment of Ankylosing Spondylitis.

Anonymous: ""Object"—Definition & Meaning—Merriam-Webster", , Dec. 8, 2021 (Dec. 8, 2021), pp. 1-15, XP055870736, Retrieved from the Internet: URL:https://www.merriam-webster.com/dictionary/object [retrieved on Dec. 8, 2021.

Baeten, et al., Anti-interleukin-17A monoclonal antibody secukinumab in treatment of ankylosing spondylitis: a randomised, double-blind, placebo-controlled trial, Lancet, Nov. 23, 2013, 1705-1713, 382(9906).

Baeten, et al., Secukinumab, a Monoclonal Antibody to Interleukin-17A, Significantly Improves Signs and Symptoms of Active Ankylosing Spondylitis: Results of a 52-Week Phase 3 Randomized Placebo-Controlled Trial with Intravenous Loading and Subcutaneous Maintenance Dosing, ACR/ARHP Annual Meeting, 2014, abstract 819.

Baeten, et al., Secukinumab, an Interleukin-17A Inhibitor, in Ankylosing Spondylitis, N Engl J Med, Dec. 24, 2015, 2534-2548, 373(26).

Baeten, et al., The Anti-IL17A Monoclonal Antibody Secukinumab (AIN457) Showed Good Safety and Efficacy in the Treatment of Active Ankylosing Spondylitis, Annals of Rheumatic Diseases, 2011, 127, 70(3).

Baeten, et al., The Anti-IL17A Monoclonal Antibody Secukinumab (AIN457) Showed Good Safety and Efficacy in the Treatment of Active Ankylosing Spondylitis, Arthritis and Rheumatism, 2010, 3840-3841, 62(12).

Baeten, et al., The Anti-IL17A Monoclonal Antibody Secukinumab (AIN457) Showed Good Safety and Efficacy in the Treatment of Active Ankylosing Spondylitis, Late Breaking Abstracts: American College of Rheumatology 2010 Annual Scientific Meeting, 2010, 3837-3845.

Balague, et al., Understanding autoimmune disease: new targets for drug discovery, Drug Discovery Today, Oct. 2009, 926-934, 14(19-20).

Baraliakos, et al., 2486D—Interleukin-17A Blockade with Secukinumab Reduces Spinal Inflammation in Patients with Ankylosing Spondylitis As Early As Week 6, As Detected by Magnetic Resonance Imaging, ACR/ARHP Scientific Meeting, Nov. 8, 2011, 1-2.

Baraliakos, et al., Biologic Therapies for Spondyloartritis: What is new?, Current Rheumatology Reports, Aug. 2, 2012, 422-427, 14.

Benhamou, et al., Clinical relevance of C-reactive protein in ankylosing spondylitis and evaluation of the NSAIDs/coxibs' treatment effect on C-reactive protein, Rheumatology, 2010, 536-541, 49(3).

Boehncke, et al., Burden of Disease: Psoriasis and Psoriatic Arthritis, American Journal of Clinical Dermatology, 2013, 377-388, 14.

Boswell, et al., Effects of charge on antibody tissue distribution and pharmacokinetics, Bioconjugate Chemistry, 2010, 2153-2163, 21.

Braun, et al., 2010 update of the ASAS/EULAR recommendations for the management of ankylosing spondylitis, Annals of Rheumatic Diseases, 2011, 896-904, 70.

Braun, et al., Emerging drugs for the treatment of axial and peripheral spondyloarthritis, Expert Opinion on Emerging Drugs, Jan. 9, 2015, 1-14, 20(1).

Braun, et al., Secukinumab (AIN457) in the treatment of ankylosing spondylitis, Expert Opinion on Biological Therapy, Apr. 7, 2016, 711-722, 16(5).

Braun, et al., Secukinumab (AIN457) in the treatment of ankylosing spondylitis, Expert Opinion on Biological Therapy, Apr. 1, 2016, 711-722, 16(5).

Buggage, et al., The Study of IL-17A Expression as a Biomarker for Patients With Active Noninfectious Uveitis Treated With AIN457, Presentation Abstract, May 4, 2010.

Chandran, et al., Reappraisal of the effectiveness of methotrexate in psoriatic arthritis: results from a longitudinal observational cohort, Journal of Rheumatology, 2008, 469-471, 35(3).

Chen, et al., Sulfasalazine for ankylosing spondylitis (Review), The Cochrane Collaboration, 2005.

Chioato, et al., Efficacy of Influenza and Meningococcal Vaccinations in Healthy Subjects Exposed to Secukinumab 150 Mg: Preliminary Study Results., Arthritis and Rheumatism, Oct. 2011, S711, 63(10).

Ciccia, et al., Overexpression of Interleukin-23, but Not Interleukin-17, as an Immunologic Signature of Subclinical Intestinal Inflammation in Ankylosing Spondylitis, Arthritis and Rheumatism, Apr. 2009, 955-965, 60(4).

Cimzia prescribing information, revised Jul. 2010, 25 pages.

Clinical trial NCT00809159, Dec. 16, 2008, available at https://www.clinicaltrials.gov/ct2/show/NCT00809159.

Clinical trial NCT00809159, Jun. 22, 2010, available at https://www.clinicaltrials.gov/ct2/show/NCT00809159.

(56) References Cited

OTHER PUBLICATIONS

Clinical trial NCT00809614, Apr. 29, 2010, available at https://www.clinicaltrials.gov/ct2/show/NCT00809614.
Clinical Trial NCT00928512, Jul. 29, 2015, available at https://clinicaltrials.gov/ct2/show/NCT00928512.
Clinical Trial NCT00928512, Jun. 25, 2009, available at https://clinicaltrials.gov/ct2/show/NCT00928512.
Clinical trial NCT01107457, Apr. 21, 2010, available at https://www.clinicaltrials.gov/ct2/show/NCT01107457.
Clinical trial NCT01109940, Jun. 22, 2010, available at https://www.clinicaltrials.gov/ct2/show/NCT01109940.
Clinical trial NCT01169844, Jul. 23, 2010, available at https://www.clinicaltrials.gov/ct2/show/NCT01169844.
Clinical trial NCT01649375, Jul. 25, 2012, available at https://www.clinicaltrials.gov/ct2/show/NCT01649375.
Clinical trial NCT01870284, last updated Sep. 15, 2014, available at https://www.clinicaltrials.gov/ct2/show/NCT01870284.
Clinical trial NCT02696785, Feb. 26, 2016, available at https://www.clinicaltrials.gov/ct2/show/NCT02696785.
Cosentyx prescribing information, revised Aug. 17, 2017, 44 pages.
Cosentyx prescribing information, revised Jan. 2016, 32 pages.
Cosentyx prescribing information, revised Jan. 2020.
Cosentyx Summary of Products Characteristics, Sep. 1, 2017.
Cross, et al., Postmarketing drug dosage changes of 499 FDA-approved new molecular entities, 1980-1999, Pharmacoepidemiology and Drug Safety, Aug. 12, 2002, 439-446, 11.
Daikh, et al., Advances in managing ankylosing spondylitis, F1000 Prime Reports, Sep. 4, 2014, 6(78).
Danve, et al., IL-17 Inhibition in Axial Spondyloarthritis, Current Treatment Options in Rheumatology, Apr. 2, 2015, 221-230, 1.
Davis, et al., Recombinant Human Tumor Necrosis Factor Receptor (Etanercept) for Treating Ankylosing Spondylitis, Arthritis and Rheumatism, Nov. 2003, 3230-3236, 48(11).
Declaration of Dr. Brian Oscar Porter, dated Feb. 21, 2017.
Declaration of Dr. Diane R. Mould, dated Jan. 29, 2014.
Declaration of Dr. Oliver Sander, dated Oct. 19, 2015.
Declaration of Dr. Renard Didier, dated Mar. 2, 2017.
Deodhar, et al., Secukinumab 150 mg significantly improved signs and symptoms of non-radiographic axial spondyloarthritis: Result from a phase 3 double-blind, randomized, placebo-controlled study, ACR/ARP Annual Meeting, Nov. 12, 2019, abstract No. L21.
Deodhar, et al., Secukinumab 150 mg significantly improved signs and symptoms of non-radiographic axial spondyloarthritis: Result from a phase 3 double-blind, randomized, placebo-controlled study, ACR/ARP annual meeting, Nov. 12, 2019, presentation No. L21.
Deodhar, et al., Secukinumab significantly improves physical function, quality of life, and work productivity through 52 weeks in subjects with active ankylosing spondylitis in the phase 3 measure 2 study, Annals of Rheumatic Diseases, 2015, 1144, 74.
Deodhar, et al., The term 'non-radiographic axial spondyloarthritis' is much more important to classify than to diagnose patients with axial spondyloarthritis, Annals of Rheumatic Diseases, 2016, 791-794, 75.
Dick, et al., Secukinumab in the Treatment of Noninfectious Uveitis: Results of Three Randomized, Controlled Clinical Trials, Ophthalmology, Apr. 2013, 777-787, 120(4).
Dougados, et al., Arthritis 2 Spondyloarthritis, Lancet, 2011, 2127-2137, 377.
Fagerli, et al., Switching between TNF inhibitors in psoriatic arthritis: data from the NOR-DMARD study, Annals of Rheumatic Diseases, Apr. 5, 2013, 1840-1844, 72.
Falconer, Advances in Liquid Formulations of Parenteral Therapeutic Proteins, Biotechnology Advances, Jun. 27, 2019, 37.
Freeman, Secukinumab improves patient-reported outcomes in ankylosing spondylitis, MDedge, Apr. 27, 2016.
Genco, FDA Approval Of The First nr-AxSpA Biologics: Projecting Regulatory & Market Dynamics, Biosimilar Development, Feb. 27, 2019.
Genovese, et al., Efficacy and safety of secukinumab in patients with rheumatoid arthritis: a phase II, dose-finding, double-blind, randomised, placebo controlled study, Annals of Rheumatic Diseases, 2013, 863-869, 72.
Genovese, et al., LY2439821, a Humanized Anti-Interleukin-17 Monoclonal Antibody, in the Treatment of Patients With Rheumatoid Arthritis, Arthritis and Rheumatism, Apr. 2010, 929-939, 62(4).
Genovese, et al., One year efficacy and safety results of a phase II trial of secukinumab in patients with rheumatoid arthritis, Arthritis and Rheumatism, Oct. 2011, S149-S150, 63(10).
Genovese, et al., Secukinumab (AIN457) showed a rapid decrease of disease activity in patients with active rheumatoid arthritis including those with high inflammatory burden, Annals of Rheumatic Diseases, 2011, 472, 70(3).
Genovese, et al., Secukinumab (AIN457), a Novel Monoclonal Antibody Targeting IL-17A Demonstrates Efficacy in Active Rheumatoid Arthritis Patients Despite Stable Methotrexate Treatment: Results of a Phase IIb Study, Arthritis and Rheumatism, 2010, 3842, 62(12).
Gladman, et al., Psoriatic arthritis: epidemiology, clinical features, course, and outcome, Annals of Rheumatic Diseases, 2005, ii14-ii17, 64(II).
Goh, et al., Update on biologic therapies in ankylosing spondylitis: a literature review, International Journal of Rheumatic Disease, 2012, 445-454, 15.
Goodman, Secukinumab Successful in Spondylitis, Psoriatic Arthritis, Medscape, Nov. 24, 2014.
Gossec, et al., European League Against Rheumatism recommendations for the management of psoriatic arthritis with pharmacological therapies, Annals of Rheumatic Diseases, 2012, 4-12, 71.
Gottlieb, et al., Guidelines of care for the management of psoriasis and psoriatic arthritis Section 2. Psoriatic arthritis: Overview and guidelines of care for treatment with an emphasis on the biologics, Journal of the American Academy of Dermatology, May 2008, 851-864, 58(5).
Goulabchand, et al., Effect of tumour necrosis factor blockers on radiographic progression of psoriatic arthritis: a systematic review and meta-analysis of randomised controlled trials, Annals of Rheumatic Diseases, 2014, 414-419, 73.
Griffiths, et al., Psoriasis and psoriatic arthritis: Immunological aspects and therapeutic guidelines, Clin Exp Rheumatol, 2006, S72-S78, 24(40).
Haibel, et al., Open label trial of anakinra in active ankylosing spondylitis over 24 weeks, Annals of Rheumatic Diseases, 2005, 296-298, 64.
Haller, Converting Intravenous Dosing to Subcutaneous Dosing With Recombinant Human Hyaluronidase, Pharmaceutical Technology, Oct. 2, 2007.
Hennigan, et al., Adalimumab in ankylosing spondylitis: an evidence •based review of its place in therapy, Core Evidence, 2008, 295-305, 2(4).
History of changes for Study NCT00669916, submitted on Apr. 9, 2015, available at https://clinicaltrials.gov/ct2/history/NCT00669916?V_5=View.
History of changes for Study NCT00669942, submitted on Mar. 27, 2015, available at https://clinicaltrials.gov/ct2/history/NCT00669942?A=5&B=5&C=merged.
History of changes for Study NCT00805480, submitted on Jan. 28, 2015, available at https://clinicaltrials.gov/ct2/history/NCT00805480?V_4=View.
History of changes for Study NCT00809159, submitted on Dec. 7, 2015, available at https://clinicaltrials.gov/ct2/history/NCT00809159?V_9=View#StudyPageTop.
History of changes for Study NCT00809614, submitted on Oct. 14, 2015, available at https://clinicaltrials.gov/ct2/history/NCT00809614?A=5&B=5&C=merged.
History of changes for Study NCT00928512, submitted on Oct. 7, 2015, available at https://clinicaltrials.gov/ct2/history/NCT00928512?V_9=View#StudyPageTop.
History of changes for Study NCT00995709, submitted on Aug. 13, 2015, available at https://clinicaltrials.gov/ct2/history/NCT00995709?V_7=View.

(56) References Cited

OTHER PUBLICATIONS

History of changes for Study NCT01032915, submitted on Oct. 8, 2015, available at https://clinicaltrials.gov/ct2/history/NCT01032915?V_4=View.
History of changes for Study NCT01071252, submitted on Feb. 12, 2015, available at https://clinicaltrials.gov/ct2/history/NCT01071252?V_1=View.
History of changes for Study NCT01090310, submitted on Dec. 8, 2015, available at https://clinicaltrials.gov/ct2/history/NCT01090310?V_2=View.
History of changes for Study NCT01093846 submitted on Jan. 22, 2016, available at https://clinicaltrials.gov/ct2/history/NCT01093846?V_2=View.
History of changes for Study NCT01095250, submitted on Oct. 5, 2015, available at https://clinicaltrials.gov/ct2/history/NCT01095250?A=6&B=6&C=merged.
History of changes for Study NCT01103024, submitted on May 2, 2012, available at https://clinicaltrials.gov/ct2/history/NCT01103024?A=2&B=2&C=merged.
History of changes for Study NCT01109940, submitted on Nov. 15, 2016, available at https://clinicaltrials.gov/ct2/history/NCT01109940?V_2=View.
History of changes for Study NCT01169844, submitted on Nov. 16, 2016, available at https://clinicaltrials.gov/ct2/history/NCT01169844?A=1&B=1&C=merged.
History of changes for Study NCT01327664, submitted on Dec. 5, 2013, available at https://clinicaltrials.gov/ct2/history/NCT01327664?V_1=View.
History of changes for Study NCT01350804, submitted on May 4, 2016, available at https://clinicaltrials.gov/ct2/history/NCT1350804?A=3&B=3&C=merged.
History of changes for Study NCT01358175, submitted on Oct. 20, 2011, available at https://clinicaltrials.gov/ct2/history/NCT01358175?V_2=View#StudyPageTop.
History of changes for Study NCT01358578, submitted on Mar. 29, 2019, available at https://clinicaltrials.gov/ct2/history/NCT01358578?A=6&B=6&C=merged.
History of changes for Study NCT01365455, submitted on Mar. 20, 2019, available at https://clinicaltrials.gov/ct2/history/NCT01365455?A=10&B=10&C=merged.
History of changes for Study NCT01377012, submitted on Feb. 9, 2017, available at https://clinicaltrials.gov/ct2/history/NCT1377012?A=4&B=4&C=merged.
History of changes for Study NCT01392326, submitted on Jan. 5, 2016, available at https://clinicaltrials.gov/ct2/history/NCT01392326?A=2&B=2&C=merged.
History of changes for Study NCT01406938, submitted on Apr. 30, 2015, available at https://clinicaltrials.gov/ct2/history/NCT01406938?A=2&B=2&C=merged.
History of changes for Study NCT01412944, submitted on Mar. 17, 2015, available at https://clinicaltrials.gov/ct2/history/NCT01412944?A=1&B=1&C=merged.
History of changes for Study NTC01359943, submitted on Oct. 18, 2011, available at https://clinicaltrials.gov/ct2/history/NCT01359943?V_2=View.
Hou, et al., Methotrexate ameliorates pristane-induced arthritis by decreasing IFN-alpha and IL-17A expressions, Journal of Zhejiang University—Science B, 2011, 40-46, 12(1).
Hueber, et al., Effects of AIN457, a Fully Human Antibody to Interleukin-17A, on Psoriasis, Rheumatoid Arthritis, and Uveitis, Science Translational Medicine, Oct. 6, 2010, 52ra72, 2(52).
Hueber, et al., Secukinumab, a human anti-IL-17A monoclonal antibody, for moderate to severe Crohn's disease: unexpected results of a randomised, double-blind placebo-controlled trial, Gut, May 17, 2012, 1693-1700, 61.
Hueber, et al., Secukinumab, a human anti-IL-17A monoclonal antibody, for moderate to severe Crohn's disease: unexpected results of a randomised, double-blind placebo-controlled trial, Gut, 2012, 1693-1700, 61.
Humira prescribing information, revised Mar. 2020.
Igawa, et al., Reduced elimination of IgG antibodies by engineering the variable region, Protein Engineering, Design and Selection, Feb. 15, 2010, 385-392, 23(5).
Inman, et al., Efficacy and Safety of Golimumab in Patients With Ankylosing Spondylitis, Arthritis and Rheumatism, Nov. 2008, 3402-3412, 58(11).
Jandus, et al., Increased Numbers of Circulating Polyfunctional Th17 Memory Cells in Patients With Seronegative Spondylarthritedes, Arthritis and Rheumatism, Aug. 2008, 2307-2317, 58(8).
Kagan, et al., Subcutaneous Absorption of Monoclonal Antibodies: Role of Dose, Site of Injection, and Injection Volume on Rituximab Pharmacokinetics in Rats, Pharmaceutical Research, 2012, 490-499, 29.
Kavanaugh, et al., Clinical efficacy, radiographic and safety findings through 2 years of golimumab treatment in patients with active psoriatic arthritis: results from a long-term extension of the randomised, placebo-controlled Go-Reveal study, Annals of Rheumatic Diseases, 2013, 1777-1785, 72.
Kavanaugh, et al., Efficacy of Subcutaneous Secukinumab in Patients with Active Psoriatic Arthritis Stratified by Prior Tumor Necrosis Factor Inhibitor Use: Results from the Randomized Placebo-controlled Future 2 Study, Journal of Rheumatology, 2016, 1713-1717, 43(9).
Kavanaugh, et al., The Infliximab Multinational Psoriatic Arthritis Controlled Trial (Impact): results of radiographic analyses after 1 year, Annals of Rheumatic Diseases, Jan. 26, 2006, 1038-1043, 65.
Kavanaugh, et al., Ustekinumab, an anti-IL-12/23 p40 monoclonal antibody, inhibits radiographic progression in patients with active psoriatic arthritis, Annals of Rheumatic Diseases, Feb. 19, 2014, 1000-1006, 73.
Kelly, Secukinumab Effective for Ankylosing Spondylitis in Phase 3 Trials, Medscape, Dec. 30, 2015.
Kelzer, et al., Clinical Pharmacokinetics of Therapeutic Monoclonal Antibodies, Clinical Pharmacokinetics, 2010, 493-507, 49(8).
Kiltz, et al., Treatment of ankylosing spondylitis in patients refractory to TNF-inhibition: are there alternatives?, Current Opinion in Rheumatology, May 2012, 252-260, 24(3).
Kivitz, et al., Efficacy and Safety of Secukinumab 150 mg with and Without Loading Regimen in Ankylosing Spondylitis: 104-week Results from Measure 4 Study, Rheumatology and Therapy, Aug. 18, 2018, 447-462, 5.
Kocijan, et al., Anti-TNFs in axial spondyloarthritis, Wiener Medizinische Wochenschrift, Jan. 9, 2015, 10-13, 165.
Kunder, Treatment of the patients with psoriatic arthritis, Medical News, 2013, 34-41, 6.
Lalonde, et al., Model-based Drug Development, Clinical Pharmacology and Therapeutics, Jul. 2007, 21-32, 82(1).
Landewe, et al., Efficacy of certolizumab pegol on signs and symptoms of axial spondyloarthritis including ankylosing spondylitis: 24-week results of a doubleblind randomised placebo-controlled Phase 3 stu, Annals of Rheumatic Diseases, 2014, 39-47, 73.
Langley, et al., Secukinumab in Plaque Psoriasis—Results of Two Phase 3 Trials, N Engl J Med., Jul. 24, 2014, 326-338, 371(4).
Late-Breaking Abstracts: American College of Rheumatology 2010 Annual Scientific Meeting.
Letko, et al., IV Secukinumab Is An Effective Treatment In Patients With Noninfectious Uveitis Requiring Steroid Sparing Immunosuppressive Therapy, Invest Ophthalmol Vis Sci, 2013, E-Abstract 5929, 54.
Lubberts, Th17 cytokines and arthritis, Semin Immunopathol, Feb. 4, 2010, 43-53, 32.
Machado, et al., New developments in the diagnosis and treatment of axial spondyloartritis, Clinical Investigation, 2013, 153-171, 3(2).
Machold, et al., Very recent onset rheumatoid arthritis: clinical and serological patient characteristics associated with radiographic progression over the first years of disease, Rheumatology, 2007, 342-349, 46.
Madej, et al., Cytokine Profiles in Axial Spondyloarthritis, Reumatologia, 2015, 9-13, 53(1).
Maksymowych, et al., OP0114 Secukinumab for The Treatment of Ankylosing Spondylitis: Comparative Effectiveness Results versus

(56) References Cited

OTHER PUBLICATIONS

Adalimumab Using A Matching-Adjusted Indirect Comparison, Annals of Rheumatic Diseases, Jun. 10, 2016.
Malarone, prescribing information, revised Jun. 2013, 22 pages.
Maldonado-Ficco, et al., Secukinumab: a promising therapeutic option in spondyloarthritis, Clinical Rheumatology, 2016, 2151-2161, 35.
Mantravadi, et al., Tumor necrosis factor inhibitors in psoriatic arthritis, Expert Review of Clinical Pharmacology, May 22, 2017, 899-910, 10(8).
Marzo-Ortega, et al., Secukinumab provides sustained improvements in the signs and symptoms of active ankylosing spondylitis: 2-year results from a phase 3 trial with subcutaneous loading and maintenance dosing (measure 2), Annals of Rheumatic Diseases, 2016, 812-813, 75(2).
Mayo Clinic_Apr. 30, 2020_Diagnosis and treatment of Uveitis https://www.mayoclinic.org/diseasesconditions/uveitis/diagnosis-treatment/drc-20378739?p=1.
Mcinnes, et al., Anti-Interleukin 17A Monoclonal Antibody Secukinumab Reduces Signs And Symptoms Of Psoriatic Arthritis In A 24-Week Multicenter; Double-blind, Randomized, Placebo-Controlled Trial, Arthritis and Rheumatism, Nov. 2011, 63.
Mcinnes, et al., Secukinumab, a human anti-interleukin-17A monoclonal antibody, in patients with psoriatic arthritis (Future 2): a randomised, double-blind, placebo-controlled, phase 3 trial, Lancet, Sep. 19, 2015, 1137-1146, 386.
Mckee, Novartis' Cosentyx shown to inhibit joint damage in PsA, Pharma Times, Nov. 7, 2017.
Mease, et al., Brodalumab, an Anti-IL17RA Monoclonal Antibody, in Psoriatic Arthritis, N Engl J Med., Jun. 12, 2014, 2295-2306, 370(24).
Mease, et al., Managing Patients with Psoriatic Disease: The Diagnosis and Pharmacologic Treatment of Psoriatic Arthritis in Patients with Psoriasis, Drugs, Feb. 25, 2014, 423-441, 74.
Mease, et al., Psoriatic arthritis assessment tools in clinical trials, Annals of Rheumatic Diseases, 2005, ii49-ii54, 64.
Mease, et al., Secukinumab: A New Treatment Option for Psoriatic Arthritis, Rheumatology Therapy, 2016, 5-29, 3.
Mease, et al., Subcutaneous Secukinumab Inhibits Radiographic Progression in Psoriatic Arthritis: Primary Results from a Large Randomized, Controlled, Double-Blind Phase 3 Study, ACR/ARHP Annual Meeting, Oct. 19, 2017.
Mease, Non anti-TNF biologics on SpA and PsA, Annals of Rheumatic Diseases, Jun. 8, 2012, abstract SP0146.
Meibohm, The Role of Pharmacokinetics and Pharmacodynamics in the Development of Biotech Drugs, Pharmacokinetics and Pharmacodynamics of Biotech Drugs: Principles and Case Studies in Drug Development, 2006, 3-13, part 1.
Melis, et al., Systemic levels of IL-23 are strongly associated with disease activity in rheumatoid arthritis but not spondyloarthritis, Annals of Rheumatic Diseases, 2010, 618-623, 69.
Menter, et al., Guidelines of care for the management of psoriasis and psoriatic arthritis, Journal of the American Academy of Dermatology, Jul. 2011, 137-174, 65(1).
Methods of Treating Rheumatoid Arthritis Using IL-17 Antagonists, 99 pages.
Mok, et al., Drug levels, anti-drug antibodies, and clinical efficacy of the anti-TNFalpha biologics in rheumatic diseases, Clinical Rheumatology, 2013, 1429-1435, 32.
Mould, et al., Pharmacokinetics and Pharmacodynamics of Monoclonal Antibodies, Biodrugs, 2010, 23-39, 24(1).
Mrowietz, et al., Definition of treatment goals for moderate to severe psoriasis: a European consensus, Archives for Dermatological Research, Jan. 2011, 1-10, 303.
Nash, et al., Secukinumab for Ankylosing Spondylitis: comparative effectiveness results versus adalimumab using a matching-adjusted indirect comparison, International Journal of Rheumatic Diseases, 2016, 244-245, 19(Suppl. 2).
Nash, et al., Secukinumab for psoriatic arthritis: comparative effectiveness results versus etanercept up to 24 weeks using a matching-adjusted indirect comparison, International Journal of Rheumatic Diseases, 2016, 163, 19(2).
Nash, et al., Secukinumab for the treatment of psoriatic arthritis: comparative effectiveness results versus adalimumab up to 48 weeks using a matching-adjusted indirect comparison, Annals of Rheumatic Diseases, 2016, 353, 75(2).
Ness, Surveying the pipeline of biologics to treat inflammatory conditions, PharmD, Sep. 12, 2011.
Newsome, et al., The clinical pharmacology of therapeutic monoclonal antibodies in the treatment of malignancy; have the magic bullets arrived?, British Journal of Clinical Pharmacology, May 22, 2008, 6-19, 66(1).
NHSC Publication, May 2010, AIN-457 for posterior uveitis, 5 pages.
Novartis announces result of Prevent Study, dated Nov. 12, 2019, downloaded Dec. 11, 2019.
Novartis Media Release, Novartis announces new one-year results demonstrating sustained secukinumab efficacy in ankylosing spondylitis patients, Jun. 10, 2015.
Novartis Media Release, Study: Drug helps with psoriasis symptoms, Fox News, Oct. 24, 2011.
Ogura, et al., Interleukin-17 promotes autoimmunity by triggering a positive-feedback loop via Interleukin-6 induction, Immunity, Oct. 17, 2008, 628-636, 29.
Olivieri, et al., Emerging drugs for psoriatic arthritis, Expert Opin. Emerging Drugs, Jun. 9, 2010, 399-414, 15(3).
Online publication, Arthritis & Rheumatism, Sep. 27, 2011.
Online publication, Arthritis & Rheumatism, Dec. 9, 2011.
Pavelka, et al., Efficacy, safety, and tolerability of secukinumab in patients with active ankylosing spondylitis: a randomized, doubleblind phase 3 study, Measure 3, Arthritis Research and Therapy, Dec. 22, 2017, 27 pages, 19(285).
Poddubnyy, Axial spondyloarthritis: is there a treatment of choice, Therapeutic Advances in Musculoskeletal Disease, 2013, 45-54, 5(1).
Poddubnyy, et al., Adalimumab for the treatment of ankylosing spondylitis and nonradiographic axial spondyloarthritis—a five-year update, Expert Opinion on Biological Therapy, 2013, 1599-1611, 13(11).
Poddubnyy, et al., Spontaneous, drug-induced, and drug-free remission in peripheral and axial spondyloarthritis, Best Practice & Research Clinical Rheumatology, 2014, 807-818, 28.
Porter, et al., Lymphatic transport of proteins after s.c. injection: implications of animal model selection, Advanced Drug Delivery Reviews, 2001, 157-171, 50.
Porter, et al., Lymphatic Transport of Proteins After Subcutaneous Administration, Journal of Pharmaceutical Sciences, Mar. 2000, 297-310, 89(3).
Potter, et al., Association of rheumatoid factor and anti-cyclic citrullinated peptide positivity, but not carriage of shared epitope or PTPN22 susceptibility variants, with anti-tumour necrosis factor response in rheumatoid arthritis, Annals of Rheumatic Diseases, 2009, 69-74, 68.
Produfoot (Updated By John Collett), Dosage Regimens, Pharmaceutics: The Science of Dosage Form Design, 2001, 275-288, chapter 19.
Proprietor's letter to the Examining Division, Feb. 15, 2018.
Psoriatic Arthritis (PsA): A distinct, complex disease, retrieved from www.discoverpsa.com, on Feb. 2, 2016.
Recker, et al., Insufficiently dosed intravenous ibandronate injections are associated with suboptimal antifracture efficacy in postmenopausal osteoporosis, Bone, 2004, 890-899, 34.
Reichert, Antibody-based therapeutics to watch in 2011, mAbs, Jan. 1, 2011, 76-99, 3(1).
Rekalov, et al., Non-X-Ray Axial Spondyloarthritis: Verification Of Diagnosis And Treatment, Ukrainian Journal of Rheumatology, 2014, 18-22, 3(57).
Remicade (Infliximab) prescribing information, revised Oct. 2015, 57 pages.
Remicade (Infliximab), Aug. 12, 1998, 12 pages.

(56) References Cited

OTHER PUBLICATIONS

Rheumatologists chose ACR50, ACR70 over ACR20 as endpoints when prescribing psoriatic arthritis drugs, One Minute Read, retrieved from www.healio.com, on Jan. 9, 2020.
Richter, et al., Mechanistic Determinants of Biotherapeutics Absorption Following SC Administration, The AAPS Journal, Sep. 2012, 559-570, 14(3).
Robinson, et al., Axial spondyloarthritis: a new disease entity, not necessarily early ankylosing spondylitis, Annals of Rheumatic Diseases, 2013, 162-164, 72(2).
Rodriguez, et al., Old and new treatment targets in axial spondyloarthritis, RMD Open, Apr. 5, 2015, 1.
Romao, et al., Old drugs, old problems: where do we stand in prediction of rheumatoid arthritis responsiveness to methotrexate and other synthetic DMARDs?, BMC Medicine, 2013, 24 pages, 11(17).
Rudwaleit, et al., The development of Assessment of Spondyloarthritis international Society classification criterai for axial spondyloarthritis (part I): classification of paper patients by expert opinion including uncertainty appraisal, Extended Report, Mar. 17, 2009.
Saber, et al., Remission in Psoriatic Arthritis: is it Possible and How Can it Be Predicted?, Arthritis Research and Therapy, 2010, 12.
Sacks, et al., Scientific and Regulatory Reasons for Delay and Denial of FDA Approval of Initial Applications for New Drugs, 2000-2012, JAMA, 2014, 378-384, 311(4).
Salvana, et al., Infectious Complications Associated with Monoclonal Antibodies and Related Small Molecules, Clinical Microbiology Reviews, Apr. 2009, 274-290, 22(2).
Samson, et al., An Open-Label Proof-Of Concept Study to Assess the Efficacy of AIN457 in Patients With Noninfectious Uveitis, ARVO Annual Meeting Abstract, Apr. 2010, Abstract 2917, 51.
Schett, et al., Structural damage in rheumatoid arthritis, psoriatic arthritis, and ankylosing spondylitis: traditional views, novel insights gained from TNF blockade, and concepts for the future, Arthritis Research and Therapy, 2011, S4, 13(suppl. 1).
Scott, et al., Rheumatoid arthritis, Lancet, 2010, 1094-1108, 376.
Shostak, et al., Back pain of inflammatory genesis: seronegative spondyloarthropathy—the main approaches to diagnosis and therapy, The Clinician, Jan. 2011, 5.
Sieper, et al., Assessment of short-term symptomatic efficacy of tocilizumab in ankylosing spondylitis: results of randomised, placebo-controlled trials, Annals of Rheumatic Diseases, 2014, 95-100, 73.
Sieper, et al., Early response to adalimumab predicts long-term remission through 5 years of treatment in patients with ankylosing spondylitis, Annals of Rheumatic Diseases, 2011.
Sieper, et al., Efficacy and safety of adalimumab in patients with non-radiographic axial spondyloarthritis: results of a randomised placebo-controlled trial (Ability-1), Clinical and epidemiological research, Jul. 7, 2012, 815-822.
Sieper, et al., Sarilumab for the treatment of ankylosing spondylitis: results of a Phase II, randomised, double-blind, placebo-controlled study (Align), Annals of Rheumatic Diseases, 2015, 1051-1057, 74.
Sieper, et al., Secukinumab efficacy in anti-TNF-naive and anti-TNF-experienced subjects with active ankylosing spondylitis: results from the Measure 2 Study, Annals of Rheumatic Diseases, 2017, 571-575, 76.
Sieper, et al., Secukinumab efficacy in anti-TNF-naive and anti-TNF-experienced subjects with active ankylosing spondylitis: results from the Measure 2 Study, Annals of Rheumatic Diseases, Aug. 31, 2016.
Sieper, et al., Secukinumab, a Monoclonal Antibody to Interleukin-17A, Significantly Improves Signs and Symptoms of Active Ankylosing Spondylitis: Results of a Phase 3, Randomized, Placebo-Controlled Trial with Subcutaneous Loading and Maintenance Dosing, ACR/ARHP Annual Meeting, 2014, abstract 536.
Smolen, et al., Eular recommendations for the management of rheumatoid arthritis with synthetic and biological disease-modifying antirheumatic drugs, Annals of Rheumatic Diseases, May 5, 2010.
Song, et al., Consistently Good Clinical Response in Patients with early Axial Spondyloartritis after 3 Years of continuous Treatment with Etanercept: Longterm Data of the Esther Trial, The Journal of Rheumatology, 2014, 2034-2040, 41(10).
Song, et al., Different Response to Rituximab in Tumor Necrosis Factor Blocker—Naive Patients With Active Ankylosing Spondylitis and in Patients in Whom Tumor Necrosis Factor Blockers Have Failed, Arthritis and Rheumatism, May 2010, 1290-1297, 62(5).
Song, et al., Treatment of active ankylosing spondylitis with abatacept: an open-label, 24-week pilot study, Annals of Rheumatic Diseases, 2011, 1108-1110, 70.
Stelara Highlights of Prescribing Information, revised Sep. 2016.
Strand, et al., Secukinumab for the treatment of psoriatic arthritis: comparative effectiveness versus infliximab using a matching-adjusted indirect comparison, ACR/ARHP Annual Meeting, Sep. 28, 2016, abstract 1729.
Tak, et al., AIN457 Shows a Good Safety Profile and Clinical Benefit in Patients with Active Rheumatoid Arthritis (RA) Despite Methotrexate Therapy: 16-Weeks Results From a Randomized Proof-of-Concept Trial, ACR/ARHP Scientific Meeting, Oct. 20, 2009, presentation No. 1922.
Taltz prescribing information, revised Aug. 2019, 1 page.
Tamiflu prescribing information, revised Jan. 17, 2008, 29 pages.
Tamura, et al., Practice Theory for Clinical Applications of Immune Inhibitors, Psoriatic Arthritis, Inflammation & Immunity, 2011, 383-388, 19(4).
Tang, et al., Pharmacokinetic Aspects of Biotechnology Products, Journal of Pharmaceutical Sciences, Sep. 2004, 2184-2204, 93(9).
Urano, Diagnosis of spondyloarthritis: from ankylosing spondylitis to axial spondyloarthritis, Inflammation and Immunity, 2013, 79-85, 21(1).
U.S. Appl. No. 61/410,533, filed Nov. 5, 2010.
Van Der Heijde, et al., Adalimumab effectiveness for the treatment of ankylosing spondylitis is maintained for up to 2 years: long-term results from the Atlas trial, Annals of Rheumatic Diseases, 2009, 922-929, 68.
Van Der Heijde, et al., Effect of different imputation approaches on the evaluation of radiographic progression in patients with psoriatic arthritis: results of the Rapid-PsA 24-week phase III double-blind randomised placebo-controlled study of certolizumab pegol, Annals of Rheumatic Diseases, 2014, 233-237, 73.
Van Der Heijde, et al., Efficacy and Safety of Adalimumab in Patients With Ankylosing Spondylitis, Arthritis and Rheumatism, Jul. 2006, 2136-2146, 54(7).
Van Der Heijde, et al., Efficacy and Safety of Infliximab in Patients With Ankylosing Spondylitis, Arthritis and Rheumatism, Feb. 2005, 582-591, 52(2).
Van Der Heijde, et al., Psoriatic arthritis imaging: a review of scoring methods, Annals of Rheumatic Diseases, 2005, 61-64, 64(suppl. 2).
Van Der Horst-Bruinsma, et al., A systematic comparison of rheumatoid arthritis and ankylosing spondylitis, Clinical and Experimental Rheumatology, 2009, S43-S49, 27(55).
Vandooren, et al., Absence of a Classically Activated Macrophage Cytokine Signature in Peripheral Spondylarthrites, Including Psoriatic Arthritis, Arthritis and Rheumatism, Apr. 2009, 966-975, 60(4).
Wang, et al., Fixed Dosing Versus Body Size-Based Dosing of Monoclonal Antibodies in Adult Clinical Trials, Journal of Clinical Pharmacology, 2009, 1012-1024, 49(9).
Wang, et al., Monoclonal Antibody Pharmacokinetics and Pharmacodynamics, Clinical Pharmacology and Therapeutics, Nov. 2008, 548-558, 84(5).
Wang, Instability, stabilization, and formulation of liquid protein pharmaceuticals, International Journal of Pharmaceutics, Apr. 28, 1999, 129-188, 185.
Ward, et al., American College of Rheumatology/Spondylitis Association of America/Spondyloarthritis Research and Treatment Network 2015 Recommendations for the Treatment of Ankylosing Spondylitis and Nonradiographic Axial Spondyloarthritis, Arthritis and Rheumatology, Feb. 2016, 282-298, 68(2).

(56) References Cited

OTHER PUBLICATIONS

Wayback Machine, www.rheumatology.org, retrieved from the Internet: URL—https://web.archive.org/web/20101029090319/http:/www.rheumatology.org/, Oct. 29, 2010.
Weselman, Psoriatic Arthritis, American College of Rheumatology, 2017.
Wiley: "Publication Date of D2", Dec. 9, 2021 (Dec. 9, 2021), pp. 1-2, XP55871165, [retrieved on Dec. 9, 2021].
Wolbink, et al., Dealing with immunogenicity of biologicals: assessment and clinical relevance, Current Opinion in Rheumatology, 2009, 211-215, 21.
Yang, et al., Crystalline monoclonal antibodies for subcutaneous delivery, PNAS, Jun. 10, 2003, 6934-6939, 100 (12).
Yang, et al., Secukinumab in the treatment of psoriasis: patient selection and perspectives, Psoriasis: Targets and Therapy, 2018, 75-82, 8.
Yildirim, et al., Associations between Acute Phase Reactant Levels and Disease Activity Score (DAS28) in Patients with Rheumatoid Arthritis, Annals of Clinical & Laboratory Science, 2004, 423-426, 34(4).
Yoshida, et al., Methotrexate Suppresses Inflammatory Agonist Induced Interleukin 6 Synthesis in Osteoblasts, The Journal of Rheumatology, 2005, 787-795, 32(5).
Yoshino, Frequently Used Orthopedic Drug File (19th) Monthly Drugs: Analgesics and Chronic Pain Therapeutics, Review, The Japanese Journal of Orthopaedic Nursing, Jul. 2014, 728-729, 19(7).
Zhao, et al., Clinical pharmacology considerations in biologics development, Acta Pharmacologica Sinica, 2012, 1339-1347, 33.
Zhao, et al., The Antibody Drug Absorption Following Subcutaneous or Intramuscular Administration and Its Mathematical Description by Coupling Physiologically Based Absorption Process with the Conventional Compartment Pharmacokinetic Model, The Journal of Clinical Pharmacology, 2013, 314-325, 53(3).
Zuidema, et al., Release and absorption rates of intramuscularly and subcutaneously injected pharmaceuticals (II), International Journal of Pharmaceutics, 1994, 189-207, 105.
Kuznetsova, Brackets in text of legal document as a linguistic and cognitive phenomenon, Journal of Moscow Region State University. Russian Philology series, N3, 37-43, 2015.

* cited by examiner

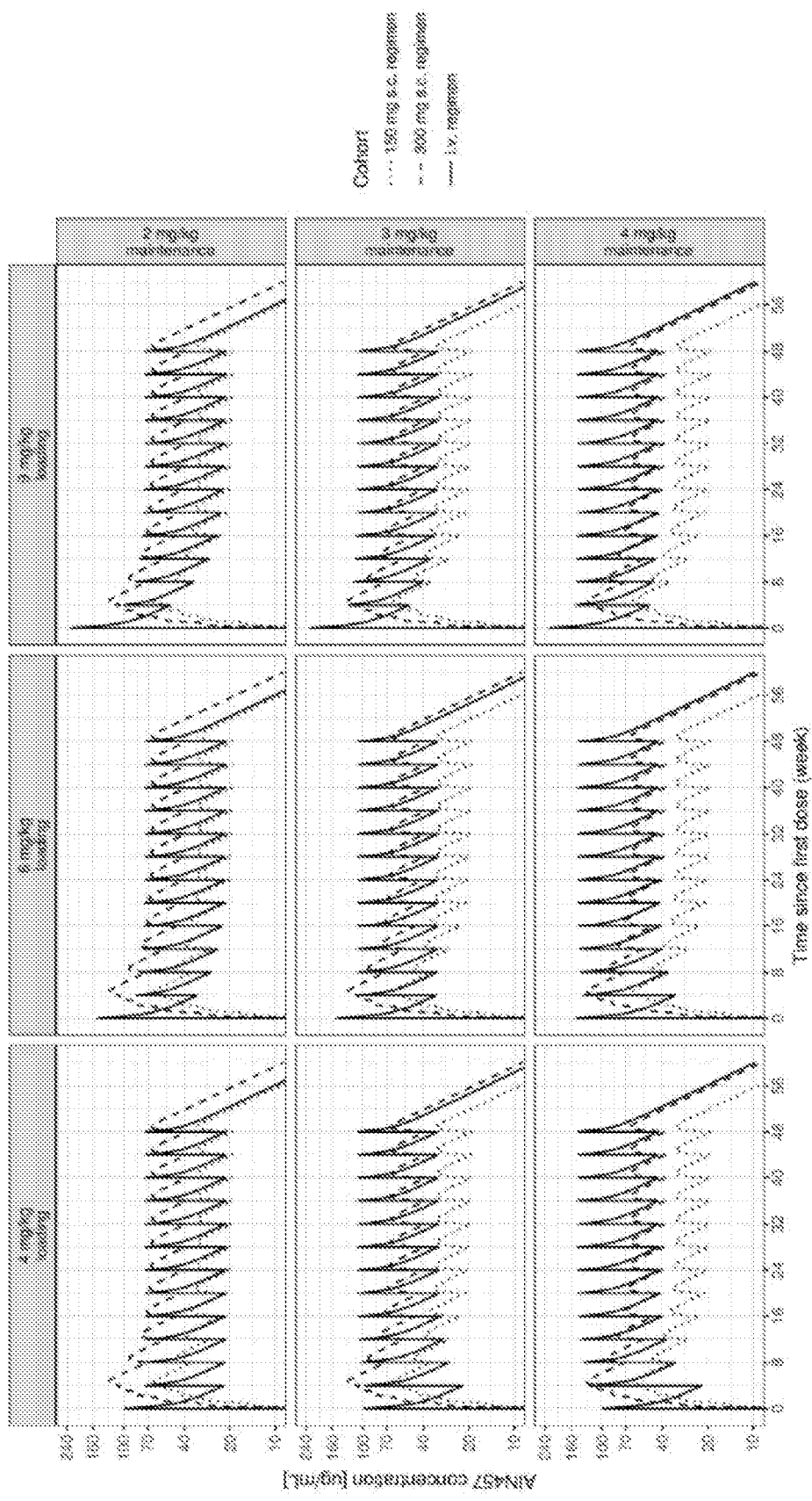
FIG. 1 Median concentration profiles – Ankylosing Spondylitis

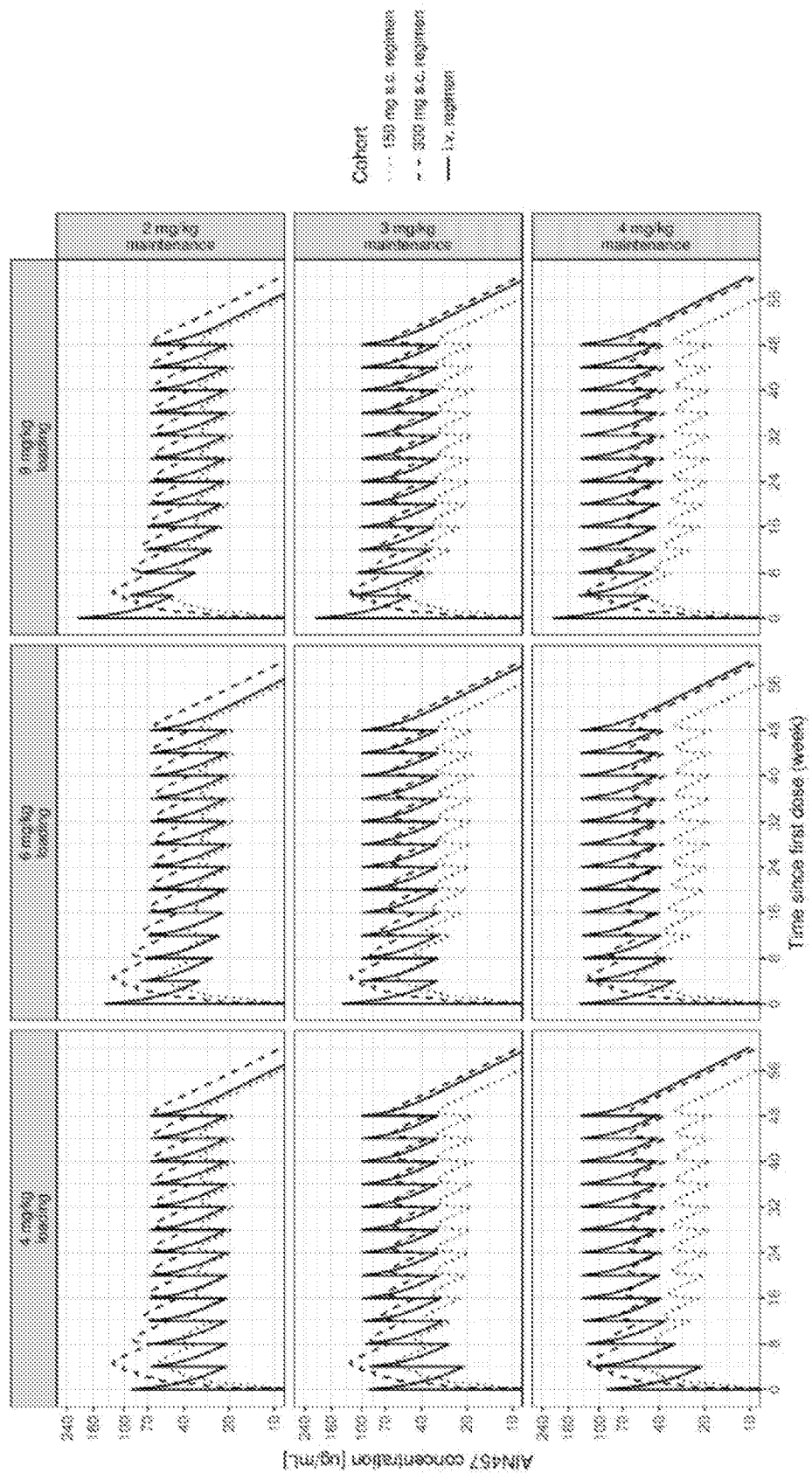
FIG. 2 Median concentration profiles – Psoriatic Arthritis

```
                              SEQUENCE LISTING

<160> NUMBER OF SEQ ID NOS: 21

<210> SEQ ID NO 1
<211> LENGTH: 5
<212> TYPE: PRT
<213> ORGANISM: artificial
<220> FEATURE:
<223> OTHER INFORMATION: CDR1 = hypervariable region 1 of heavy chain of
      AIN457

<400> SEQUENCE: 1

Asn Tyr Trp Met Asn
1               5

<210> SEQ ID NO 2
<211> LENGTH: 17
<212> TYPE: PRT
<213> ORGANISM: ARTIFICIAL
<220> FEATURE:
<223> OTHER INFORMATION: CDR2 = hypervariable region 2 of heavy chain of
      AIN457

<400> SEQUENCE: 2

Ala Ile Asn Gln Asp Gly Ser Glu Lys Tyr Tyr Val Gly Ser Val Lys
1               5                   10                  15

Gly
```

```
<210> SEQ ID NO 3
<211> LENGTH: 18
<212> TYPE: PRT
<213> ORGANISM: ARTIFICIAL
<220> FEATURE:
<223> OTHER INFORMATION: CDR3 = hypervariable region 3 of heavy chain of
      AIN457

<400> SEQUENCE: 3

Asp Tyr Tyr Asp Ile Leu Thr Asp Tyr Tyr Ile His Tyr Trp Tyr Phe
1               5                   10                  15

Asp Leu

<210> SEQ ID NO 4
<211> LENGTH: 12
<212> TYPE: PRT
<213> ORGANISM: ARTIFICIAL
<220> FEATURE:
<223> OTHER INFORMATION: CDR1' = hypervariable region 1 of light chain
      of AIN457

<400> SEQUENCE: 4

Arg Ala Ser Gln Ser Val Ser Ser Ser Tyr Leu Ala
1               5                   10

<210> SEQ ID NO 5
<211> LENGTH: 7
<212> TYPE: PRT
<213> ORGANISM: ARTIFICIAL
<220> FEATURE:
<223> OTHER INFORMATION: CDR2' = hypervariable region 2 of light chain
      AIN457

<400> SEQUENCE: 5

Gly Ala Ser Ser Arg Ala Thr
1               5

<210> SEQ ID NO 6
<211> LENGTH: 9
<212> TYPE: PRT
<213> ORGANISM: ARTIFICIAL
<220> FEATURE:
<223> OTHER INFORMATION: CDR3' = hypervariable region 3 of light chain
      AIN457

<400> SEQUENCE: 6

Gln Gln Tyr Gly Ser Ser Pro Cys Thr
1               5

<210> SEQ ID NO 7
<211> LENGTH: 381
<212> TYPE: DNA
<213> ORGANISM: HOMO SAPIENS
<220> FEATURE:
<221> NAME/KEY: CDS
<222> LOCATION: (1)..(381)

<400> SEQUENCE: 7 gag gtg cag ttg gtg gag tct ggg gga ggc ttg gtc cag cct ggg ggg     48
Glu Val Gln Leu Val Glu Ser Gly Gly Gly Leu Val Gln Pro Gly Gly
1               5                   10                  15 tcc ctg aga ctc tcc tgt gca gcc tct gga ttc acc ttt agt aac tat     96
Ser Leu Arg Leu Ser Cys Ala Ala Ser Gly Phe Thr Phe Ser Asn Tyr
                20                  25                  30 tgg atg aac tgg gtc cgc cag gct cca ggg aaa ggg ctg gag tgg gtg    144
Trp Met Asn Trp Val Arg Gln Ala Pro Gly Lys Gly Leu Glu Trp Val
            35                  40                  45
```

```
gcc gcc ata aac caa gat gga agt gag aaa tac tat gtg ggc tct gtg      192
Ala Ala Ile Asn Gln Asp Gly Ser Glu Lys Tyr Tyr Val Gly Ser Val
        50                  55                  60 aag ggc cga ttc acc atc tcc aga gac aac gcc aag aac tca ctg tat      240
Lys Gly Arg Phe Thr Ile Ser Arg Asp Asn Ala Lys Asn Ser Leu Tyr
 65                  70                  75                  80 ctg caa atg aac agc ctg aga gtc gag gac acg gct gtg tat tac tgt      288
Leu Gln Met Asn Ser Leu Arg Val Glu Asp Thr Ala Val Tyr Tyr Cys
                85                  90                  95 gtg agg gac tat tac gat att ttg acc gat tat tac atc cac tat tgg      336
Val Arg Asp Tyr Tyr Asp Ile Leu Thr Asp Tyr Tyr Ile His Tyr Trp
            100                 105                 110 tac ttc gat ctc tgg ggc cgt ggc acc ctg gtc act gtc tcc tca          381
Tyr Phe Asp Leu Trp Gly Arg Gly Thr Leu Val Thr Val Ser Ser
        115                 120                 125

<210> SEQ ID NO 8
<211> LENGTH: 127
<212> TYPE: PRT
<213> ORGANISM: HOMO SAPIENS

<400> SEQUENCE: 8

Glu Val Gln Leu Val Glu Ser Gly Gly Gly Leu Val Gln Pro Gly Gly
 1               5                   10                  15

Ser Leu Arg Leu Ser Cys Ala Ala Ser Gly Phe Thr Phe Ser Asn Tyr
            20                  25                  30

Trp Met Asn Trp Val Arg Gln Ala Pro Gly Lys Gly Leu Glu Trp Val
        35                  40                  45

Ala Ala Ile Asn Gln Asp Gly Ser Glu Lys Tyr Tyr Val Gly Ser Val
    50                  55                  60

Lys Gly Arg Phe Thr Ile Ser Arg Asp Asn Ala Lys Asn Ser Leu Tyr
 65                  70                  75                  80

Leu Gln Met Asn Ser Leu Arg Val Glu Asp Thr Ala Val Tyr Tyr Cys
                85                  90                  95

Val Arg Asp Tyr Tyr Asp Ile Leu Thr Asp Tyr Tyr Ile His Tyr Trp
            100                 105                 110

Tyr Phe Asp Leu Trp Gly Arg Gly Thr Leu Val Thr Val Ser Ser
        115                 120                 125

<210> SEQ ID NO 9
<211> LENGTH: 327
<212> TYPE: DNA
<213> ORGANISM: HOMO SAPIENS
<220> FEATURE:
<221> NAME/KEY: CDS
<222> LOCATION: (1)..(327)

<400> SEQUENCE: 9 gaa att gtg ttg acg cag tct cca ggc acc ctg tct ttg tct cca ggg       48
Glu Ile Val Leu Thr Gln Ser Pro Gly Thr Leu Ser Leu Ser Pro Gly
 1               5                   10                  15 gaa aga gcc acc ctc tcc tgc agg gcc agt cag agt gtt agc agc agc       96
Glu Arg Ala Thr Leu Ser Cys Arg Ala Ser Gln Ser Val Ser Ser Ser
            20                  25                  30 tac tta gcc tgg tac cag cag aaa cct ggc cag gct ccc agg ctc ctc      144
Tyr Leu Ala Trp Tyr Gln Gln Lys Pro Gly Gln Ala Pro Arg Leu Leu
        35                  40                  45 atc tat ggt gca tcc agc agg gcc act ggc atc cca gac agg ttc agt      192
Ile Tyr Gly Ala Ser Ser Arg Ala Thr Gly Ile Pro Asp Arg Phe Ser
    50                  55                  60
```

```
ggc agt ggg tct ggg aca gac ttc act ctc acc atc agc aga ctg gag     240
Gly Ser Gly Ser Gly Thr Asp Phe Thr Leu Thr Ile Ser Arg Leu Glu
 65                  70                  75                  80 cct gaa gat ttt gca gtg tat tac tgt cag cag tat ggt agc tca ccg     288
Pro Glu Asp Phe Ala Val Tyr Tyr Cys Gln Gln Tyr Gly Ser Ser Pro
                 85                  90                  95 tgc acc ttc ggc caa ggg aca cga ctg gag att aaa cga                 327
Cys Thr Phe Gly Gln Gly Thr Arg Leu Glu Ile Lys Arg
            100                 105
```

<210> SEQ ID NO 10
<211> LENGTH: 109
<212> TYPE: PRT
<213> ORGANISM: HOMO SAPIENS

<400> SEQUENCE: 10

```
Glu Ile Val Leu Thr Gln Ser Pro Gly Thr Leu Ser Leu Ser Pro Gly
 1               5                  10                  15

Glu Arg Ala Thr Leu Ser Cys Arg Ala Ser Gln Ser Val Ser Ser Ser
                 20                  25                  30

Tyr Leu Ala Trp Tyr Gln Gln Lys Pro Gly Gln Ala Pro Arg Leu Leu
             35                  40                  45

Ile Tyr Gly Ala Ser Ser Arg Ala Thr Gly Ile Pro Asp Arg Phe Ser
         50                  55                  60

Gly Ser Gly Ser Gly Thr Asp Phe Thr Leu Thr Ile Ser Arg Leu Glu
 65                  70                  75                  80

Pro Glu Asp Phe Ala Val Tyr Tyr Cys Gln Gln Tyr Gly Ser Ser Pro
                 85                  90                  95

Cys Thr Phe Gly Gln Gly Thr Arg Leu Glu Ile Lys Arg
            100                 105
```

<210> SEQ ID NO 11
<211> LENGTH: 10
<212> TYPE: PRT
<213> ORGANISM: artificial
<220> FEATURE:
<223> OTHER INFORMATION: CDR1-x = hypervariable domain x of heavy chain
      of AIN457

<400> SEQUENCE: 11

```
Gly Phe Thr Phe Ser Asn Tyr Trp Met Asn
 1               5                  10
```

<210> SEQ ID NO 12
<211> LENGTH: 11
<212> TYPE: PRT
<213> ORGANISM: artificial
<220> FEATURE:
<223> OTHER INFORMATION: CDR2-x = hypervariable domain of heavy chain x
      of AIN457

<400> SEQUENCE: 12

```
Ala Ile Asn Gln Asp Gly Ser Glu Lys Tyr Tyr
 1               5                  10
```

<210> SEQ ID NO 13
<211> LENGTH: 23
<212> TYPE: PRT
<213> ORGANISM: ARTIFICIAL
<220> FEATURE:
<223> OTHER INFORMATION: CDR3-x = hypervariable domain x of heavy chain
      AIN457

<400> SEQUENCE: 13

Cys Val Arg Asp Tyr Tyr Asp Ile Leu Thr Asp Tyr Tyr Ile His Tyr
1               5                   10                  15

Trp Tyr Phe Asp Leu Trp Gly
            20

<210> SEQ ID NO 14
<211> LENGTH: 215
<212> TYPE: PRT
<213> ORGANISM: homo sapiens

<400> SEQUENCE: 14

Glu Ile Val Leu Thr Gln Ser Pro Gly Thr Leu Ser Leu Ser Pro Gly
1               5                   10                  15

Glu Arg Ala Thr Leu Ser Cys Arg Ala Ser Gln Ser Val Ser Ser Ser
            20                  25                  30

Tyr Leu Ala Trp Tyr Gln Gln Lys Pro Gly Gln Ala Pro Arg Leu Leu
        35                  40                  45

Ile Tyr Gly Ala Ser Ser Arg Ala Thr Gly Ile Pro Asp Arg Phe Ser
    50                  55                  60

Gly Ser Gly Ser Gly Thr Asp Phe Thr Leu Thr Ile Ser Arg Leu Glu
65                  70                  75                  80

Pro Glu Asp Phe Ala Val Tyr Tyr Cys Gln Gln Tyr Gly Ser Ser Pro
                85                  90                  95

Cys Thr Phe Gly Gln Gly Thr Arg Leu Glu Ile Lys Arg Thr Val Ala
            100                 105                 110

Ala Pro Ser Val Phe Ile Phe Pro Pro Ser Asp Glu Gln Leu Lys Ser
        115                 120                 125

Gly Thr Ala Ser Val Val Cys Leu Leu Asn Asn Phe Tyr Pro Arg Glu
    130                 135                 140

Ala Lys Val Gln Trp Lys Val Asp Asn Ala Leu Gln Ser Gly Asn Ser
145                 150                 155                 160

Gln Glu Ser Val Thr Glu Gln Asp Ser Lys Asp Ser Thr Tyr Ser Leu
                165                 170                 175

Ser Ser Thr Leu Thr Leu Ser Lys Ala Asp Tyr Glu Lys His Lys Val
            180                 185                 190

Tyr Ala Cys Glu Val Thr His Gln Gly Leu Ser Ser Pro Val Thr Lys
        195                 200                 205

Ser Phe Asn Arg Gly Glu Cys
    210                 215

<210> SEQ ID NO 15
<211> LENGTH: 457
<212> TYPE: PRT
<213> ORGANISM: homo sapiens

<400> SEQUENCE: 15

Glu Val Gln Leu Val Glu Ser Gly Gly Gly Leu Val Gln Pro Gly Gly
1               5                   10                  15

Ser Leu Arg Leu Ser Cys Ala Ala Ser Gly Phe Thr Phe Ser Asn Tyr
            20                  25                  30

Trp Met Asn Trp Val Arg Gln Ala Pro Gly Lys Gly Leu Glu Trp Val
        35                  40                  45

Ala Ala Ile Asn Gln Asp Gly Ser Glu Lys Tyr Tyr Val Gly Ser Val
    50                  55                  60

Lys Gly Arg Phe Thr Ile Ser Arg Asp Asn Ala Lys Asn Ser Leu Tyr

```
            65                  70                  75                  80
Leu Gln Met Asn Ser Leu Arg Val Glu Asp Thr Ala Val Tyr Tyr Cys
                85                  90                  95

Val Arg Asp Tyr Tyr Asp Ile Leu Thr Asp Tyr Tyr Ile His Tyr Trp
            100                 105                 110

Tyr Phe Asp Leu Trp Gly Arg Gly Thr Leu Val Thr Val Ser Ser Ala
            115                 120                 125

Ser Thr Lys Gly Pro Ser Val Phe Pro Leu Ala Pro Ser Ser Lys Ser
        130                 135                 140

Thr Ser Gly Gly Thr Ala Ala Leu Gly Cys Leu Val Lys Asp Tyr Phe
145                 150                 155                 160

Pro Glu Pro Val Thr Val Ser Trp Asn Ser Gly Ala Leu Thr Ser Gly
                165                 170                 175

Val His Thr Phe Pro Ala Val Leu Gln Ser Ser Gly Leu Tyr Ser Leu
            180                 185                 190

Ser Ser Val Val Thr Val Pro Ser Ser Ser Leu Gly Thr Gln Thr Tyr
        195                 200                 205

Ile Cys Asn Val Asn His Lys Pro Ser Asn Thr Lys Val Asp Lys Arg
    210                 215                 220

Val Glu Pro Lys Ser Cys Asp Lys Thr His Thr Cys Pro Pro Cys Pro
225                 230                 235                 240

Ala Pro Glu Leu Leu Gly Gly Pro Ser Val Phe Leu Phe Pro Pro Lys
                245                 250                 255

Pro Lys Asp Thr Leu Met Ile Ser Arg Thr Pro Glu Val Thr Cys Val
            260                 265                 270

Val Val Asp Val Ser His Glu Asp Pro Glu Val Lys Phe Asn Trp Tyr
        275                 280                 285

Val Asp Gly Val Glu Val His Asn Ala Lys Thr Lys Pro Arg Glu Glu
    290                 295                 300

Gln Tyr Asn Ser Thr Tyr Arg Val Val Ser Val Leu Thr Val Leu His
305                 310                 315                 320

Gln Asp Trp Leu Asn Gly Lys Glu Tyr Lys Cys Lys Val Ser Asn Lys
                325                 330                 335

Ala Leu Pro Ala Pro Ile Glu Lys Thr Ile Ser Lys Ala Lys Gly Gln
            340                 345                 350

Pro Arg Glu Pro Gln Val Tyr Thr Leu Pro Pro Ser Arg Glu Glu Met
        355                 360                 365

Thr Lys Asn Gln Val Ser Leu Thr Cys Leu Val Lys Gly Phe Tyr Pro
    370                 375                 380

Ser Asp Ile Ala Val Glu Trp Glu Ser Asn Gly Gln Pro Glu Asn Asn
385                 390                 395                 400

Tyr Lys Thr Thr Pro Pro Val Leu Asp Ser Asp Gly Ser Phe Phe Leu
                405                 410                 415

Tyr Ser Lys Leu Thr Val Asp Lys Ser Arg Trp Gln Gln Gly Asn Val
            420                 425                 430

Phe Ser Cys Ser Val Met His Glu Ala Leu His Asn His Tyr Thr Gln
        435                 440                 445

Lys Ser Leu Ser Leu Ser Pro Gly Lys
    450                 455

<210> SEQ ID NO 16
<211> LENGTH: 7
<212> TYPE: PRT
<213> ORGANISM: artificial
```

```
<220> FEATURE:
<223> OTHER INFORMATION: IMGT LCDR1

<400> SEQUENCE: 16

Gln Ser Val Ser Ser Tyr
1               5

<210> SEQ ID NO 17
<211> LENGTH: 3
<212> TYPE: PRT
<213> ORGANISM: artificial
<220> FEATURE:
<223> OTHER INFORMATION: IMGT LCDR2

<400> SEQUENCE: 17

Gly Ala Ser
1

<210> SEQ ID NO 18
<211> LENGTH: 9
<212> TYPE: PRT
<213> ORGANISM: Artificial
<220> FEATURE:
<223> OTHER INFORMATION: IMGT LCDR3

<400> SEQUENCE: 18

Gln Gln Tyr Gly Ser Ser Pro Cys Thr
1               5

<210> SEQ ID NO 19
<211> LENGTH: 8
<212> TYPE: PRT
<213> ORGANISM: artificial
<220> FEATURE:
<223> OTHER INFORMATION: IMGT HCDR1

<400> SEQUENCE: 19

Gly Phe Thr Phe Ser Asn Tyr Trp
1               5

<210> SEQ ID NO 20
<211> LENGTH: 8
<212> TYPE: PRT
<213> ORGANISM: Artificial
<220> FEATURE:
<223> OTHER INFORMATION: IMGT HCDR2

<400> SEQUENCE: 20

Ile Asn Gln Asp Gly Ser Glu Lys
1               5

<210> SEQ ID NO 21
<211> LENGTH: 20
<212> TYPE: PRT
<213> ORGANISM: Artificial
<220> FEATURE:
<223> OTHER INFORMATION: IMGT HCDR3

<400> SEQUENCE: 21

Val Arg Asp Tyr Tyr Asp Ile Leu Thr Asp Tyr Tyr Ile His Tyr Trp
1               5                   10                  15
Tyr Phe Asp Leu
            20
```

METHODS OF TREATING AUTOIMMUNE DISEASES USING INTERLEUKIN-17 (IL-17) ANTAGONISTS

RELATED APPLICATIONS

The present disclosure claims priority to U.S. Provisional Appln. 62/903,070, filed Sep. 20, 2019 and U.S. Provisional Appln. 62/911,394, filed Oct. 7, 2019, the contents of which are hereby incorporated by reference in their entirety.

TECHNICAL FIELD

The present disclosure relates to methods for treating patients having autoimmune diseases, e.g., psoriatic arthritis (PsA) and axial spondyloarthritis (axSpA) patients, and, in some cases, inhibiting the progression of structural joint damage in these patients, using IL-17 antagonists, e.g., secukinumab.

BACKGROUND OF THE DISCLOSURE

Autoimmune diseases occur as a result of the immune system attacking a patient's own organs, tissues, and cells. Common autoimmune diseases include, e.g., psoriasis, type 1 diabetes, rheumatoid arthritis, inflammatory bowel disease, Psoriatic arthritis (PsA), and axial spondyloarthritis (axSpA).

PsA is a chronic debilitating disease afflicting peripheral, synovial, axial, and entheseal structures, and is associated with skin psoriasis and nail involvement. PsA is associated with significant morbidity and disability, and thus constitutes a major socioeconomic burden.

axSpA is a type of spondyloarthritis mainly affecting the axial skeleton characterized by spinal inflammation and inflammatory back pain. axSpA is among the most common chronic inflammatory joint disorders, with recent estimates of prevalence in Caucasian populations in the range of 1-2% (Kiltz, et al Clin Exp Rheumat (2017) 35(Suppl 107):S102-S107). Patients with chronic back pain (onset before 45 years of age) are classified as having axSpA if they fulfill either the clinical arm or the imaging arm of the Assessment of Spondyloarthritis International Society (ASAS) classification criteria (Rudwaleit et al (2009) Ann Rheum Dis; 68:777-83).

Based on the presence or absence of sacroiliitis on conventional X-ray radiographs, axSpA patients are further classified into two conditions: non-radiographic axial spondyloarthritis (nr-axSpA) and ankylosing spondylitis (AS). Patients with evidence of sacroiliitis on X-ray fulfilling the 1984 modified New York diagnostic criteria (van der Linden et al (1984) Arthritis Rheum; 27:361-8) are classified as having AS, whereas patients who do not show sacroiliitis on X-ray but may show evidence of sacroiliitis on MRI are classified as having nr-axSpA.

AS is characterized mainly by involvement of the axial skeleton and sacroiliac (SI) joints, but peripheral joints, entheses and extra-articular organs are also affected. A significant proportion of AS patients may present with associated extra-articular manifestations such as uveitis, psoriasis, inflammatory bowel disease (IBD), cardiovascular and pulmonary abnormalities. Generalized osteoporosis, as well as regional osteopenia are common in AS patients and predispose them to non-traumatic fractures, despite a predominantly younger age and male gender distribution. The presence of the Human Leukocyte Antigen (HLA)-B27 is strongly associated with AS; 90-95% of patients with AS who have European ancestry carry this marker. AS affects up to 1.1% of the population, is associated with significant morbidity and disability, and thus constitutes a major socioeconomic burden.

Studies and registry data have shown that nr-axSpA patients have similar levels of disease activity, pain, and health-related quality of life impairment as observed in AS patients (Wallis et al (2013) J Rheumatol; 40:2038-41). Disease parameters and response rates to treatment with TNF-α antagonists are similar in patients with AS and nr-axSpA, supporting the concept that axSpA may be a disease with distinct stages (Song et al (2013) Ann Rheum Dis; 72:823-5). Furthermore, with a longer duration of symptoms, most patients who start with nr-axSpA ultimately develop radiographic evidence consistent with AS. In an investigation of 329 patients with axSpA, evidence of radiographic sacroiliitis was present in 40-86% of subjects, in accordance with the duration of symptoms (<10 to >20 years) (Said-Nahal et al (2000) Arthritis Rheum; 43(6): 1356-65), with many nr-axSpA patients progressing to AS over time. While nr-axSpA and AS may be considered as two stages of one disease (axSpA), there are, nonetheless, patients with an abortive course of the disease who remain at the non-radiographic stage without progression to established AS (10-15%) (Sieper and van der Heijde (2013) Arthritis Rheum; 65:543-51; Poddubnyy (2013) Ther. Adv. Musculoskelet. Dis. 5:1: 45-54). Thus, while nr-axSpA may cause much pain, it may never lead to structural changes of the axial skeleton (Baraliakos X, Braun J (2015) RMD Open; 1(Suppl. 1):e000053)).

Non-steroidal anti-inflammatory drugs (NSAIDs) are considered first-line therapy for all patients with axSpA. Traditional disease-modifying antirheumatic drugs (DMARDs) such as methotrexate and sulfasalazine are not effective in the treatment of axSpA. Anti-TNF agents are approved therapies for patients with AS who continue to have active disease despite NSAIDs. In Europe, several anti-TNF agents are also approved for nr-axSpA. However, more than 60% of nr-axSpA patients treated with adalimumab or etanercept did not achieve an ASAS40 response in randomized clinical trials (Sieper et al (2013) Ann Rheum Dis; 72:815-22; Dougados et al (2014) Arthritis Rheum; 66:2091-2102). Moreover, TNF blockade does not result in long-term remission in axSpA, and responders usually relapse within a few weeks after interruption of treatment (Baraliakos et al (2005) Arthritis Res. Ther.; 7: R439-R444). While effective in treating the inflammatory symptoms, TNF antagonists do not prevent structural damage of the joints in axSpA, which was primarily studied in AS (van der Heijde et al (2008a), Arthritis Rheum; 58:3063-70; van der Heijde et al (2008b), Arthritis Rheum; 58:1324-31).

SUMMARY OF THE DISCLOSURE

Secukinumab, under the brand name Cosentyx®, was first registered in Japan on Dec. 26, 2014. Cosentyx® has been approved for treating psoriasis, psoriatic arthritis (PsA) and AS in numerous countries. The approved posology for psoriasis and PsA is a fully-subcutaneous (SC) dosing regimen, using induction administration of 150 mg or 300 mg antibody during week 0, 1, 2, 3, and 4, and then monthly (every four weeks [Q4W]) administration thereafter. For AS, the approved posology is a fully-SC regimen using an induction administration of 150 mg antibody during week 0, 1, 2, 3, and 4, and then monthly (every four weeks [Q4W]) administration thereafter. Approval for using the 300 mg dose in AS has also been sought. A study evaluating the efficacy and safety of SC secukinumab 150 mg Q4W dose vs. placebo (CAIN475H2315) in patients with nr-axSpA is currently ongoing.

While SC administration of a fixed dose of secukinumab is convenient for patients, it does not provide the flexibility of weight-based administration, which is desirable for heavier patients. IV-based regimens will also benefit patients requiring faster response due to high disease activity, as well as patients that cannot tolerate SC-based therapy (e.g., due to injection site pain, fear of injection, etc.). Moreover, the currently-approved regimen for treating PsA and AS, which is also the regimen tested in CAIN475H2315 (nr-axSpA patients), requires four initial weekly administrations (week 0, 1, 2, 3, and 4) during the induction period, which may be considered inconvenient as regards to frequency. Hence, there is a need to develop dosing regimens using an IL-17 antagonist (e.g., secukinumab) to treat patients having PsA or axSpA that provides patients with flexible dosing and fewer induction administrations, while maintaining a favorable safety/benefit ratio.

Accordingly, disclosed herein are methods of treating a patient having psoriatic arthritis (PsA) or axial spondyloarthritis (axSpA) (i.e., non-radiographic axial spondyloarthritis (nr-axSpA) and ankylosing spondylitis (AS), e.g., nr-axSpA, e.g., AS), comprising intravenously (IV) administering a dose of about 4 mg/kg-about 9 mg/kg (preferably about 6 mg/kg) of an IL-17 antagonist (e.g., secukinumab) to the patient once during week 0, and thereafter, administering about 2-about 4 mg/kg (preferably about 3 mg/kg) of the IL-17 antagonist (e.g., secukinumab) to the patient every 4 weeks (monthly), beginning during week 4. Additionally disclosed herein are methods of inhibiting the progression of structural damage in a patient having PsA or axSpA (i.e., nr-axSpA and AS, e.g., nr-axSpA, e.g., AS), comprising intravenously (IV) administering a dose of about 4 mg/kg-about 9 mg/kg (preferably about 6 mg/kg) of an IL-17 antagonist (e.g., secukinumab) to the patient once during week 0, and thereafter, administering about 2 mg/kg-about 4 mg/kg (preferably about 3 mg/kg) of the IL-17 antagonist (e.g., secukinumab) to the patient every 4 weeks (monthly), beginning during week 4.

In some embodiments, the patient is a male or female patient having nr-axSpA fulfilling the ASAS classification criteria for axSpA plus an abnormal CRP and/or MRI, with no radiographic evidence of changes in the sacroiliac joints that would meet the modified New York criteria for AS and with active disease despite current or previous treatment with an NSAID, non-biological DMARD, and/or anti-TNF-alpha therapy.

In some embodiments of the disclosed uses, methods and kits, the IL-17 antagonist is an IL-17 antibody or antigen-binding fragment thereof. In some embodiments of the disclosed uses, methods and kits, the IL-17 antibody or antigen-binding fragment thereof is selected from the group consisting of: a) an IL-17 antibody or antigen-binding fragment thereof that binds to an epitope of IL-17 comprising Leu74, Tyr85, His86, Met87, Asn88, Val124, Thr125, Pro126, Ile127, Val128, His129; b) an IL-17 antibody or antigen-binding fragment thereof that binds to an epitope of IL-17 comprising Tyr43, Tyr44, Arg46, Ala79, Asp80; c) an IL-17 antibody or antigen-binding fragment thereof that binds to an epitope of an IL-17 homodimer having two mature IL-17 protein chains, said epitope comprising Leu74, Tyr85, His86, Met87, Asn88, Val124, Thr125, Pro126, Ile127, Val128, His129 on one chain and Tyr43, Tyr44, Arg46, Ala79, Asp80 on the other chain; d) an IL-17 antibody or antigen-binding fragment thereof that binds to an epitope of an IL-17 homodimer having two mature IL-17 protein chains, said epitope comprising Leu74, Tyr85, His86, Met87, Asn88, Val124, Thr125, Pro126, Ile127, Val128, His129 on one chain and Tyr43, Tyr44, Arg46, Ala79, Asp80 on the other chain, wherein the IL-17 antibody or antigen-binding fragment thereof has a $K_D$ of about 100-200 pM, and wherein the IL-17 antibody or antigen-binding fragment thereof has an in vivo half-life of about 23 to about 35 days; and e) an IL-17 antibody or antigen-binding fragment thereof comprising: i) an immunoglobulin heavy chain variable domain ($V_H$) comprising the amino acid sequence set forth as SEQ ID NO:8; ii) an immunoglobulin light chain variable domain ($V_L$) comprising the amino acid sequence set forth as SEQ ID NO: 10; iii) an immunoglobulin $V_H$ domain comprising the amino acid sequence set forth as SEQ ID NO:8 and an immunoglobulin $V_L$ domain comprising the amino acid sequence set forth as SEQ ID NO: 10; iv) an immunoglobulin $V_H$ domain comprising the hypervariable regions set forth as SEQ ID NO: 1, SEQ ID NO:2, and SEQ ID NO: 3; v) an immunoglobulin $V_L$ domain comprising the hypervariable regions set forth as SEQ ID NO:4, SEQ ID NO:5 and SEQ ID NO:6; vi) an immunoglobulin $V_H$ domain comprising the hypervariable regions set forth as SEQ ID NO:11, SEQ ID NO:12 and SEQ ID NO: 13; vii) an immunoglobulin $V_H$ domain comprising the hypervariable regions set forth as SEQ ID NO: 1, SEQ ID NO:2, and SEQ ID NO:3 and an immunoglobulin $V_L$ domain comprising the hypervariable regions set forth as SEQ ID NO:4, SEQ ID NO:5 and SEQ ID NO: 6; viii) an immunoglobulin $V_H$ domain comprising the hypervariable regions set forth as SEQ ID NO: 11, SEQ ID NO: 12 and SEQ ID NO:13 and an immunoglobulin $V_L$ domain comprising the hypervariable regions set forth as SEQ ID NO:4, SEQ ID NO:5 and SEQ ID NO: 6; ix) an immunoglobulin light chain comprising the amino acid sequence set forth as SEQ ID NO: 14; x) an immunoglobulin heavy chain comprising the amino acid sequence set forth as SEQ ID NO:15; or xi) an immunoglobulin light chain comprising the amino acid sequence set forth as SEQ ID NO:14 and an immunoglobulin heavy chain comprising the amino acid sequence set forth as SEQ ID NO:15. In preferred embodiments of the disclosed uses, methods and kits, the IL-17 antibody or antigen-binding fragment thereof is secukinumab.

In preferred embodiments of the disclosed uses, methods and kits, the disorder to be treated is PsA. In preferred embodiments of the disclosed uses, methods and kits, the disorder to be treated is ax-SpA. In some embodiments of the disclosed uses, methods and kits, the ax-SpA is nr-axSpA. In other embodiments of the disclosed uses, methods and kits, the ax-SpA is AS.

BRIEF DESCRIPTION OF THE FIGURES

FIG. 1 and FIG. 2 show modelled secukinumab concentrations, in AS and PsA patients respectively, over a 64-week period for IV q4w (monthly) regimens with one 4, 6, or 9 mg/kg loading dose followed by 2, 3, or 4 mg/kg q4w from Week 4, compared to SC regimens (150 mg or 300 mg SC weekly during week 0, 1, 2, 3, and 4 and then q4w from Week 8).

DETAILED DESCRIPTION OF THE DISCLOSURE

Figure 3A:
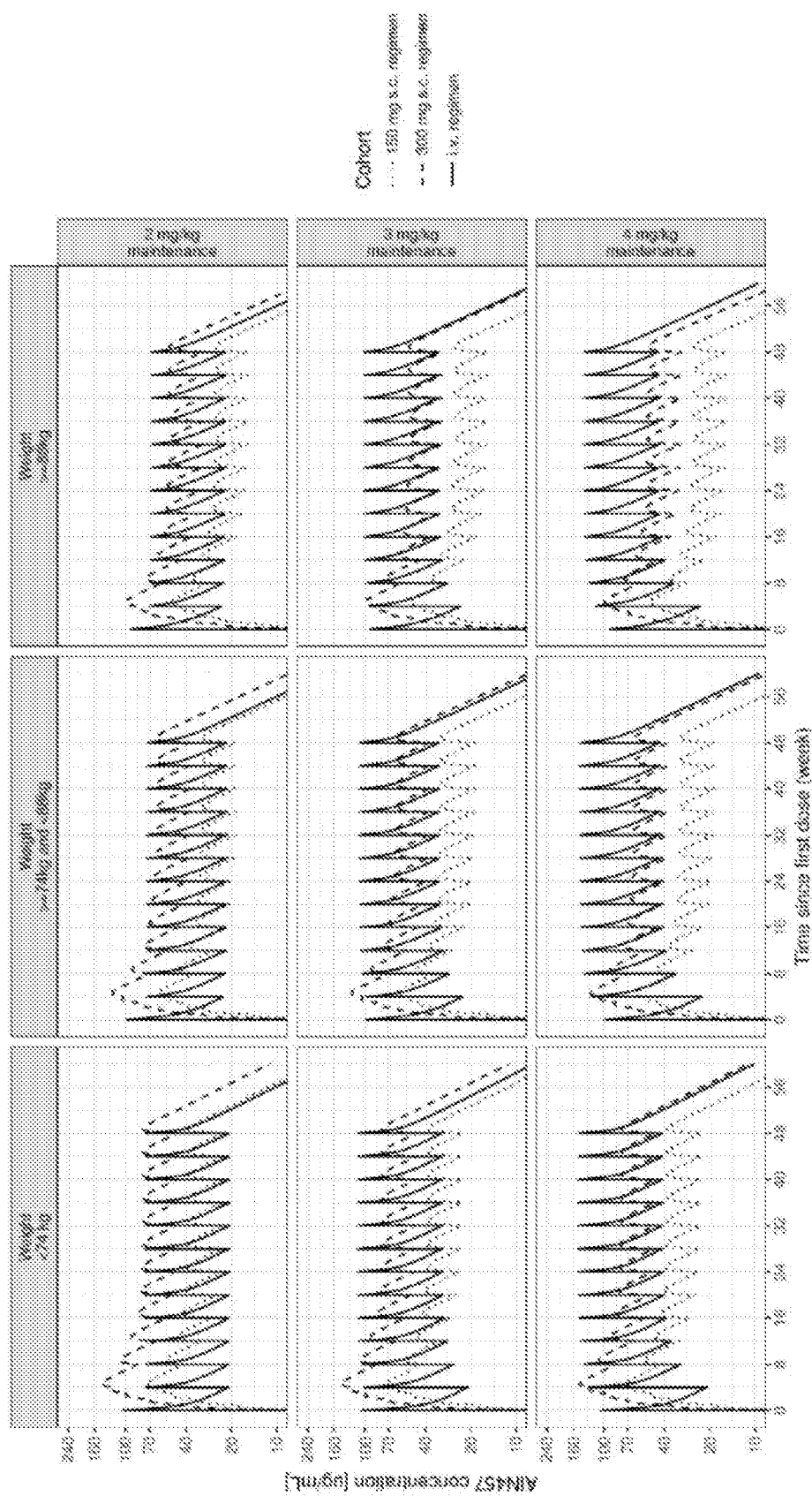
FIG. 3 and FIG. 4 show modelled secukinumab concentrations, in AS and PsA patients respectively, by weight category (<74 kg; >74 to <88 kg; >88 kg) over a 64-week period for IV q4w (monthly) regimens with one 4 mg/kg (FIG. 3A, FIG. 4A), 6 mg/kg (FIG. 3B, FIG. 4B), or 9 mg/kg (FIG. 3C, FIG. 4C) loading dose followed by 2, 3, or 4 mg/kg q4w from Week 4, compared to SC regimens (150 mg or 300 mg SC weekly during week 0, 1, 2, 3, and 4 and then q4w from Week 8). Subparts A-C of each of FIGS. 3 and 4 were split solely for display purposes.
Figure 3B:
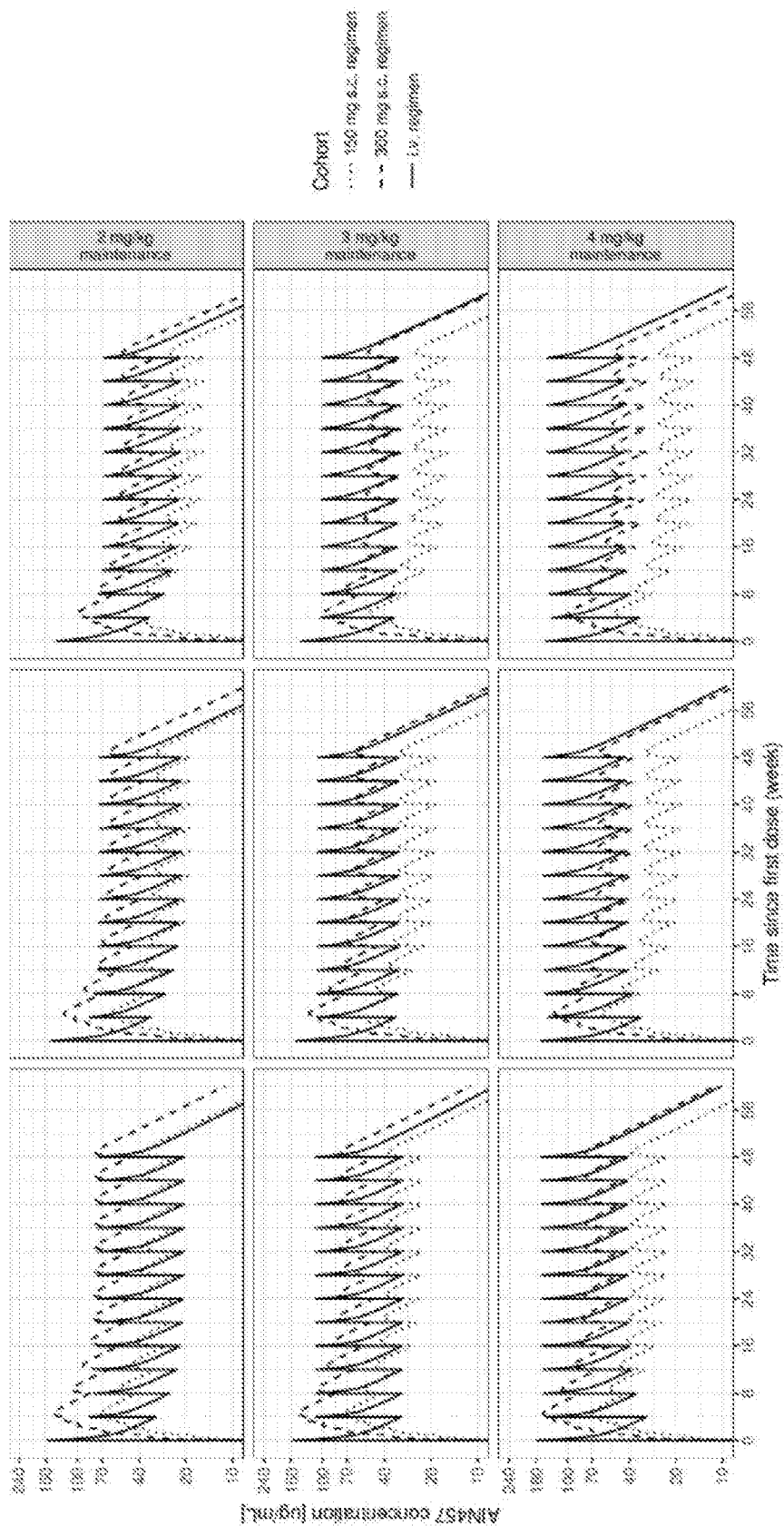
Figure 3C:
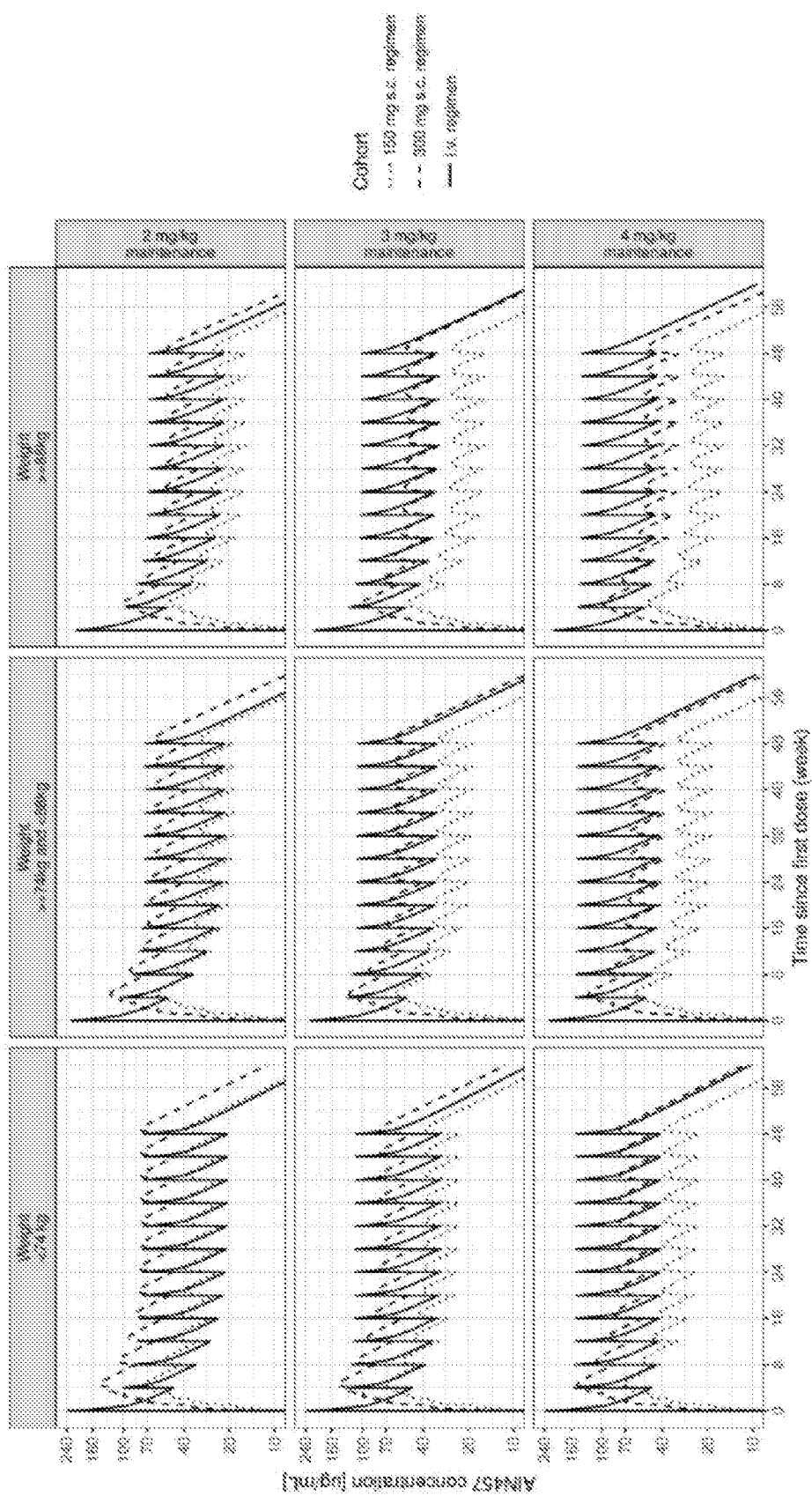
Figure 4A:
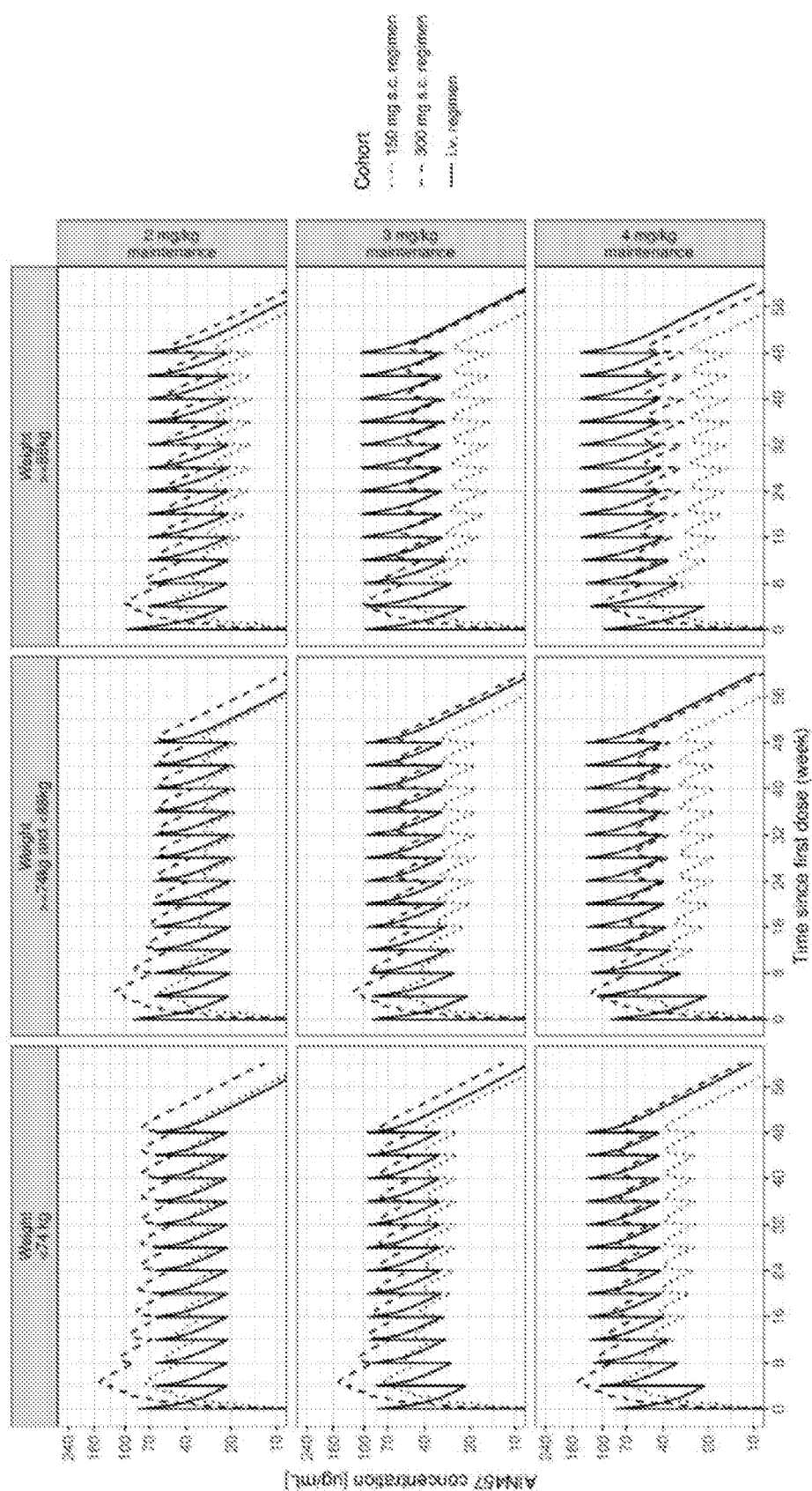
Figure 4B:
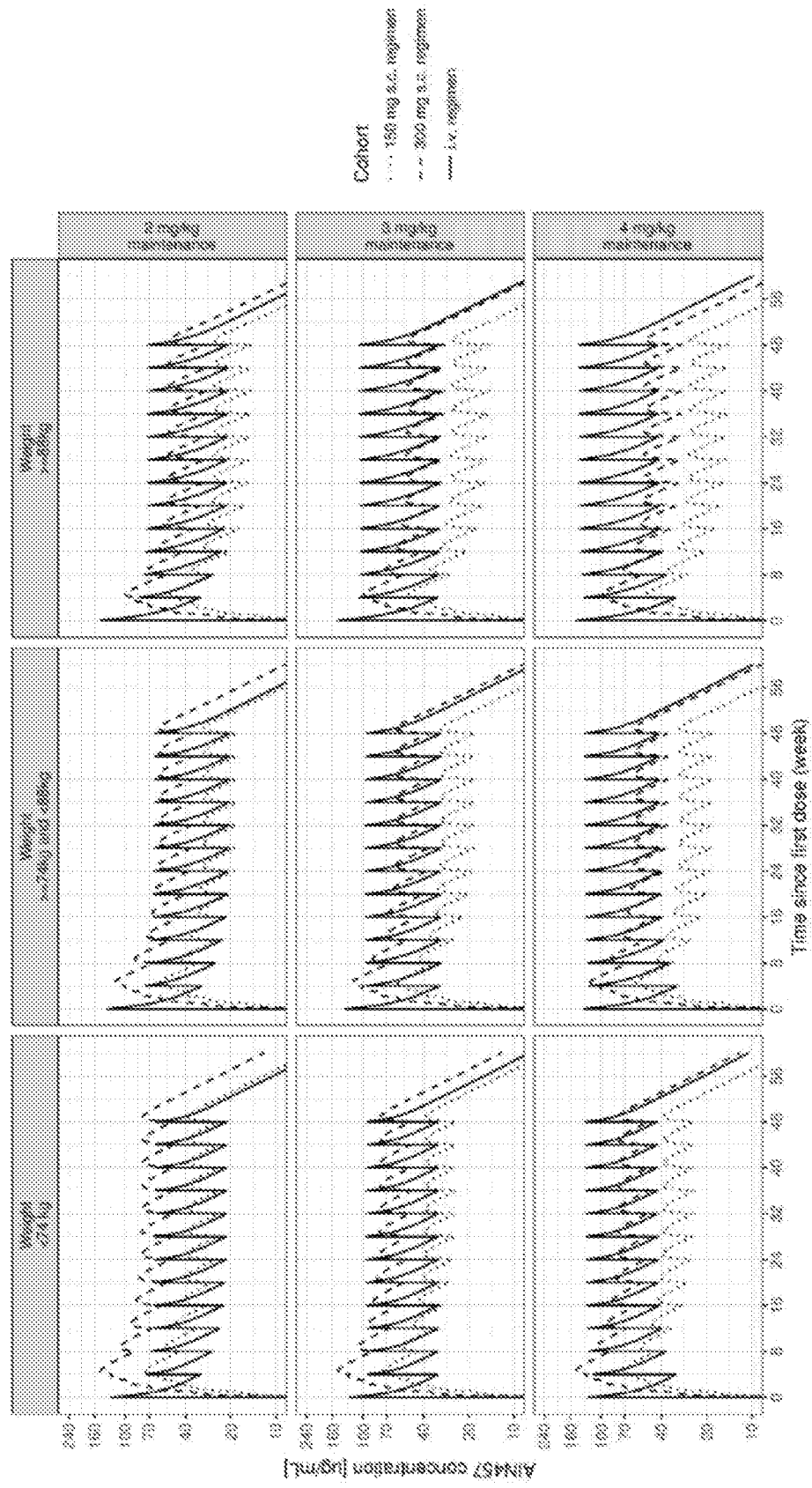
Figure 4C:
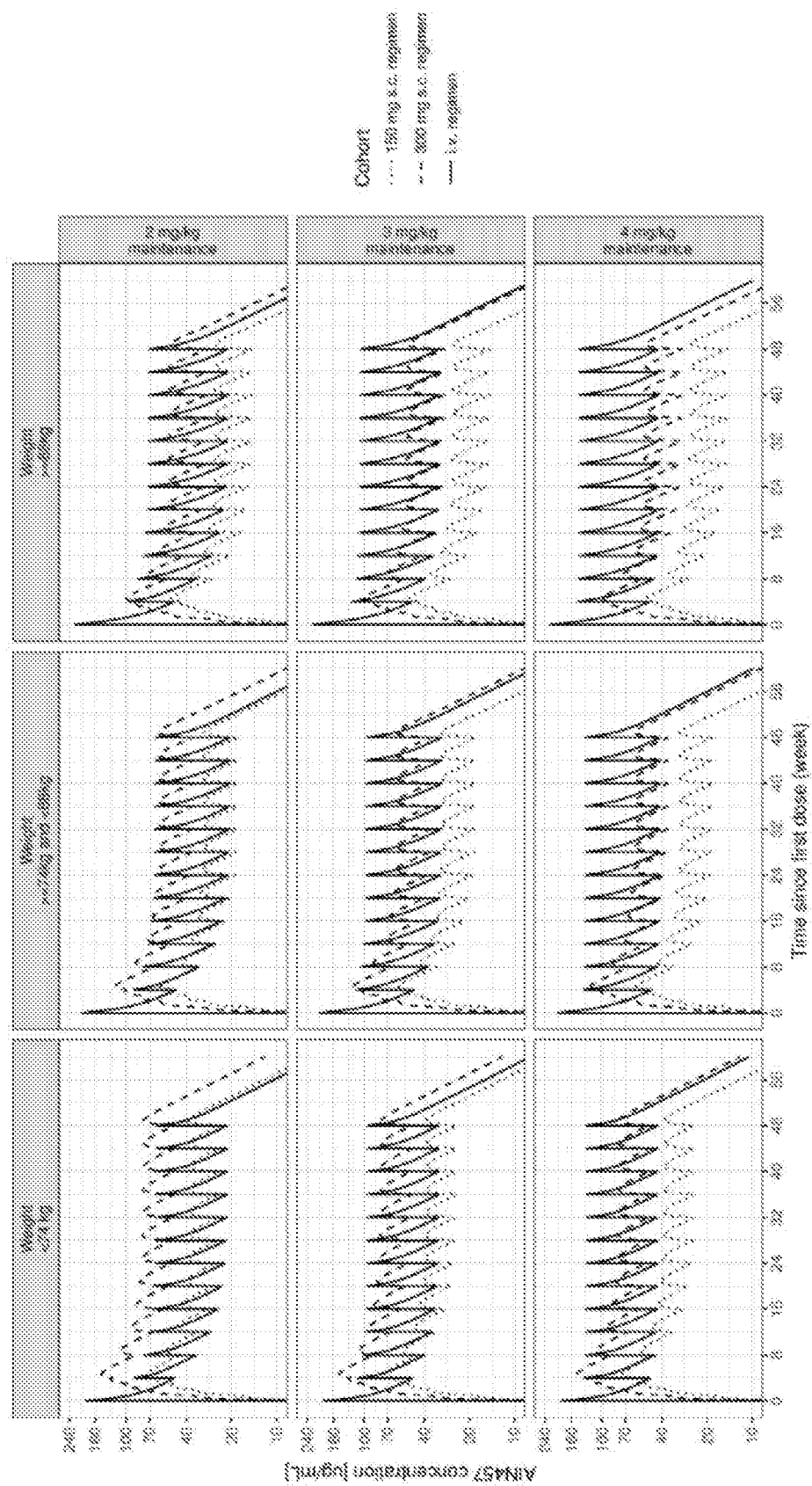

As used herein, IL-17 refers to interleukin-17A (IL-17A).

The term "comprising" encompasses "including" as well as "consisting," e.g., a composition "comprising" X may consist exclusively of X or may include something additional, e.g., X+Y.

The term "about" in relation to a numerical value x means, for example, +/−10%. When used in front of a numerical range or list of numbers, the term "about" applies to each number in the series, e.g., the phrase "about 1-5" should be interpreted as "about 1-about 5", or, e.g., the phrase "about 1, 2, 3, 4" should be interpreted as "about 1, about 2, about 3, about 4, etc."

The word "substantially" does not exclude "completely," e.g., a composition which is "substantially free" from Y may be completely free from Y. Where necessary, the word "substantially" may be omitted from the definition of the disclosure.

The term "antibody" as referred to herein includes whole antibodies and any antigen-binding portion or single chains thereof. A naturally occurring "antibody" is a glycoprotein comprising at least two heavy (H) chains and two light (L) chains inter-connected by disulfide bonds. Each heavy chain is comprised of a heavy chain variable region (abbreviated herein as $V_H$) and a heavy chain constant region. The heavy chain constant region is comprised of three domains, CH1, CH2 and CH3. Each light chain is comprised of a light chain variable region (abbreviated herein as VL) and a light chain constant region. The light chain constant region is comprised of one domain, CL. The $V_H$ and $V_L$ regions can be further subdivided into regions of hypervariability, termed hypervariable regions or complementarity determining regions (CDR), interspersed with regions that are more conserved, termed framework regions (FR). Each $V_H$ and $V_L$ is composed of three CDRs and four FRs arranged from amino-terminus to carboxy-terminus in the following order: FR1, CDR1, FR2, CDR2, FR3, CDR3, FR4. The variable regions of the heavy and light chains contain a binding domain that interacts with an antigen. The constant regions of the antibodies may mediate the binding of the immunoglobulin to host tissues or factors, including various cells of the immune system (e.g., effector cells) and the first component (C1q) of the classical complement system.

The term "antigen-binding fragment" of an antibody, as used herein, refers to fragments of an antibody that retain the ability to specifically bind to an antigen (e.g., IL-17). It has been shown that the antigen-binding function of an antibody can be performed by fragments of a full-length antibody. Examples of binding fragments encompassed within the term "antigen-binding portion" of an antibody include a Fab fragment, a monovalent fragment consisting of the $V_L$, $V_H$, CL and CH1 domains; a F(ab)2 fragment, a bivalent fragment comprising two Fab fragments linked by a disulfide bridge at the hinge region; a Fd fragment consisting of the $V_H$ and CH1 domains; a Fv fragment consisting of the $V_L$ and $V_H$ domains of a single arm of an antibody; a dAb fragment (Ward et al., 1989 Nature 341:544-546), which consists of a $V_H$ domain; and an isolated CDR. Exemplary antigen-binding sites include the CDRs of secukinumab as set forth in SEQ ID NOs: 1-6 and 11-13 (Table 1), preferably the heavy chain CDR3. Furthermore, although the two domains of the Fv fragment, $V_L$ and $V_H$, are coded for by separate genes, they can be joined, using recombinant methods, by a synthetic linker that enables them to be made as a single protein chain in which the $V_L$ and $V_H$ regions pair to form monovalent molecules (known as single chain Fv (scFv); see, e.g., Bird et al., 1988 Science 242:423-426; and Huston et al., 1988 Proc. Natl. Acad. Sci. 85:5879-5883). Such single chain antibodies are also intended to be encompassed within the term "antibody". Single chain antibodies and antigen-binding portions are obtained using conventional techniques known to those of skill in the art.

An "isolated antibody", as used herein, refers to an antibody that is substantially free of other antibodies having different antigenic specificities (e.g., an isolated antibody that specifically binds IL-17 is substantially free of antibodies that specifically bind antigens other than IL-17). The term "monoclonal antibody" or "monoclonal antibody composition" as used herein refer to a preparation of antibody molecules of single molecular composition. The term "human antibody", as used herein, is intended to include antibodies having variable regions in which both the framework and CDR regions are derived from sequences of human origin. A "human antibody" need not be produced by a human, human tissue or human cell. The human antibodies of the disclosure may include amino acid residues not encoded by human sequences (e.g., mutations introduced by random or site-specific mutagenesis in vitro, by N-nucleotide addition at junctions in vivo during recombination of antibody genes, or by somatic mutation in vivo). In some embodiments of the disclosed processes and compositions, the IL-17 antibody is a human antibody, an isolated antibody, and/or a monoclonal antibody.

The term "IL-17" refers to IL-17A, formerly known as CTLA8, and includes wild-type IL-17A from various species (e.g., human, mouse, and monkey), polymorphic variants of IL-17A, and functional equivalents of IL-17A. Functional equivalents of IL-17A according to the present disclosure preferably have at least about 65%, 75%, 85%, 95%, 96%, 97%, 98%, or even 99% overall sequence identity with a wild-type IL-17A (e.g., human IL-17A), and substantially retain the ability to induce IL-6 production by human dermal fibroblasts.

The term "$K_D$" is intended to refer to the dissociation rate of a particular antibody-antigen interaction. The term "$K_D$", as used herein, is intended to refer to the dissociation constant, which is obtained from the ratio of $K_d$ to $K_a$ (i.e., $K_d/K_a$) and is expressed as a molar concentration (M). $K_D$ values for antibodies can be determined using methods well established in the art. A method for determining the $K_D$ of an antibody is by using surface plasmon resonance, or using a biosensor system such as a Biacore® system. In some embodiments, the IL-17 antibody or antigen-binding fragment thereof, e.g., secukinumab, binds human IL-17 with a $K_D$ of about 100-250 pM.

The term "affinity" refers to the strength of interaction between antibody and antigen at single antigenic sites. Within each antigenic site, the variable region of the antibody "arm" interacts through weak non-covalent forces with antigen at numerous sites; the more interactions, the stronger the affinity. Standard assays to evaluate the binding affinity of the antibodies toward IL-17 of various species are known in the art, including for example, ELISAs, western blots and RIAs. The binding kinetics (e.g., binding affinity) of the antibodies also can be assessed by standard assays known in the art, such as by a biosensor assay, e.g., BIACORE analysis.

An antibody that "inhibits" one or more of these IL-17 functional properties (e.g., biochemical, immunochemical, cellular, physiological or other biological activities, or the like) as determined according to methodologies known to the art and described herein, will be understood to relate to a statistically significant decrease in the particular activity relative to that seen in the absence of the antibody (or when a control antibody of irrelevant specificity is present). An antibody that inhibits IL-17 activity affects a statistically significant decrease, e.g., by at least about 10% of the measured parameter, by at least 50%, 80% or 90%, and in certain embodiments of the disclosed methods and compositions, the IL-17 antibody used may inhibit greater than 95%, 98% or 99% of IL-17 functional activity.

"Inhibit IL-6" as used herein refers to the ability of an IL-17 antibody or antigen-binding fragment thereof (e.g., secukinumab) to decrease IL-6 production from primary human dermal fibroblasts. The production of IL-6 in primary human (dermal) fibroblasts is dependent on IL-17 (Hwang et al., (2004) Arthritis Res Ther; 6:R120-128). In short, human dermal fibroblasts are stimulated with recombinant IL-17 in the presence of various concentrations of an IL-17 binding molecule or human IL-17 receptor with Fc part. The chimeric anti-CD25 antibody Simulect® (basiliximab) may be conveniently used as a negative control. Supernatant is taken after 16 h stimulation and assayed for IL-6 by ELISA. An IL-17 antibody or antigen-binding fragment thereof, e.g., secukinumab, typically has an $IC_{50}$ for inhibition of IL-6 production (in the presence 1 nM human IL-17) of about 50 nM or less (e.g., from about 0.01 to about 50 nM) when tested as above, i.e., said inhibitory activity being measured on IL-6 production induced by hu-IL-17 in human dermal fibroblasts. In some embodiments of the disclosed methods and compositions, IL-17 antibodies or antigen-binding fragments thereof, e.g., secukinumab, and functional derivatives thereof have an $IC_{50}$ for inhibition of IL-6 production as defined above of about 20 nM or less, more preferably of about 10 nM or less, more preferably of about 5 nM or less, more preferably of about 2 nM or less, more preferably of about 1 nM or less.

The term "derivative", unless otherwise indicated, is used to define amino acid sequence variants, and covalent modifications (e.g., pegylation, deamidation, hydroxylation, phosphorylation, methylation, etc.) of an IL-17 antibody or antigen-binding fragment thereof, e.g., secukinumab, according to the present disclosure, e.g., of a specified sequence, e.g., a variable domain). A "functional derivative" includes a molecule having a qualitative biological activity in common with the disclosed IL-17 antibodies. A functional derivative includes fragments and peptide analogs of an IL-17 antibody as disclosed herein. Fragments comprise regions within the sequence of a polypeptide according to the present disclosure, e.g., of a specified sequence. Functional derivatives of the IL-17 antibodies disclosed herein (e.g., functional derivatives of secukinumab) preferably comprise $V_H$ and/or $V_L$ domains that have at least about 65%, 75%, 85%, 95%, 96%, 97%, 98%, or even 99% overall sequence identity with the $V_H$ and/or $V_L$ sequences of the IL-17 antibodies and antigen-binding fragments thereof disclosed herein (e.g., the $V_H$ and/or $V_L$ sequences of Table 1), and substantially retain the ability to bind human IL-17 or, e.g., inhibit IL-6 production of IL-17 induced human dermal fibroblasts.

The phrase "substantially identical" means that the relevant amino acid or nucleotide sequence (e.g., $V_H$ or $V_L$ domain) will be identical to or have insubstantial differences (e.g., through conserved amino acid substitutions) in comparison to a particular reference sequence. Insubstantial differences include minor amino acid changes, such as 1 or 2 substitutions in a 5 amino acid sequence of a specified region (e.g., $V_H$ or $V_L$ domain). In the case of antibodies, the second antibody has the same specificity and has at least 50% of the affinity of the same. Sequences substantially identical (e.g., at least about 85% sequence identity) to the sequences disclosed herein are also part of this application. In some embodiments, the sequence identity of a derivative IL-17 antibody (e.g., a derivative of secukinumab, e.g., a secukinumab biosimilar antibody) can be about 90% or greater, e.g., 90%, 91%, 92%, 93%, 94%, 95%, 96%, 97%, 98%, 99% or higher relative to the disclosed sequences.

"Identity" with respect to a native polypeptide and its functional derivative is defined herein as the percentage of amino acid residues in the candidate sequence that are identical with the residues of a corresponding native polypeptide, after aligning the sequences and introducing gaps, if necessary, to achieve the maximum percent identity, and not considering any conservative substitutions as part of the sequence identity. Neither N- or C-terminal extensions nor insertions shall be construed as reducing identity. Methods and computer programs for the alignment are well known. The percent identity can be determined by standard alignment algorithms, for example, the Basic Local Alignment Search Tool (BLAST) described by Altshul et al. ((1990) J. Mol. Biol., 215: 403 410); the algorithm of Needleman et al. ((1970) J. Mol. Biol., 48: 444 453); or the algorithm of Meyers et al. ((1988) Comput. Appl. Biosci., 4: 11 17). A set of parameters may be the Blosum 62 scoring matrix with a gap penalty of 12, a gap extend penalty of 4, and a frameshift gap penalty of 5. The percent identity between two amino acid or nucleotide sequences can also be determined using the algorithm of E. Meyers and W. Miller ((1989) CABIOS, 4:11-17) which has been incorporated into the ALIGN program (version 2.0), using a PAM120 weight residue table, a gap length penalty of 12 and a gap penalty of 4.

"Amino acid(s)" refer to all naturally occurring L-α-amino acids, e.g., and include D-amino acids. The phrase "amino acid sequence variant" refers to molecules with some differences in their amino acid sequences as compared to the sequences according to the present disclosure. Amino acid sequence variants of an antibody according to the present disclosure, e.g., of a specified sequence, still have the ability to bind the human IL-17 or, e.g., inhibit IL-6 production of IL-17 induced human dermal fibroblasts. Amino acid sequence variants include substitutional variants (those that have at least one amino acid residue removed and a different amino acid inserted in its place at the same position in a polypeptide according to the present disclosure), insertional variants (those with one or more amino acids inserted immediately adjacent to an amino acid at a particular position in a polypeptide according to the present disclosure) and deletional variants (those with one or more amino acids removed in a polypeptide according to the present disclosure).

The term "pharmaceutically acceptable" means a nontoxic material that does not interfere with the effectiveness of the biological activity of the active ingredient(s).

The term "administering" in relation to a compound, e.g., an IL-17 binding molecule or another agent, is used to refer to delivery of that compound to a patient by any route.

As used herein, a "therapeutically effective amount" refers to an amount of an IL-17 antagonist, e.g., IL-17 binding molecule (e.g., IL-17 antibody or antigen-binding fragment thereof, e.g., secukinumab) or IL-17 receptor binding molecule (e.g., IL-17 antibody or antigen-binding fragment thereof) that is effective, upon single or multiple dose administration to a patient (such as a human) for treating, preventing, preventing the onset of, curing, delaying, reducing the severity of, ameliorating at least one symptom of a disorder or recurring disorder, or prolonging the survival of the patient beyond that expected in the absence of such treatment. When applied to an individual active ingredient (e.g., an IL-17 antagonist, e.g., secukinumab) administered alone, the term refers to that ingredient alone. When applied to a combination, the term refers to combined amounts of the active ingredients that result in the therapeutic effect, whether administered in combination, serially or simultaneously.

As used herein, the terms "treatment" or "treat" are defined as the application or administration of an IL-17 antagonist (e.g., IL-17 antibody, e.g., secukinumab) according to the disclosure, or a pharmaceutical composition comprising said IL-17 antagonist, to a subject, where the subject has a particular disease (e.g., PsA, AS, axSpA, nr-axSpA), a symptom associated with the disease, or a predisposition towards development of the disease (if applicable), where the purpose is to cure (if applicable), delay the onset of, reduce the severity of, alleviate, ameliorate one or more symptoms of the disease, improve the disease, reduce or improve any associated symptoms of the disease or the predisposition toward the development of the disease. The term "treatment" or "treat" includes treating a patient suspected to have the disease as well as patients who are ill or who have been diagnosed as suffering from the disease or medical condition, and includes suppression of clinical relapse. The phrase "reducing the likelihood" refers to delaying the onset or development or progression of a disease, infection or disorder.

Psoriatic arthritis (PsA) is a chronic, systemic inflammatory disease affecting peripheral joints, connective tissues and the axial skeleton, and may be associated with psoriasis of the skin and nails. PsA is a multifaceted disease, including synovitis, enthesitis, dactylitis, spondylitis, uveitis and inflammatory bowel disease. Traditional disease modifying anti-rheumatic drugs (DMARDs) include methotrexate (MTX), sulfasalazine, cyclopsorine, and leflunomide and are inadequate for a number of patients because these drugs only partially control established disease. Tumor necrosis factor (TNF) inhibitors have improved the management of PsA in recent years, but many patients do not respond to, or tolerate, anti-TNF medicines, the current standard of care, and approximately 45% of people are dissatisfied with current treatments (Boehncke and Menter (2013) Am J Clin Dermatol 2013; 14:377-88; Gladman et al. (2005) Ann Rheum Dis.; 64(Suppl 2):ii14-17; Gossec et al. Ann Rheum Dis. 2012; 71:4-12; Menter et al. J Am Acad Dermatol. 2011; 65:137-74). Secukinumab has demonstrated a rapid onset of response and superior efficacy over placebo in patients with PsA across multiple clinical domains including the arthritic and skin measures of signs and symptoms, physical function, and patient-reported outcomes (Mease and McInnes (2016) Rheumatol Ther 3:5-29). Additionally, secukinumab has shown efficacy in preventing structural damage in patients with PsA (Mease (2018) Ann Rheum Dis 77:890-897).

Spondyloarthritides (SpA) is a group of related diseases that comprise axial SpA (AS and nr-axSpA), reactive arthritis, arthritis/spondylitis with inflammatory bowel disease, arthritis/spondylitis with psoriasis, and undifferentiated spondyloarthritis. SpA patients having predominantly axial skeletal symptoms are referred to as having axial SpA (axSpA). The Assessment of SpondyloArthritis international Society (ASAS) criteria has been developed as classification criteria for axial spondyloartiritis (axSpA), covering both radiographic axial SpA (AS) and nr-axSpA (Rudwaleit et al. (2009) Ann. Rheum. Dis. 68:777-83, incorporated by reference herein in its entirety). In brief, the ASAS axSpA criteria are: a) the presence of sacroiliitis by radiography (radiographic sacroiliitis according to the modified New York criteria) or by MRI, plus at least one SpA feature (imaging arm); or b) the presence of HLA-B27 plus at least two SpA features (clinical arm). "SpA features" include inflammatory back pain, elevated CRP (in the context of inflammatory back pain), HLA-B27 positive, family history for SpA, good response to NSAIDs, Crohn's disease/ulcerative colitis, psoriasis, dactylitis, uveitis, enthesitis (heel), and arthritis. Patients satisfying all ASAS axSpA criteria are referred to herein as having AS. Patients satisfying the ASAS axSpA criteria, but not having radiographic sacroiliitis according to the modified New York criteria, are referred to herein as having non-radiographic axial spondyloarthritis (nr-axSpA).

As used herein, the phrase "inhibiting the progression of structural damage" is synonymous with "preventing the progression of structural damage," and is used to mean reducing, abrogating or slowing the bone and joint damage that is associated with PsA or axSpA (i.e., nr-axSpA and AS, e.g., nr-axSpA, e.g., AS). As such, it refers to a decrease in the level and/or rate of progression of damage to the bones and/or joints comprising pathogenic new bone formation of a patient with PsA or axSpA. Radiography and Magnetic Resonance Imaging (MRI) are particularly useful tools for analyzing the bone and joint damage associated with PsA or axSpA. Various methods of imaging and scoring axSpA may be found in, e.g., Braun and Baraliakos (2011) Ann Rheum Dis 70 (Suppl 1):i97-i103; Rudwaleit (2009) Ann. Rheum. Dis. 68:1520-7; and I-H Song et al. Ann Rheum Dis. 2011 July; 70(7):1257-63. Preferred methods of scoring spine and sacroilliac joint (SIJ) MRI images include the Berlin MRI spine score (Lukas C, et al. J Rheumatol. 2007; 34:862-70), the Berlin SIJ score (Hermann K G, et al. Radiologe. 2004; 44:217-28, Song et al. 2000, supra), the ankylosing spondylitis spine MRI scoring system for disease activity (ASspiMRI-a) and the 'Berlin modification of ASspiMRI-a' (Lukas C et al (2007) J. Rheumatol; 34(4):862-70; Rudwaleit et al. (2008) Arthritis Rheum 67:1276-1281; Rudwaleit et al (2005) [abstract] Arthritis Rheum 50:S211). SIJ can also be scored using the Spondyloarthritis Research Consortium of Canada (SPARCC) scoring system (Maksymowych et al. (2005) Arthritis Rheum. 53:703-09). Inhibition can be identified relative to a control, e.g., a patient not treated with the disclosed IL-17 antagonists, or a known rate of progression (e.g., mean, median, or range).

As used herein, the phrases "has not previously been treated with a TNF antagonist" and "TNF naïve" refer to a patient, e.g., a PsA or axSpA (e.g., AS, e.g., nr-axSpA) patient, who has not been previously treated with a TNF alpha inhibitor for PsA or axSpA. As used herein, the phrases "has previously been treated with a TNF antagonist" and "TNF experienced" refer to a patient, e.g., a PsA or axSpA patient, who has been previously treated with a TNF alpha inhibitor (e.g., infliximab, etanercept, adalimumab, certolizumab, golimumab). It includes patients who were refractory to or had an inadequate response to TNF alpha inhibitor treatment, as well as patients who stopped treatment with the TNF alpha inhibitor for safety or tolerability reasons. As used herein, the phrases "previously failed to respond to or had an inadequate response to treatment with a TNF alpha antagonist," "TNF-inadequate responder" and "TNF-IR" refer to a patient, e.g., a PsA or axSpA patient, who has been previously treated with a TNF alpha inhibitor for PsA or axSpA (e.g., infliximab, etanercept, adalimumab, certolizumab, golimumab), but whose symptoms (e.g., pain, bone and/or joint symptoms) were not adequately controlled by the TNF alpha inhibitor (e.g., a patient with active axSpA despite at least 2 weeks, 4 weeks, at least 8 weeks, at least 3 months, at least 14 weeks, or at least 4 months of treatment using an approved dose of the anti-TNF alpha agent). In some embodiments of the disclosed methods, regimens, uses, kits, and pharmaceutical compositions, the patient, e.g., PsA or axSpA (e.g., AS, e.g., nr-axSpA) patient, previously failed to respond to or had an inadequate response to treatment with a TNF alpha inhibitor.

As used herein, the phrase "previously failed to respond to or had an inadequate response to treatment with non-steroidal anti-inflammatory drugs (NSAIDs)," refer to a patient, e.g., a PsA or axSpA (e.g., AS, e.g., nr-axSpA) patient, who has been previously treated with one or more NSAID for PsA or axSpA (e.g., a COX-1 or COX-2 inhibitor), but whose symptoms (e.g., pain, bone and/or joint symptoms) were not adequately controlled by the NSAID (e.g., a patient with active PsA or active axSpA despite at least 2 weeks, 4 weeks, at least 8 weeks, at least 3 months, at least 14 weeks, or at least 4 months of treatment using an approved dose of the NSAID). In some embodiments of the disclosed methods, regimens, uses, kits, and pharmaceutical compositions, the patient, e.g., a PsA or axSpA (e.g., AS, e.g., nr-axSpA) patient, previously failed to respond to or had an inadequate response to treatment with one or more NSAID.

As used herein, the phrase "previously failed to respond to or had an inadequate response to treatment with a disease modifying anti-rheumatic drug (DMARD)," refer to a patient, e.g., a PsA or axSpA (e.g., AS, e.g., nr-axSpA) patient, who has been previously treated with one or more DMARD for PsA or axSpA (e.g., a TNF-alpha inhibitor, sulfasalazine, methotrexate), but whose symptoms (e.g., pain, bone and/or joint symptoms) were not adequately controlled by the DMARD (e.g., a patient with active PsA or active axSpA despite at least 2 weeks, 4 weeks, at least 8 weeks, at least 3 months, at least 14 weeks, or at least 4 months of treatment using an approved dose of the DMARD). In some embodiments of the disclosed methods, regimens, uses, kits, and pharmaceutical compositions, the patient previously failed to respond to or had an inadequate response to treatment with one or more DMARD.

In some embodiments of the disclosed methods, regimens, uses, kits, and pharmaceutical compositions, the patient has active psoriatic arthritis (PsA), active AS, or active nr-axSpA, despite current or previous NSAID, DMARD and/or anti-TNF therapy.

As used herein, the phrase "previously failed to respond to or had an inadequate response to treatment with a non-biological disease modifying anti-rheumatic drug (DMARD)," refers to a patient, e.g., a PsA or axSpA (e.g., AS, e.g., nr-axSpA) patient, who has been previously treated with one or more DMARD for PsA or axSpA, wherein the DMARD is not a biological drug (e.g., the DMARD is not produced by cells, but is rather a chemical composition, e.g., a small molecule, e.g., sulfasalazine, methotrexate) (non-biological DMARDs are also referred to as "conventional", "conventional synthetic", or "targeted synthetic"), but whose symptoms (e.g., pain, bone and/or joint symptoms) were not adequately controlled by the DMARD (e.g., a patient with active PsA or active axSpA despite at least 2 weeks, 4 weeks, at least 8 weeks, at least 3 months, at least 14 weeks, or at least 4 months of treatment using an approved dose of the DMARD). In some embodiments of the disclosed methods, regimens, uses, kits, and pharmaceutical compositions, the patient previously failed to respond to or had an inadequate response to treatment with one or more non-biological DMARD.

As used herein, "selecting" and "selected" in reference to a patient is used to mean that a particular patient is specifically chosen from a larger group of patients on the basis of (due to) the particular patient having a predetermined criteria. Similarly, "selectively treating" refers to providing treatment to a patient having a particular disease, where that patient is specifically chosen from a larger group of patients on the basis of the particular patient having a predetermined criterion. Similarly, "selectively administering" refers to administering a drug to a patient that is specifically chosen from a larger group of patients on the basis of (due to) the particular patient having a predetermined criterion. By selecting, selectively treating and selectively administering, it is meant that a patient is delivered a personalized therapy based on the patient's personal history (e.g., prior therapeutic interventions, e.g., prior treatment with biologics), biology (e.g., particular genetic markers), and/or manifestation (e.g., not fulfilling particular diagnostic criteria), rather than being delivered a standard treatment regimen based solely on the patient's membership in a larger group. Selecting, in reference to a method of treatment as used herein, does not refer to fortuitous treatment of a patient having a particular criterion, but rather refers to the deliberate choice to administer treatment to a patient based on the patient having a particular criterion. Thus, selective treatment/administration differs from standard treatment/administration, which delivers a particular drug to all patients having a particular disease, regardless of their personal history, manifestations of disease, and/or biology.

In some embodiments, an axSpA patient is selected for treatment by fulfilling the ASAS axSpA criteria, while concurrently not satisfying the radiological criterion according to the modified New York diagnostic criteria for ankylosing spondylitis. In some embodiments of the disclosed methods, regimens, uses, kits, and pharmaceutical compositions, the patient is selected for treatment based on having nr-axSpA.

In some embodiments, an axSpA patient is selected for treatment by fulfilling all ASAS axSpA criteria, including the radiological criterion according to the modified New York diagnostic criteria for ankylosing spondylitis. In some embodiments of the disclosed methods, regimens, uses, kits, and pharmaceutical compositions, the patient is selected for treatment based on having AS. In some embodiments of the disclosed methods, regimens, uses, kits, and pharmaceutical compositions, the patient is selected for treatment based on having PsA.

Radiographic changes in the SIJ of at least grade II or higher bilaterally or grade III or IV unilaterally are a requirement for making a diagnosis of AS according to the modified New York Criteria (Van der Linden et al. (1984) Arthritis Rheum 27:361-8). These changes are referred to herein as "radiological criterion according to the modified New York diagnostic criteria for ankylosing spondylitis" and "radiographic evidence of ankylosing spondylitis."

As used herein, a patient is "HLA-B27 positive" if laboratory testing reveals the presence of the HLA-B27 antigen or allele (e.g., using flow cytometry or PCR genotyping).

As used herein, the phrase "inflammatory back pain" refers to back pain that is not mechanical. It is characterized by, e.g., gradual onset, lasting at least 3 months, onset at a relatively young age, alternating buttock pain, morning stiffness lasting for more than 30 minutes, pain at night, lack of improvement with rest, etc. It is not caused by strain or injury and does not tend to develop quickly or have variable onset, and can be diagnosed by a skilled physician or health care provider.

As used herein, "active PsA" refers to disease signs and symptoms consistent with active disease, e.g., meeting the ClASsification criteria for Psoriatic ARthritis2 (Taylor et al. (2006) Arthritis Rheum 54:2665-73), with symptoms of PsA for at least 6 months: ≥3 tender joints and ≥3 swollen joints despite ≥4 weeks of treatment with non-steroidal anti-inflammatory drugs (NSAIDs), or an intolerance to NSAIDS, and active or documented history of plaque psoriasis or psoriatic nail changes. In some embodiments of the disclosed methods, regimens, uses, kits, and pharmaceutical compositions, the patient has active PsA.

As used herein, "moderate-to-severe PsA" refers to disease signs and symptoms consistent with ≥3 tender joints out of 78 and ≥3 swollen joints out of 76, negative for Rheumatoid factor (RF) and anti-cyclic citrullinated peptide (anti-CCP) antibodies, and a diagnosis of active plaque psoriasis or nail changes consistent with psoriasis or a documented history of plaque psoriasis. In some embodiments of the disclosed methods, regimens, uses, kits, and pharmaceutical compositions, the patient has moderate-to-severe PsA, e.g., moderate-to-severe PsA active PsA.

A description of the severity classification for PsA may be found in Ritchlin et al. (2009), Ann. Rheum. Dis. 68:1387-94. A skilled artisan will understand that "active" PsA can include all three severity categories of PsA disease (mild, moderate and severe PsA).

As used herein, "active nr-axSpA" refers to disease signs and symptoms consistent with a total Bath Ankylosing Spondylitis Disease Activity Index (BASDAI) score of 4 or higher on a scale of 0 to 10. In some embodiments of the disclosed methods, regimens, uses, kits, and pharmaceutical compositions, the patient has active nr-axSpA. In some embodiments of the disclosed methods, regimens, uses, kits, and pharmaceutical compositions, the patient has total BASDAI ≥4 cm (0-10 cm) at baseline, spinal pain as measured by BASDAI question #2≥4 cm (0-10 cm) at baseline, and total back pain as measured by VAS ≥40 mm (0-100 mm) at baseline.

As used herein, "severe nr-axSpA" and "moderate-to-severe nr-axSpA" refer to disease signs and symptoms requiring treatment with biologic therapy. According to the "ASAS recommendations for the use of anti-TNF agents in patients with axial spondyloarthritis" (van der Heijde et al (2011) Ann Rheum Dis. 2011 June; 70(6):905-8) patients with nr-axSpA require biologic therapy if they show active disease with a total Bath Ankylosing Spondylitis Disease Activity Index score of 4 or higher on a scale of 0 to 10 after therapy with at least two NSAIDs over a 4-week period in total at the maximum recommended dose unless contraindicated. In some embodiments of the disclosed methods, regimens, uses, kits, and pharmaceutical compositions, the patient has severe nr-axSpA.

As used herein, "active AS" refers to disease signs and symptoms consistent with active disease, e.g., a score of 4 or higher on the Bath Ankylosing Spondylitis Disease Activity Index (BASDAI) (0-10), spinal pain as measured by BASDAI question #2≥4 cm (0-10 cm) and total back pain as measured by VAS ≥40 mm (0-100 mm). In some embodiments of the disclosed methods, regimens, uses, kits, and pharmaceutical compositions, the patient has active AS.

As used herein, "moderate-to-severe AS" refers to disease in which there is radiologic evidence fulfilling the Modified New York criteria for AS. In some embodiments of the disclosed methods, regimens, uses, kits, and pharmaceutical compositions, the patient has moderate-to-severe AS, e.g., moderate-to-severe active AS In some embodiments of the disclosed methods, regimens, uses, kits, and pharmaceutical compositions, the patient has severe AS. In some embodiments of the disclosed methods, regimens, uses, kits, and pharmaceutical compositions, the patient has moderate-to-severe AS.

As used herein, the phrases "objective signs of inflammation by elevated CRP and/or MRI" and "objective signs of inflammation by CRP and/or MRI" refer to either MRI evidence of sacroiliac joints (SIJ) inflammation, elevated C-reactive protein (CRP), or both. In some embodiments of the disclosed methods, regimens, uses, kits, and pharmaceutical compositions, the patient has axSpA (e.g., severe, moderate-to-severe, active) without radiographic evidence of ankylosing spondylitis, but with objective signs of inflammation as either MRI evidence of sacroiliac joints (SIJ) inflammation and/or elevated C-reactive protein (CRP). Another objective sign of inflammation is inflammation of the spine, which is also observable by MRI. Inflammation of the spine may be scored using the ankylosing spondylitis spine MRI scoring system for disease activity (ASspiMRI-a) and the 'Berlin modification of ASspiMRI-a' (Lukas C et al (2007) J. Rheumatol; 34(4): 862-70; Rudwaleit et al. (2008) Arthritis Rheum 67:1276-1281; Rudwaleit et al (2005) [abstract] Arthritis Rheum 50:S211).

Recent MRI methodology allows one to demonstrate the presence of active inflammation in the SIJ, the spine and other skeletal elements in patients with axSpA and normal radiographic findings (see, e.g., Rudwaleit et al. (2009) Ann. Rheum Dis. 68:1520-7; Braun et al 1994, Arthritis Rheum 37:1039-45; Oostveen et al 1999, J. Rheumatol. 26:1953-58; Heuft-Dorenbosch et al 2006, Ann. Rheum. Dis. 65:804-08; Heuft-Dorenbosch et al. 2006 Arthritis Res. Ther. 8:R11; Braun and Baraliakos (2011) Ann Rheum Dis 70 (Suppl 1):i97-i103; and for a review, Ambak et al. 2012 Arthritis Res. & Therapy 14:R55), as well as the depiction of acute inflammatory lesions and chronic/structural changes in both the SIJ and the spine. There are various scoring methods that can be used to identify MRI evidence that is highly suggestive of sacroiliitis, which is referred to herein as "MRI evidence of sacroiliac joints (SIJ) inflammation." A preferred MRI scoring system for use in the disclosed methods is the Berlin SIJ score (Hermann K G, et al. Radiologe.

2004; 44:217-28). In some embodiments of the disclosed methods, regimens, uses, kits, and pharmaceutical compositions, the patient has MRI evidence of SIJ inflammation.

As used herein "elevated CRP" refers to elevated CRP blood levels, according to an assaying laboratory. An above normal CRP level is defined in the 2010 ACR/EULAR criteria (Aletaha et al. (2010) Ann. Rheum. Dis. 69:1580-88). According to the 2010 ACR/EULAR criteria, normal/abnormal CRP is based on local laboratory standards. Each local laboratory will employ a cutoff value for abnormal (high) CRP based on that laboratory's particular rule for calculating normal maximum CRP. A physician generally orders a CRP test from a local laboratory, and the local laboratory reports normal or abnormal (low or high) CRP using the rule that particular laboratory employs to calculate normal CRP. In some cases, the laboratory simply reports that the CRP is beyond the "upper limit of normal (ULN)." Thus, unless the context dictates otherwise, as used herein "elevated CRP" is not meant to denote a particular numerical value, as what is considered a normal CRP value will differ between laboratories and assays. In some embodiments of the disclosure, CRP is measured using a high sensitivity assay; elevated CRP by this assay (i.e., hsCRP) can be, e.g., >about 3 mg/L (e.g., 3 mg/L), >about 10 mg/L (e.g., 10 mg/L), >about 20 mg/L (e.g., 20 mg/L) or >about 30 mg/L (e.g., 30 mg/L). The CRP level, when assessed at baseline (BSL), is referred to as "baseline CRP". An elevated level of CRP at baseline may be referred to as "elevated baseline CRP". In some embodiments of the disclosed methods, regimens, uses, kits, and pharmaceutical compositions, the patient has a high baseline CRP or hsCRP.

IL-17 Antagonists

The various disclosed processes, kits, uses and methods utilize an IL-17 antagonist, e.g., IL-17 binding molecule (e.g., soluble IL-17 receptor, IL-17 antibody or antigen-binding fragment thereof, e.g., secukinumab) or IL-17 receptor binding molecule (e.g., IL-17 receptor antibody or antigen-binding fragment thereof). In some embodiments, the IL-17 antagonist is an IL-17 binding molecule, preferably an IL-17 antibody or antigen-binding fragment thereof.

In one embodiment, the IL-17 antibody or antigen-binding fragment thereof comprises at least one immunoglobulin heavy chain variable domain ($V_H$) comprising hypervariable regions CDR1, CDR2 and CDR3, said CDR1 having the amino acid sequence SEQ ID NO: 1, said CDR2 having the amino acid sequence SEQ ID NO:2, and said CDR3 having the amino acid sequence SEQ ID NO:3. In one embodiment, the IL-17 antibody or antigen-binding fragment thereof comprises at least one immunoglobulin light chain variable domain ($V_L$) comprising hypervariable regions CDR1', CDR2' and CDR3', said CDR1' having the amino acid sequence SEQ ID NO:4, said CDR2' having the amino acid sequence SEQ ID NO:5 and said CDR3' having the amino acid sequence SEQ ID NO:6. In one embodiment, the IL-17 antibody or antigen-binding fragment thereof comprises at least one immunoglobulin heavy chain variable domain ($V_H$) comprising hypervariable regions CDR1-x, CDR2-x and CDR3-x, said CDR1-x having the amino acid sequence SEQ ID NO:11, said CDR2-x having the amino acid sequence SEQ ID NO:12, and said CDR3-x having the amino acid sequence SEQ ID NO:13.

In one embodiment, the IL-17 antibody or antigen-binding fragment thereof comprises at least one immunoglobulin $V_H$ domain and at least one immunoglobulin $V_L$ domain, wherein: a) the immunoglobulin $V_H$ domain comprises (e.g., in sequence): i) hypervariable regions CDR1, CDR2 and CDR3, said CDR1 having the amino acid sequence SEQ ID NO: 1, said CDR2 having the amino acid sequence SEQ ID NO:2, and said CDR3 having the amino acid sequence SEQ ID NO:3; or ii) hypervariable regions CDR1-x, CDR2-x and CDR3-x, said CDR1-x having the amino acid sequence SEQ ID NO:11, said CDR2-x having the amino acid sequence SEQ ID NO:12, and said CDR3-x having the amino acid sequence SEQ ID NO: 13; and b) the immunoglobulin $V_L$ domain comprises (e.g., in sequence) hypervariable regions CDR1', CDR2' and CDR3', said CDR1' having the amino acid sequence SEQ ID NO:4, said CDR2' having the amino acid sequence SEQ ID NO:5, and said CDR3' having the amino acid sequence SEQ ID NO:6.

In one embodiment, the IL-17 antibody or antigen-binding fragment thereof comprises: a) an immunoglobulin heavy chain variable domain ($V_H$) comprising the amino acid sequence set forth as SEQ ID NO:8; b) an immunoglobulin light chain variable domain ($V_L$) comprising the amino acid sequence set forth as SEQ ID NO: 10; c) an immunoglobulin $V_H$ domain comprising the amino acid sequence set forth as SEQ ID NO:8 and an immunoglobulin $V_L$ domain comprising the amino acid sequence set forth as SEQ ID NO: 10; d) an immunoglobulin $V_H$ domain comprising the hypervariable regions set forth as SEQ ID NO:1, SEQ ID NO:2, and SEQ ID NO:3; e) an immunoglobulin $V_L$ domain comprising the hypervariable regions set forth as SEQ ID NO:4, SEQ ID NO:5 and SEQ ID NO:6; f) an immunoglobulin $V_H$ domain comprising the hypervariable regions set forth as SEQ ID NO:11, SEQ ID NO:12 and SEQ ID NO: 13; g) an immunoglobulin $V_H$ domain comprising the hypervariable regions set forth as SEQ ID NO: 1, SEQ ID NO:2, and SEQ ID NO:3 and an immunoglobulin $V_L$ domain comprising the hypervariable regions set forth as SEQ ID NO:4, SEQ ID NO:5 and SEQ ID NO:6; or h) an immunoglobulin $V_H$ domain comprising the hypervariable regions set forth as SEQ ID NO: 11, SEQ ID NO:12 and SEQ ID NO: 13 and an immunoglobulin $V_L$ domain comprising the hypervariable regions set forth as SEQ ID NO:4, SEQ ID NO:5 and SEQ ID NO:6.

For ease of reference the amino acid sequences of the hypervariable regions of the secukinumab monoclonal antibody, based on the Kabat definition and as determined by the X-ray analysis and using the approach of Chothia and coworkers, is provided in Table 1, below.

TABLE 1

Amino acid sequences of the hypervariable regions of secukinumab according to Kabat and modified Chothia.

| | Light-Chain | |
|---|---|---|
| CDR1' | Kabat | R-A-S-Q-S-V-S-S-S-Y-L-A (SEQ ID NO: 4) |
| | Chothia | R-A-S-Q-S-V-S-S-S-Y-L-A (SEQ ID NO: 4) |
| CDR2' | Kabat | G-A-S-S-R-A-T (SEQ ID NO: 5) |
| | Chothia | G-A-S-S-R-A-T (SEQ ID NO: 5) |

TABLE 1-continued

Amino acid sequences of the hypervariable regions
of secukinumab according to Kabat and modified Chothia.

| | | |
|---|---|---|
| CDR3' | Kabat | Q-Q-Y-G-S-S-P-C-T (SEQ ID NO: 6) |
| | Chothia | Q-Q-Y-G-S-S-P-C-T (SEQ ID NO: 6) |

Heavy-Chain

| | | |
|---|---|---|
| CDR1 | Kabat | N-Y-W-M-N (SEQ ID NO: 1) |
| CDR1-x | Chothia | G-F-T-F-S-N-Y-W-M-N (SEQ ID NO: 11) |
| CDR2 | Kabat | A-I-N-Q-D-G-S-E-K-Y-Y-V-G-S-V-K-G (SEQ ID NO: 2) |
| CDR2-x | Chothia | A-I-N-Q-D-G-S-E-K-Y (SEQ ID NO: 12) |
| CDR3 | Kabat | D-Y-Y-D-I-L-T-D-Y-Y-I-H-Y-W-Y-F-D-L (SEQ ID NO: 3) |
| CDR3-x | Chothia | C-V-R-D-Y-Y-D-I-L-T-D-Y-Y-I-H-Y-W-Y-F-D-L-W-G (SEQ ID NO: 13) |

Secukinumab CDRs according to IMGT are as follows: light chain CDR1 (QSVSSSY; SEQ ID NO: 16), CDR 2 (GAS; SEQ ID NO: 17), CDR3 (QQYGSSPCT; SEQ ID NO: 18); and heavy chain CDR1 (GFTFSNYW; SEQ ID NO: 19), CDR2 (INQDGSEK; SEQ ID NO:20), (VRDYYDILTDYYIHYWYFDL; SEQ ID NO: 21).

In preferred embodiments, the constant region domains preferably also comprise suitable human constant region domains, for instance as described in "Sequences of Proteins of Immunological Interest", Kabat E. A. et al, US Department of Health and Human Services, Public Health Service, National Institute of Health. The DNA encoding the $V_L$ of secukinumab is set forth in SEQ ID NO:9. The DNA encoding the $V_H$ of secukinumab is set forth in SEQ ID NO:7.

In some embodiments, the IL-17 antibody or antigen-binding fragment thereof (e.g., secukinumab) comprises the three CDRs of SEQ ID NO:10. In other embodiments, the IL-17 antibody or antigen-binding fragment thereof comprises the three CDRs of SEQ ID NO:8. In other embodiments, the IL-17 antibody or antigen-binding fragment thereof comprises the three CDRs of SEQ ID NO:10 and the three CDRs of SEQ ID NO:8. CDRs of SEQ ID NO:8 and SEQ ID NO: 10 may be found in Table 1. The free cysteine in the light chain (CysL97) may be seen in SEQ ID NO:6.

In some embodiments, IL-17 antibody or antigen-binding fragment thereof comprises the light chain of SEQ ID NO: 14. In other embodiments, the IL-17 antibody or antigen-binding fragment thereof comprises the heavy chain of SEQ ID NO:15. In other embodiments, the IL-17 antibody or antigen-binding fragment thereof comprises the light chain of SEQ ID NO:14 and the heavy domain of SEQ ID NO:15. In some embodiments, the IL-17 antibody or antigen-binding fragment thereof comprises the three CDRs of SEQ ID NO:14. In other embodiments, IL-17 antibody or antigen-binding fragment thereof comprises the three CDRs of SEQ ID NO:15. In other embodiments, the IL-17 antibody or antigen-binding fragment thereof comprises the three CDRs of SEQ ID NO:14 and the three CDRs of SEQ ID NO:15. CDRs of SEQ ID NO:14 and SEQ ID NO: 15 may be found in Table 1.

Hypervariable regions may be associated with any kind of framework regions, though preferably are of human origin. Suitable framework regions are described in Kabat E. A. et al, ibid. The preferred heavy chain framework is a human heavy chain framework, for instance that of the secukinumab antibody. It consists in sequence, e.g. of FR1 (amino acid 1 to 30 of SEQ ID NO:8), FR2 (amino acid 36 to 49 of SEQ ID NO:8), FR3 (amino acid 67 to 98 of SEQ ID NO:8) and FR4 (amino acid 117 to 127 of SEQ ID NO:8) regions. Taking into consideration the determined hypervariable regions of secukinumab by X-ray analysis, another preferred heavy chain framework consists in sequence of FR1-x (amino acid 1 to 25 of SEQ ID NO:8), FR2-x (amino acid 36 to 49 of SEQ ID NO:8), FR3-x (amino acid 61 to 95 of SEQ ID NO:8) and FR4 (amino acid 119 to 127 of SEQ ID NO:8) regions. In a similar manner, the light chain framework consists, in sequence, of FR1' (amino acid 1 to 23 of SEQ ID NO: 10), FR2' (amino acid 36 to 50 of SEQ ID NO:10), FR3' (amino acid 58 to 89 of SEQ ID NO: 10) and FR4' (amino acid 99 to 109 of SEQ ID NO:10) regions.

In one embodiment, the IL-17 antibody or antigen-binding fragment thereof (e.g., secukinumab) is selected from a human IL-17 antibody that comprises at least: a) an immunoglobulin heavy chain or fragment thereof which comprises a variable domain comprising, in sequence, the hypervariable regions CDR1, CDR2 and CDR3 and the constant part or fragment thereof of a human heavy chain; said CDR1 having the amino acid sequence SEQ ID NO:1, said CDR2 having the amino acid sequence SEQ ID NO:2, and said CDR3 having the amino acid sequence SEQ ID NO:3; and b) an immunoglobulin light chain or fragment thereof which comprises a variable domain comprising, in sequence, the hypervariable regions CDR1', CDR2', and CDR3' and the constant part or fragment thereof of a human light chain, said CDR1' having the amino acid sequence SEQ ID NO:4, said CDR2' having the amino acid sequence SEQ ID NO:5, and said CDR3' having the amino acid sequence SEQ ID NO:6.

In one embodiment, the IL-17 antibody or antigen-binding fragment thereof is selected from a single chain antibody or antigen-binding fragment thereof that comprises an antigen-binding site comprising: a) a first domain comprising, in sequence, the hypervariable regions CDR1, CDR2 and CDR3, said CDR1 having the amino acid sequence SEQ ID NO:1, said CDR2 having the amino acid sequence SEQ ID NO:2, and said CDR3 having the amino acid sequence SEQ ID NO:3; and b) a second domain comprising, in sequence, the hypervariable regions CDR1', CDR2' and CDR3', said CDR1' having the amino acid sequence SEQ ID NO:4, said CDR2' having the amino acid sequence SEQ ID NO:5, and said CDR3' having the amino acid sequence SEQ ID NO:6; and c) a peptide linker which is bound either to the N-terminal extremity of the first domain and to the C-terminal extremity of the second domain or to the C-terminal extremity of the first domain and to the N-terminal extremity of the second domain.

Alternatively, an IL-17 antibody or antigen-binding fragment thereof as used in the disclosed methods may comprise a derivative of the IL-17 antibodies set forth herein by sequence (e.g., a pegylated version of secukinumab). Alternatively, the $V_H$ or $V_L$ domain of an IL-17 antibody or antigen-binding fragment thereof used in the disclosed methods may have $V_H$ or $V_L$ domains that are substantially identical to the $V_H$ or $V_L$ domains set forth herein (e.g., those set forth in SEQ ID NO:8 and 10). A human IL-17 antibody disclosed herein may comprise a heavy chain that is substantially identical to that set forth as SEQ ID NO:15 and/or a light chain that is substantially identical to that set forth as SEQ ID NO: 14. A human IL-17 antibody disclosed herein may comprise a heavy chain that comprises SEQ ID NO:15 and a light chain that comprises SEQ ID NO: 14. A human IL-17 antibody disclosed herein may comprise: a) one heavy chain which comprises a variable domain having an amino acid sequence substantially identical to that shown in SEQ ID NO:8 and the constant part of a human heavy chain; and b) one light chain which comprises a variable domain having an amino acid sequence substantially identical to that shown in SEQ ID NO: 10 and the constant part of a human light chain.

Alternatively, an IL-17 antibody or antigen-binding fragment thereof used in the disclosed methods may be an amino acid sequence variant of the reference IL-17 antibodies set forth herein, as long as it contains CysL97. The disclosure also includes IL-17 antibodies or antigen-binding fragments thereof (e.g., secukinumab) in which one or more of the amino acid residues of the $V_H$ or $V_L$ domain of secukinumab (but not CysL97), typically only a few (e.g., 1-10), are changed; for instance by mutation, e.g., site directed mutagenesis of the corresponding DNA sequences. In all such cases of derivative and variants, the IL-17 antibody or antigen-binding fragment thereof is capable of inhibiting the activity of about 1 nM (=30 ng/ml) human IL-17 at a concentration of about 50 nM or less, about 20 nM or less, about 10 nM or less, about 5 nM or less, about 2 nM or less, or more preferably of about 1 nM or less of said molecule by 50%, said inhibitory activity being measured on IL-6 production induced by hu-IL-17 in human dermal fibroblasts as described in Example 1 of WO 2006/013107.

In some embodiments, the IL-17 antibodies or antigen-binding fragments thereof, e.g., secukinumab, bind to an epitope of mature human IL-17 comprising Leu74, Tyr85, His86, Met87, Asn88, Val124, Thr125, Pro126, Ile127, Val128, His129. In some embodiments, the IL-17 antibody, e.g., secukinumab, binds to an epitope of mature human IL-17 comprising Tyr43, Tyr44, Arg46, Ala79, Asp80. In some embodiments, the IL-17 antibody, e.g., secukinumab, binds to an epitope of an IL-17 homodimer having two mature human IL-17 chains, said epitope comprising Leu74, Tyr85, His86, Met87, Asn88, Val124, Thr125, Pro126, Ile127, Val128, His129 on one chain and Tyr43, Tyr44, Arg46, Ala79, Asp80 on the other chain. The residue numbering scheme used to define these epitopes is based on residue one being the first amino acid of the mature protein (i.e., IL-17A lacking the 23 amino acid N-terminal signal peptide and beginning with Glycine). The sequence for immature IL-17A is set forth in the Swiss-Prot entry Q16552. In some embodiments, the IL-17 antibody has a $K_D$ of about 100-200 pM. In some embodiments, the IL-17 antibody has an $IC_{50}$ of about 0.4 nM for in vitro neutralization of the biological activity of about 0.67 nM human IL-17A. In some embodiments, the absolute bioavailability of subcutaneously (SC) administered IL-17 antibody has a range of about 60-about 80%, e.g., about 76%. In some embodiments, the IL-17 antibody, such as secukinumab, has an elimination half-life of about 4 weeks (e.g., about 23 to about 35 days, about 23 to about 30 days, e.g., about 30 days). In some embodiments, the IL-17 antibody (such as secukinumab) has a $T_{max}$ of about 7-8 days.

Particularly preferred IL-17 antibodies or antigen-binding fragments thereof used in the disclosed methods are human antibodies, especially secukinumab as described in Examples 1 and 2 of WO 2006/013107. Secukinumab is a recombinant high-affinity, fully human monoclonal anti-human interleukin-17A (IL-17A, IL-17) antibody of the IgG₁/kappa isotype. Secukinumab (see, e.g., WO2006/013107 and WO2007/117749) has a very high affinity for IL-17, i.e., a $K_D$ of about 100-200 pM and an $IC_{50}$ for in vitro neutralization of the biological activity of about 0.67 nM human IL-17A of about 0.4 nM. Thus, secukinumab inhibits antigen at a molar ratio of about 1:1. This high binding affinity makes the secukinumab antibody particularly suitable for therapeutic applications. Furthermore, it has been determined that secukinumab has a very long half-life, i.e., about 4 weeks, which allows for prolonged periods between administration, an exceptional property when treating chronic life-long disorders, such as PsA and axSpA (i.e., nr-axSpA and AS, e.g., nr-axSpA, e.g., AS).

Other preferred IL-17 antibodies for use in the disclosed methods, kits and regimens are those set forth in U.S. Pat. Nos. 8,057,794; 8,003,099; 8,110,191; and 7,838,638 and US Published Patent Application Nos: 20120034656 and 20110027290, which are incorporated by reference herein in their entirety.

Methods of Treatment and Uses of IL-17 Antagonists

The disclosed IL-17 antagonists, e.g., IL-17 binding molecules (e.g., IL-17 antibody or antigen-binding fragment thereof, e.g., secukinumab) or IL-17 receptor binding molecules (e.g., IL-17 receptor antibody or antigen-binding fragment thereof), may be used in vitro, ex vivo, or incorporated into pharmaceutical compositions and administered in vivo to treat PsA or axSpA (i.e., nr-axSpA and AS, e.g., nr-axSpA, e.g., AS) patients (e.g., human patients) and/or to inhibit the progression of structural damage in PsA or axSpA (i.e., nr-axSpA and AS, e.g., nr-axSpA, e.g., AS) patients, e.g., PsA or axSpA patients that have not previously been treated with a TNF alpha inhibitor (TNF-naïve patients), PsA or axSpA patients that have been previously treated with a TNF alpha inhibitor, e.g., PsA or axSpA patients having been treated with a TNF alpha inhibitor, but who had an inadequate response (e.g., failed or less than desirable) thereto (TNF-IR patients), and PsA or axSpA patients that have been previously treated with an NSAID but who had an inadequate response (e.g., failed or less than desirable) thereto.

It is also contemplated that the disclosed IV regimens (e.g., initial dose of 6 mg/kg, and then 3 mg/kg thereafter) utilizing the disclosed IL-17 antagonists, e.g., IL-17 binding molecules (e.g., IL-17 antibody or antigen-binding fragment thereof, e.g., secukinumab) or IL-17 receptor binding molecules (e.g., IL-17 receptor antibody or antigen-binding fragment thereof), may be administered to treat patients having psoriasis (e.g., pustular or plaque-type psoriasis), asthma, acne, tendinopathy (e.g., plantar fasciitis, Achilles tendinopathy, patellar tendinopathy (tendinitis), rotator cuff tendinopathy, jumper's knee, lateral epicondylitis, medial epicondylitis, supraspinatus syndrome, or any combination thereof), Graves' Orbitopathy (thyroid eye disease, Graves' ophthalmopathy, Graves' eye disease), hidradenitis suppurativa, uveitis (including pediatric uveitis), Juvenile Idiopathic Arthritis (JIA) (including JIA associated with uveitis), or vasculitis (e.g., Behcet's syndrome, Buerger's disease (thromboangiitis obliterans), peripheral spondyloarthritis, antineutrophil cytoplasmic autoantibody (ANCA)-associated systemic vasculitis (AASV) (also called AAV-ANCA associated vasculitis), Wegener's granulomatosis (WG) (large vessel vasculitis, granulomatosis with polyangiitis), microscopic polyangiitis (MPA), Churg-Strauss syndrome (CSS) (eosinophilic granulomatosis with polyangiitis (EPGA)), cryoglobulinemia, giant cell arteritis (GCA), Henoch-Schonlein purpura, hypersensitivity vasculitis, Kawasaki disease (mucocutaneous lymph node syndrome), polyarteritis nodosa, rheumatoid vasculitis, Takayasu's arteritis, and polymyalgia rheumatica (PMR)), CRMO (chronic relapsing multifocal osteomyelitis), CNO (chronic non-bacterial osteomyelitis), SAPHO syndrome, peripheral arthritis, reactive arthritis, undifferential peripheral arthritis, and IBD associated with PsA.

The disclosed fully intravenous regimens, which use weight-based (rather than flat) dosing, are expected to provide more consistent secukinumab concentrations, and thus efficacy, regardless of weight, when compared to the currently-approved fully subcutaneous secukinumab regimens (i.e., 150 mg or 300 mg secukinumab given SC with initial dosing at weeks 0, 1, 2, 3 and 4, followed by monthly maintenance dosing). This is considered a significant benefit for patients.

The effectiveness of the disclosed methods, kits, uses and compositions in treating various disorders, particularly PsA or axSpA, e.g., AS or nr-axSpA, may be measured by various criteria known in the art, including: ASAS (Assessment in SpondyloArthritis International Society) Criteria, the Bath Ankylosing Spondylitis Disease Activity Index, Ankylosing Spondylitis Quality of Life (ASQoL) scale, American College of Rheumatology 20 (ACR20) or 40 (ACR40) or 50 (ACR5) responses, van der Heijde-modified total Sharp score (vdH-mTSS), Psoriatic Area and Severity Index scores (e.g., PASI75, PASI90, PASI100), Health Assessment Questionnaire-Disability Index (HAQ-DI scores range from 0 to 3 with higher scores indicate greater disability); change from baseline in the 28-joint Disease Activity Score using C reactive protein (DAS28-CRP, with higher scores indicating more active disease); and resolution of enthesitis and dactylitis. etc. (See, e.g., Mease P, et al. (2018) Ann Rheum Dis 77:890-897 for a discussion of PsA measures; Baeten et al. (2015) N Engl J Med 373:2534-48 for a discussion of axSpA measures). Further efficacy criteria are found in the Examples. Details on some exemplary criteria are found below, which should not be construed as limiting.

The ASAS (Assessment in SpondyloArthritis International Society) assessment criteria (1-6) consists of the following assessment domains: (1) Patient global assessment of disease activity, assessed on a 100 mm visual analogue scale (VAS); (2) Pain, assessed by the VAS pain score (0-100 scale) or NRS (0-10); (3) Physical function, assessed by BASFI score (0-100 scale); (4) Inflammation, assessed by the mean of the two morning stiffness-related BASDAI questions #5 and #6 on a 10 point scale or 100 mm VAS scores; (5) Bath Ankylosing Spondylitis Metrology Index (BASMI); scores (cervical rotation, chest expansion, lumbar lateral flexion, modified Schober index, occiput-to-wall distance); (6) C-reactive protein (acute phase reactant).

ASAS20 Responder Definition

A subject is defined as an ASAS20 responder if the following conditions hold:
1. they have a ≥20% improvement and an absolute improvement ≥1 unit in ≥3 of the following 4 core ASAS domains: Patient Global Assessment (measured on a VAS from 0-ain (measured as total back pain or nocturnal back pain on a VAS from 0-100 mm); Physical function (as measured by the BASFI, 0-10); Inflammation (as measured by the mean of the two morning stiffness related questions #5 and #6 from the BASDAI, 0-10);
2. they have no deterioration in the potential remaining domain (deterioration is defined as ≥20% worsening and an absolute worsening of ≥1 unit from baseline).

ASAS40 Responder Definition

A subject is defined as an ASAS40 responder if the following conditions hold:
1. they have >40% improvement and an absolute improvement >2 units in 3 of the following 4 domains: Patient Global Assessment (measured on a VAS from 0-100 mm); Back pain (measured as total back pain or nocturnal back pain on a VAS from 0-100 mm); Physical function (as measured by the BASFI, 0-10); Inflammation (as measured by the mean of the two morning stiffness related questions #5 and #6 from the BASDAI, 0-10);
2. they have no worsening at all in the potential remaining domain of >0% or >0 unit) from baseline.

ASAS 5/6 Responder Definition

A subject is defined as an ASAS 5/6 responder if they have >20% improvement in five out of the following six ASAS domains: Patient Global Assessment (measured on a VAS from 0-100 mm); Back pain (measured as total back pain or nocturnal back pain on a VAS from 0-100 mm); Physical function (as measured by the BASFI, 0-10); Inflammation (as measured by the mean of the two morning stiffness related questions #5 and #6 from the BASDAI, 0-10); Bath Ankylosing Spondylitis Metrology Index (BASMI); scores (cervical rotation, chest expansion, lumbar lateral flexion, modified Schober index, occiput-to-wall distance); (6) C-reactive protein (acute phase reactant).

ASAS Partial Remission Definition

A subject is defined as achieving partial remission if they have a value of <2 units in each of the following 4 core ASAS domains: Patient Global Assessment (measured on a VAS from 0-100 mm); Back pain (measured as total back pain or nocturnal back pain on a VAS from 0-100 mm); Physical function (as measured by the BASFI, 0-10); Inflammation (as measured by the mean of the two morning stiffness related questions #5 and #6 from the BASDAI, 0-10).

Bath Ankylosing Spondylitis Functional Index (BASFI)

The BASFI is a set of 10 questions designed to determine the degree of functional limitation in those patients with axSpA, e.g., AS or nr-axSpA. The ten questions were chosen with a major input from patients with axSpA, e.g., AS or nr-axSpA. The first eight questions consider activities related to functional anatomy. The final two questions assess the patients' ability to cope with everyday life. A 10 cm visual analog scale is used to answer the questions. The mean of the ten scales gives the BASFI score—a value between 0 and 10.

Bath Ankylosing Spondylitis Disease Activity Index (BASDAI)

The BASDAI consists of a 0-10 scale (0 being no problem and 10 being the worst problem), which is used to answer 6 questions pertaining to the 5 major symptoms of axSpA, e.g., AS or nr-axSpA: 1. Fatigue; 2. Spinal pain; 3. Joint pain/swelling; 4. Areas of localized tenderness (called enthesitis, or inflammation of tendons and ligaments); 5. Morning stiffness duration; 6. Morning stiffness severity. To give each symptom equal weighting, the mean (average) of the two scores relating to morning stiffness is added to the scores of the other 4 questions. The resulting 0 to 50 score is divided by 5 to give a final 0-10 BASDAI score. BASDAI scores of 4 or greater suggest suboptimal control of disease, and patients with scores of 4 or greater are usually good candidates for either a change in their medical therapy or for enrollment in clinical trials evaluating new drug therapies directed at axSpA, e.g., AS or nr-axSpA.

Bath Ankylosing Spondylitis Disease Activity Index (BASDAI 50)

The BASDAI 50 is defined as an improvement of at least 50% in the BASDAI compared to baseline.

Patient's Global Assessment of Disease Activity

The patient's global assessment of disease activity may be performed using a 100 mm visual analog scale (VAS) ranging from no disease activity to maximal disease activity in response to the question, "Considering all the ways your arthritis affects you, draw a line on the scale for how well you are doing".

Patient's Assessment of Pain Intensity

The patient's assessment of back pain may be performed using a 100 mm VAS ranging from no pain to unbearable pain, as assessed separately for total back pain or nocturnal back pain.

Bath Ankylosing Spondylitis Metrology Index (BASMI)

The BASMI is a validated instrument that uses the minimum number of clinically appropriate measurements that assess accurately axial status, with the goal to define clinically significant changes in spinal movement. Parameters include 1. cervical rotation; 2. tragus to wall distance; 3. lumbar side flexion; 4. modified Schober's; 5. intermalleolar distance. Two additional parameters are also assessed: 6. chest expansion and 7. occiput-to-wall distance.

Maastricht Ankylosing Spondylitis Enthesitis Score (MASES)

The Maastricht Ankylosing Spondylitis Enthesitis Score (MASES) was developed from the Mander index, and includes assessments of 13 sites. Enthesitis sites included in the MASES index are: 1st costochondral, $7^{th}$ costochondral, posterior superior iliac spine, anterior superior iliac spine, iliac crest (all above will be assessed bilaterally), 5th lumbar spinous process, proximal Achilles (bilateral).

Leeds Enthesis Index (LEI)

LEI is a validated enthesis index that uses only 6 sites for evaluation of enthesis: lateral epicondyle humerus L+R, proximal achilles L+R and lateral condyle femur. While LEI demonstrated substantial to excellent agreement with other scores in the indication of psoriatic arthritis, LEI demonstrated a lower degree of agreement with MASES in ankylosing spondylitis and might thus yield additional information in this indication.

MRI

Magnetic resonance imaging (MRI) of the spine may be performed using a scoring system for quantification of AS-related pathologies, to investigate whether these changes were affected by treatment with the IL-17 antibody (e.g., secukinumab). MRIs can be acquired locally at the clinical sites, and images transmitted, quality controlled, de-identified (if necessary) and analyzed centrally (blinded review). MRI scans can be collected at baseline (preferably within 2 weeks prior to first treatment) and at Week 6 (±1 week) and Week 28 (±1 week). MRI scans include pre- and post-intravenous gadolinium contrast enhanced MRI for evaluating inflammation and fat-saturating techniques such as short tau inversion recovery (STIR) to monitor bone marrow edema. The analysis method is the 'Berlin modification of ASspiMRI-a' (Lukas C et al (2007) J Rheumatol; 34(4): 862-70 and Rudwaleit et al (2005) [abstract] Arthritis Rheum 50:S211), which scores inflammatory changes in nearly the entire vertebral column (C2-S1). ASspiMRI-a Berlin modification score and Berlin SIJ edema score are preferred MRI assessments of the SIJ.

ASDAS-CRP and ASDAS Response Categories

The Ankylosing Spondylitis Disease Activity Score (ASDAS) is a composite index to assess disease activity in AS.

ASDAS-CRP will be utilized to assess the disease activity status. Parameters used for the ASDAS include: total back pain (BASDAI question 2), the patient global assessment of disease activity, peripheral pain/swelling (BASDAI question 3), duration of morning stiffness (BASDAI question 6) and C-reactive protein (CRP) in mg/L.

Disease activity states: inactive disease, moderate disease activity, high disease activity, and very high disease activity. The 3 values selected to separate these states are: <1.3 between inactive disease and moderate disease activity; <2.1 between moderate disease activity and high disease activity; and >3.5 between high disease activity and very high disease activity. Selected cutoffs for improvement scores are a change ≥1.1 unit for "minimal clinically important improvement" and a change ≥2.0 units for "major improvement".

ASQoL

Quality of life of axSpA patients may be measured using an AS-specific quality of life instrument as per Doward et al. (2003) Ann Rheum Dis 2003; 62:20-26.

Tender and Swollen Joints (44 Joint-Count)

The following 44 joints are assessed for tenderness and swelling:

2 Sternoclavicular joints (L+R)
2 Acromioclavicular joints (L+R)
2 Shoulder joints (L+R)
2 Elbows (L+R)
2 Wrists (L+R)
10 Metacarpophalangeal joints (L+R)
10 Proximal interphalangeal joints (L+R) (hands)
2 Knees (L+R)
2 Ankles (L+R)
10 Metatarsophalangeal joints (L+R)

The tender joint count (44 joints) is done by scoring several different aspects of tenderness, assessed by pressure and joint manipulation on physical examination. The information on various types of tenderness should thereafter be collapsed into a single "tender" versus "non-tender" dichotomy.

Synovial fluid and/or soft tissue swelling, but not bony overgrowth, represents a positive result for swollen joint count.

Sleep Improvement

To measure improvement in sleep (e.g., improved sleep quality, improved sleep disturbance, etc.) and reduction in nocturnal awakening by using subjective sleep patient reported outcomes (i.e., ESS and PSQI) in conjunction with data from a wearable device (e.g., a wrist worn actigraph). Key endpoints include, e.g., nightly wake after sleep onset (WASO) cumulative minutes and number of wake events per sleep period (e.g., minute), nocturnal awakening, sleep efficiency (percent), sleep latency (minute), total sleep time (minute).

American College of Rheumatology (ACR) Response

The ACR response (Appendix 4) will be used to determine efficacy (Felson et al 1995). A subject is defined as an ACR 50 responder if, and only if, the following three conditions hold:

≥50% improvement in the number of tender joints (based on 78 joints)

≥50% improvement in the number of swollen joints (based on 76 joints)

≥50% improvement in three of the following five domains

Patient's global assessment of disease activity (measured on a VAS scale, 0-100)

Physician's global assessment of disease activity (measured on a VAS scale, 0-100)

Patient's assessment of PsA pain (measured on a VAS scale, 0-100)

Health Assessment Questionnaire (HAQ©) score

Acute phase reactant (hsCRP or ESR)

ACR20=20% improvement in at least 3 of the 5 measures and 20% improvement in the swollen and tender joint count.

ACR50=50% improvement in at least 3 of the 5 measures and 50% improvement in the swollen and tender joint count.

ACR70=70% improvement in at least 3 of the 5 measures and 70% improvement in the swollen and tender joint count.

Psoriasis Area and Severity Index (PASI)

The PASI assesses the extent of psoriasis on four body surface areas (head, trunk and upper and lower limbs) and the degree of plaque erythema, scaling and thickness. A PASI score can be derived, e.g., as described in Weisman et al 2003 J Dermatolog Treat p. 158-65. In brief, the head, trunk, upper limbs and lower limbs are assessed separately for erythema, thickening (plaque elevation, induration), and scaling (desquamation). The average degree of severity of each sign in each of the four body regions is assigned a score of 0-4. The area covered by lesions on each body region is estimated as a percentage of the total area of that particular body region.

Additional efficacy outcomes commonly used to assess efficacy of treatment for PsA patients, include Swollen Joint Count (SJC)/Tender Joint Count (TJC); Patient's global assessment of disease activity (VAS); Physician's global assessment of disease activity (VAS); Patient's assessment of PsA pain intensity (VAS); Health Assessment Questionnaire-Disability Index (HAQ-DI©); high sensitivity C-Reactive Protein (hsCRP); Erythrocyte Sedimentation Rate (ESR); Psoriatic arthritis response criteria (PsARC) response; Disease Activity Score-CRP (DAS28-CRP) and EULAR response criteria; Psoriatic Arthritis Disease Activity Score (PASDAS); Patient's global assessment of psoriasis and arthritis disease activity (VAS); Minimal disease activity; Leeds Dactylitis Index (LDI) and dactylitis count; Leeds Enthesitis Index (LEI); Spondyloarthritis Research Consortium of Canada (SPARCC) index; Novartis Investigator's Global Assessment modified 2011 (IGA mod 2011; Modified Nail Psoriasis Severity Index (mNAPSI); Physician global fingernail disease severity assessment (VAS).

As used herein, the phrase "population of patients" refers to a set of PsA or axSpA (i.e., nr-axSpA and AS, e.g., nr-axSpA, e.g., AS) patients of sufficient size to perform a statistical analysis for a given disease score, e.g., ACR20, ACR40, PASI75, PASI 90, ASAS 20, ASAS 40, BASDI, etc.

In some embodiments, when a population of TNF naive PsA patients is treated according to the claimed methods (e.g., using a loading dose of 6 mg/kg at week 0, followed by monthly administrations of 3 mg/kg secukinumab), the population achieves an ACR20/50/70 (at week 16, placebo not subtracted) of at least about 55%, 32%, 14%, respectively. In some embodiments, when a population of TNF naive PsA patients is treated according to the claimed methods (e.g., using a loading dose of 6 mg/kg at week 0, followed by monthly administrations of 3 mg/kg secukinumab), the population achieves an ACR20/50/70 (at week 16, placebo not subtracted) of at least about 58%, 37%, 18%, respectively.

In some embodiments, when a population of TNF-IR PsA patients is treated according to the claimed methods (e.g., using a loading dose of 6 mg/kg at week 0, followed by monthly administrations of 3 mg/kg secukinumab), the population achieves an ACR20/50/70 (at week 16, placebo not subtracted) of at least about 40%, 20%, 10%, respectively. In some embodiments, when a population of TNF-IR PsA patients is treated according to the claimed methods (e.g., using a loading dose of 6 mg/kg at week 0, followed by monthly administrations of 3 mg/kg secukinumab), the population achieves an ACR20/50/70 (at week 16, placebo not subtracted) of at least about 45%, 23%, 12%, respectively.

In some embodiments, when a population of PsA patients is treated according to the claimed methods (e.g., using a loading dose of 6 mg/kg at week 0, followed by monthly administrations of 3 mg/kg secukinumab), the population achieves a PASI75/90 (at week 16) of at least about 57% and 35%, respectively. In some embodiments, when a population of PsA patients is treated according to the claimed methods (e.g., using a loading dose of 6 mg/kg at week 0, followed by monthly administrations of 3 mg/kg secukinumab), the population achieves a PASI75/90 (at week 16) of at least about 70% and 47%, respectively.

In some embodiments, when a population of ax-SpA patients is treated according to the claimed methods (e.g., using a loading dose of 6 mg/kg at week 0, followed by monthly administrations of 3 mg/kg secukinumab), the population achieves an ASAS40 (at week 16; placebo not subtracted) of at least about 37% or 39%. In some embodiments, when a population of ax-SpA patients is treated according to the claimed methods (e.g., using a loading dose of 6 mg/kg at week 0, followed by monthly administrations of 3 mg/kg secukinumab), the population achieves an ASDAS-CRP major improvement (at week 16) of at least about 28%. In some embodiments, when a population of ax-SpA patients is treated according to the claimed methods (e.g., using a loading dose of 6 mg/kg at week 0, followed by monthly administrations of 3 mg/kg secukinumab), the population achieves an ASDAS-CRP inactive disease (at week 16) of at least about 14% or 17%. In some embodiments, when a population of ax-SpA patients is treated according to the claimed methods (e.g., using a loading dose of 6 mg/kg at week 0, followed by monthly administrations of 3 mg/kg secukinumab), the population achieves an ASAS20 (at week 16; placebo not subtracted) of at least about 53% or 56%. In some embodiments, when a population of ax-SpA patients is treated according to the claimed methods (e.g., using a loading dose of 6 mg/kg at week 0, followed by monthly administrations of 3 mg/kg secukinumab), the population achieves an ASAS40 (at week 52) of at least about 36% or 50%.

The IL-17 antagonists, e.g., IL-17 binding molecules (e.g., IL-17 antibody or antigen-binding fragment thereof, e.g., secukinumab) or IL-17 receptor binding molecules (e.g., IL-17 antibody or antigen-binding fragment thereof), may be used as a pharmaceutical composition when combined with a pharmaceutically acceptable carrier. Such a composition may contain, in addition to an IL-17 antagonist, carriers, various diluents, fillers, salts, buffers, stabilizers, solubilizers, and other materials well known in the art. The characteristics of the carrier will depend on the route of administration. The pharmaceutical compositions for use in the disclosed methods may also contain additional therapeutic agents for treatment of the particular targeted disorder. For example, a pharmaceutical composition may also include anti-inflammatory agents. Such additional factors and/or agents may be included in the pharmaceutical composition to produce a synergistic effect with the IL-17 binding molecules, or to minimize side effects caused by the IL-17 antagonists, e.g., IL-17 binding molecules (e.g., IL-17 antibody or antigen-binding fragment thereof, e.g., secukinumab) or IL-17 receptor binding molecules (e.g., IL-17 antibody or antigen-binding fragment thereof).

Pharmaceutical compositions for use in the disclosed methods may be manufactured in conventional manner. In one embodiment, the pharmaceutical composition is provided in lyophilized form. For immediate administration it is dissolved in a suitable aqueous carrier, for example sterile water for injection or sterile buffered physiological saline. If it is considered desirable to make up a solution of larger volume for administration by infusion rather than a bolus injection, may be advantageous to incorporate human serum albumin or the patient's own heparinised blood into the saline at the time of formulation. The presence of an excess of such physiologically inert protein prevents loss of antibody by adsorption onto the walls of the container and tubing used with the infusion solution. If albumin is used, a suitable concentration is from 0.5 to 4.5% by weight of the saline solution. Other formulations comprise liquid or lyophilized formulation.

Antibodies, e.g., antibodies to IL-17, are typically formulated either in aqueous form ready for parenteral administration or as lyophilisates for reconstitution with a suitable diluent prior to administration. In some embodiments of the disclosed methods and uses, the IL-17 antagonist, e.g., IL-17 antibody, e.g., secukinumab, is formulated as a lyophilisate. Suitable lyophilisate formulations can be reconstituted in a small liquid volume (e.g., 2 ml or less) to allow subcutaneous administration and can provide solutions with low levels of antibody aggregation. The use of antibodies as the active ingredient of pharmaceuticals is now widespread, including the products HERCEPTIN™ (trastuzumab), RITUXAN™ (rituximab), SYNAGIS™ (palivizumab), etc. Techniques for purification of antibodies to a pharmaceutical grade are well known in the art. When a therapeutically effective amount of an IL-17 antagonist, e.g., IL-17 binding molecules (e.g., IL-17 antibody or antigen-binding fragment thereof, e.g., secukinumab) or IL-17 receptor binding molecules (e.g., IL-17 antibody or antigen-binding fragment thereof) is administered by intravenous, cutaneous or subcutaneous injection, the IL-17 antagonist will be in the form of a pyrogen-free, parenterally acceptable solution. A pharmaceutical composition for intravenous, cutaneous, or subcutaneous injection may contain, in addition to the IL-17 antagonist, an isotonic vehicle such as sodium chloride, Ringer's solution, dextrose, dextrose and sodium chloride, lactated Ringer's solution, or other vehicle as known in the art.

The appropriate dosage varies depending upon, for example, the particular IL-17 antagonists, e.g., IL-17 binding molecules (e.g., IL-17 antibody or antigen-binding fragment thereof, e.g., secukinumab) or IL-17 receptor binding molecules (e.g., IL-17 antibody or antigen-binding fragment thereof) to be employed, the host, the mode of administration and the nature and severity of the condition being treated, and on the nature of prior treatments that the patient has undergone. Ultimately, the attending health care provider will decide the amount of the IL-17 antagonist with which to treat each individual patient. In some embodiments, the attending health care provider may administer low doses of the IL-17 antagonist and observe the patient's response. In other embodiments, the initial dose(s) of IL-17 antagonist administered to a patient are high, and then are titrated downward until signs of relapse occur. Larger doses of the IL-17 antagonist may be administered until the optimal therapeutic effect is obtained for the patient, and the dosage is not generally increased further.

In practicing some of the methods of treatment or uses of the present disclosure, a therapeutically effective amount of an IL-17 antagonist, e.g., IL-17 binding molecule (e.g., IL-17 antibody or antigen-binding fragment thereof, e.g., secukinumab) or IL-17 receptor binding molecule (e.g., IL-17 antibody or antigen-binding fragment thereof) is administered to a patient, e.g., a mammal (e.g., a human). While it is understood that the disclosed methods provide for treatment of PsA or axSpA (i.e., nr-axSpA and AS, e.g., nr-axSpA, e.g., AS) patients using an IL-17 antagonist (e.g., secukinumab), this does not preclude that, if the patient is to be ultimately treated with an IL-17 antagonist, such IL-17 antagonist therapy is necessarily a monotherapy. Indeed, if a patient is selected for treatment with an IL-17 antagonist, then the IL-17 antagonist (e.g., secukinumab) may be administered in accordance with the methods of the disclosure either alone or in combination with other agents and therapies for treating PsA or axSpA (i.e., nr-axSpA and AS, e.g., nr-axSpA, e.g., AS) patients, e.g., in combination with at least one additional PsA or axSpA agent, such as an immunosuppressive agent, a disease-modifying anti-rheumatic drug (DMARD) (e.g., sulfasalazine), a pain-control drug, a steroid, a non-steroidal anti-inflammatory drug (NSAID), a cytokine antagonist, a bone anabolic, a bone anti-resorptive, and combinations thereof (e.g., dual and triple therapies), a TNF-alpha antagonist. When coadministered with one or more additional PsA or axSpA agents, an IL-17 antagonist may be administered either simultaneously with the other agent, or sequentially. If administered sequentially, the attending physician will decide on the appropriate sequence of administering the IL-17 antagonist in combination with other agents and the appropriate dosages for co-delivery.

Non-steroidal anti-inflammatory drugs (NSAIDs) and pain control agents useful in combination with secukinumab for the treatment of PsA or axSpA (i.e., nr-axSpA and AS, e.g., nr-axSpA, e.g., AS) patients include, but are not limited to, propionic acid derivative, acetic acid derivative, enolic acid derivatives, fenamic acid derivatives, Cox inhibitors, e.g., lumiracoxib, ibuprofen, fenoprofen, ketoprofen, flurbiprofen, oxaprozin, indomethacin, sulindac, etodolac, ketorolac, nabumetone, aspirin, naproxen, valdecoxib, etoricoxib, MK0966, rofecoxib, acetaminophen, celecoxib, diclofenac, tramadol, piroxicam, meloxicam, tenoxicam, droxicam, lornoxicam, isoxicam, mefanamic acid, meclofenamic acid, flufenamic acid, tolfenamic, parecoxib, firocoxib. DMARDs useful in combination with an IL-17 antagonist, e.g., secukinumab, for the treatment of PsA or axSpA (i.e., nr-axSpA and AS, e.g., nr-axSpA, e.g., AS) patients include, but are not limited to, methotrexate (MTX), antimalarial drugs (e.g., hydroxychloroquine and chloroquine), sulfasalazine, leflunomide, azathioprine, cyclosporin, gold salts, minocycline, cyclophosphamide, D-penicillamine, minocycline, auranofin, tacrolimus, myocrisin, chlorambucil. Steroids (e.g., glucocorticoids) useful in combination with an IL-17 antagonist, e.g., secukinumab, for the treatment of a PsA or axSpA (i.e., nr-axSpA and AS, e.g., nr-axSpA, e.g., AS) patient include, but are not limited to, prednisolone, prednisone, dexamethasone, cortisol, cortisone, hydrocortisone, methylprednisolone, betamethasone, triamcinolone, beclometasone, fludrocortisone, deoxycorticosterone, aldosterone.

Biologic agents that may be useful in combination with an IL-17 antagonist, e.g., secukinumab, for the treatment of a PsA or axSpA (i.e., nr-axSpA and AS, e.g., nr-axSpA, e.g., AS) patient include, but are not limited to, ADALIMUMAB (Humira®), ETANERCEPT (Enbrel®), INFLIXIMAB (Remicade®; TA-650), CERTOLIZUMAB PEGOL (Cimzia®; CDP870), GOLIMUMAB (Simponi®; CNTO148), RITUXIMAB (Rituxan®; MabThera®), ABATACEPT (Orencia®), TOCILIZUMAB (RoActemAS/Actemra®), integrin antagonists (TYSABRI® (natalizumab)), IL-1 antagonists (ACZ885, Canakinumab (Ilaris®), anakinra (Kineret®)), CD4 antagonists, other IL-17 antagonists (LY2439821, ixekizumab, RG4934, AMG827, brodalumab, SCH900117, R05310074, MEDI-571, CAT-2200), IL-23 antagonists, IL-20 antagonists, IL-6 antagonists, other TNF alpha antagonists (e.g., other TNF alpha antagonists or TNF alpha receptor antagonsits, e.g., pegsunercept, etc.), BLyS antagonists (e.g., Atacicept, Benlysta®/LymphoStat-B® (belimumab)), P38 Inhibitors, CD20 antagonists (Ocrelizumab, Ofatumumab (Arzerra®)), Interferon gamma antagonists (Fontolizumab) or biosimilar versions of these biologic agents.

An IL-17 antagonist, e.g., IL-17 binding molecule (e.g., IL-17 antibody or antigen-binding fragment thereof, e.g., secukinumab) or IL-17 receptor binding molecule (e.g., IL-17 receptor antibody or antigen-binding fragment thereof) is conveniently administered intravenously (e.g., into the antecubital or other peripheral vein). The duration of intravenous (IV) therapy using a pharmaceutical composition of the present disclosure will vary, depending on the severity of the disease being treated and the condition and personal response of each individual patient. The health care provider will decide on the appropriate duration of IV therapy and the timing of administration of the therapy, using the pharmaceutical composition of the present disclosure.

An infusion duration of 15 minutes, 30 minutes, 45 minutes or 1 hour is preferred.

The IL-17 antagonist, e.g., IL-17 binding molecule (e.g., IL-17 antibody or antigen-binding fragment thereof, e.g., secukinumab) or IL-17 receptor binding molecule (e.g., IL-17 receptor antibody or antigen-binding fragment thereof) is initially administered (e.g., as part of a loading regimen) to the patient (e.g., a patient having hidradenitis suppurtiva, psoriasis (i.e., pustular or plaque-type psoriasis), PsA or axSpA (i.e., nr-axSpA or AS, e.g., nr-axSpA, e.g., AS), preferably a patient having PsA or axSpA) intravenously (IV) at about 4 mg/kg to about 9 mg/kg (preferably about 6 mg/kg) once during week 0, and thereafter (e.g., as part of a maintenance regimen) administered to the patient IV at about 2 mg/kg to about 4 mg/kg (preferably about 3 mg/kg) every month (every 4 weeks), beginning during week 4. In this manner, the patient is dosed IV with about 4 mg/kg to about 9 mg/kg (preferably about 6 mg/kg) during week 0, and then the patient is dosed IV with about 2 mg/kg to about 4 mg/kg (preferably about 3 mg/kg) of the IL-17 antagonist (e.g., preferably secukinumab) during week 4, 8, 12, etc.

Preferred regimens (dose and administration scheme) for use with the disclosed IL-17 antagonists to treat PsA or axSpA (e.g., nr-axSpA or AS) are provided in Table 2.

TABLE 2

Preferred IV/IV regimens for use in the disclosed methods employing an IL-17 antagonist, e.g., IL-17 binding molecule (e.g., IL-17 antibody or antigen-binding fragment thereof, e.g., secukinumab) or IL-17 receptor binding molecule (e.g., IL-17 receptor antibody or antigen-binding fragment thereof).

| Loading regimen (IV) | Maintenance regimen (IV) |
|---|---|
| about 4.0 mg/kg (e.g., 4.0 mg/kg) once during week 0 | about 2.0 mg/kg (e.g., 2.0 mg/kg) monthly (every 4 weeks), beginning during week 4 |
| about 4.0 mg/kg (e.g., 4.0 mg/kg) once during week 0 | about 3.0 mg/kg (e.g., 3.0 mg/kg) monthly (every 4 weeks), beginning during week 4 |
| about 4.0 mg/kg (e.g., 4.0 mg/kg) once during week 0 | about 4.0 mg/kg (e.g., 4.0 mg/kg) monthly (every 4 weeks), beginning during week 4 |
| about 5.0 mg/kg (e.g., 5.0 mg/kg) once during week 0 | about 2.5 mg/kg (e.g., 2.5 mg/kg) monthly (every 4 weeks), beginning during week 4 |
| about 6.0 mg/kg (e.g., 6.0 mg/kg) once during week 0 | about 2.0 mg/kg (e.g., 2.0 mg/kg) monthly (every 4 weeks), beginning during week 4 |
| about 6.0 mg/kg (e.g., 6.0 mg/kg) once during week 0 | about 3.0 mg/kg (e.g., 3.0 mg/kg) monthly (every 4 weeks), beginning during week 4 |
| about 6.0 mg/kg (e.g., 6.0 mg/kg) once during week 0 | about 4.0 mg/kg (e.g., 4.0 mg/kg) monthly (every 4 weeks), beginning during week 4 |
| about 7.0 mg/kg (e.g., 7.0 mg/kg) once during week 0 | about 3.5 mg/kg (e.g., 3.5 mg/kg) monthly (every 4 weeks), beginning during week 4 |
| about 8.0 mg/kg (e.g., 8.0 mg/kg) once during week 0 | about 4.0 mg/kg (e.g., 4.0 mg/kg) monthly (every 4 weeks), beginning during week 4 |
| about 9.0 mg/kg (e.g., 9.0 mg/kg) once during week 0 | about 2.0 mg/kg (e.g., 2.0 mg/kg) monthly (every 4 weeks), beginning during week 4 |
| about 9.0 mg/kg (e.g., 9.0 mg/kg) once during week 0 | about 3.0 mg/kg (e.g., 3.0 mg/kg) monthly (every 4 weeks), beginning during week 4 |
| about 9.0 mg/kg (e.g., 9.0 mg/kg) once during week 0 | about 4.0 mg/kg (e.g., 4.0 mg/kg) monthly (every 4 weeks), beginning during week 4 |
| about 10 mg/kg (e.g., 10 mg/kg) monthly (every 4 weeks) during week 0, 4, 8 | about 10 mg/kg (e.g., 10 mg/kg) every two months (every 8 weeks), beginning during week 16 |

The dosing regimens disclosed in Table 2 may also be used with the disclosed IL-17 antagonists to treat other autoimmune diseases, e.g., psoriasis (e.g., pustular or plaque-type psoriasis), asthma, acne, tendinopathy (e.g., plantar fasciitis, Achilles tendinopathy, patellar tendinopathy (tendinitis), rotator cuff tendinopathy, jumper's knee, lateral epicondylitis, medial epicondylitis, supraspinatus syndrome, or any combination thereof), Graves' Orbitopathy (thyroid eye disease, Graves' ophthalmopathy, Graves' eye disease), hidradenitis suppurativa, uveitis (including pediatric uveitis), Juvenile Idiopathic Arthritis (JIA) (including JIA associated with uveitis), or vasculitis (e.g., Behcet's syndrome, Buerger's disease (thromboangiitis obliterans), peripheral spondyloarthritis, antineutrophil cytoplasmic autoantibody (ANCA)-associated systemic vasculitis (AASV) (also called AAV-ANCA associated vasculitis), Wegener's granulomatosis (WG) (large vessel vasculitis, granulomatosis with polyangiitis), microscopic polyangiitis (MPA), Churg-Strauss syndrome (CSS) (eosinophilic granulomatosis with polyangiitis (EPGA)), cryoglobulinemia, giant cell arteritis (GCA), Henoch-Schonlein purpura, hypersensitivity vasculitis, Kawasaki disease (mucocutaneous lymph node syndrome), polyarteritis nodosa, rheumatoid vasculitis, Takayasu's arteritis, and polymyalgia rheumatica (PMR)), CRMO (chronic relapsing multifocal osteomyelitis), CNO (chronic non-bacterial osteomyelitis), SAPHO syndrome, peripheral arthritis, reactive arthritis, undifferential peripheral arthritis, and IBD associated with PsA.

IV) of the IL-17 antagonist (e.g., IL-17 antibody or antigen-binding fragment thereof, e.g., secukinumab) may be greater than about 6 mg/kg (preferred loading dose) or 3 mg/kg (preferred maintenance dose), e.g., about 7 mg/kg, 8 mg/kg, 9 mg/kg, 10 mg/kg, 4 mg/kg, 5 mg/kg, etc. It will also be understood that dose reduction may also be required (e.g., during the induction and/or maintenance phase) for certain patients, e.g., patients that display adverse events or an adverse response to treatment with the IL-17 antagonist (e.g., IL-17 antibody or antigen-binding fragment thereof, e.g., secukinumab). Thus, dosages (e.g., delivered IV) of the IL-17 antagonist (e.g., IL-17 antibody or antigen-binding fragment thereof, e.g., secukinumab), may be less than about 6 mg/kg (preferred loading/initial dose) or 3 mg/kg (preferred maintenance dose), e.g., about 5 mg/kg, 4 mg/kg, 2 mg/kg, 1 mg/kg, etc. In some embodiments, the IL-17 antagonist, e.g., IL-17 binding molecule (e.g., IL-17 antibody or antigen-binding fragment thereof, e.g., secukinumab) or IL-17 receptor binding molecule (e.g., IL-17 receptor antibody or antigen-binding fragment thereof) may be administered to the patient at an initial dose (e.g., delivered IV) of about 6 mg/kg (loading dose) or 3 mg/kg (maintenance dose), and the dose is then escalated if needed, as determined by a physician.

The timing of dosing is generally measured from the day of the first dose of secukinumab (which is also known as "baseline"). However, health care providers often use different naming conventions to identify dosing schedules, as shown in Table 3.

TABLE 3

Common naming conventions for dosing regimens.

| | Week | | | | | | | | | | | |
|---|---|---|---|---|---|---|---|---|---|---|---|---|
| | 0/1 | 1/2 | 2/3 | 3/4 | 4/5 | 5/6 | 6/7 | 7/8 | 8/9 | 9/10 | 10/11 | etc |
| 1$^{st}$ day of week | 0/1 | 7/8 | 14/15 | 21/22 | 28/29 | 35/36 | 42/43 | 49/50 | 56/57 | 63/64 | 70/71 | etc. |

Bolded items refer to the naming convention used herein.

In most preferred embodiments, the initial dose of the IL-17 antagonist (e.g., most preferably secukinumab) is about 6 mg/kg (e.g., 6 mg/kg) and the maintenance dose of the IL-17 antagonist (e.g., most preferably secukinumab) is about 3 mg/kg (e.g., 3 mg/kg).

Alternatively, the IL-17 antagonist, e.g., IL-17 binding molecule (e.g., IL-17 antibody or antigen-binding fragment thereof, e.g., secukinumab) or IL-17 receptor binding molecule (e.g., IL-17 receptor antibody or antigen-binding fragment thereof) is administered to the patient without a loading regimen, e.g., the antagonist (e.g., secukinumab) may be administered to the patient IV at about 2 mg/kg to about 4 mg/kg (preferably about 3 mg/kg) every 4 weeks (every month). In a preferred embodiment, the patient is dosed IV with about 3 mg/kg of the IL-17 antagonist (e.g., secukinumab) during weeks 0, 4, 8, 12, etc.

It will be understood that dose escalation may be required (e.g., during an induction and/or maintenance phase) for certain patients, e.g., patients that display inadequate response to treatment with the IL-17 antagonists, e.g., IL-17 binding molecules (e.g., IL-17 antibody or antigen-binding fragment thereof, e.g., secukinumab) or IL-17 receptor binding molecules (e.g., IL-17 receptor antibody or antigen-binding fragment thereof). Thus, dosages (e.g., delivered Notably, week zero may be referred to as week one by some health care providers, while day zero may be referred to as day one by some health care providers. Thus, it is possible that different physicians will designate, e.g., a dose as being given during week 3/on day 21, during week 3/on day 22, during week 4/on day 21, during week 4/on day 22, while referring to the same dosing schedule. For consistency, the first week of dosing will be referred to herein as week 0, while the first day of dosing will be referred to as day 1. However, it will be understood by a skilled artisan that this naming convention is simply used for consistency and should not be construed as limiting, i.e., weekly dosing is the provision of a weekly dose of the IL-17 antibody regardless of whether the physician refers to a particular week as "week 1" or "week 2". Moreover, in a preferred dosing regimen, the antibody is administered during week 0, 4, 8, 12, 16, 20 etc. Some providers may refer to this regimen as monthly, while others may refer to this regimen as every four weeks.

As used herein, the term "monthly" is used interchangably with "every 4 weeks" and "q4w".

Disclosed herein are methods of treating a patient having psoriatic arthritis (PsA) or axial spondyloarthritis (axSpA) (i.e., nr-axSpA and AS, e.g., nr-axSpA, e.g., AS), comprising intravenously administering a dose of about 6 m/kg of an IL-17 antagonist (e.g., IL-17 antibody or antigen-binding fragment thereof, e.g., secukinumab) to the patient once during week 0, and thereafter intravenously administering the patient a dose of about 3 mg/kg every 4 weeks (monthly), beginning during week 4, wherein the IL-17 antagonist (e.g., IL-17 antibody or antigen-binding fragment thereof, e.g., secukinumab) binds to an epitope of an IL-17 homodimer having two mature IL-17 protein chains, said epitope comprising Leu74, Tyr85, His86, Met87, Asn88, Val124, Thr125, Pro126, Ile127, Val128, His129 on one chain and Tyr43, Tyr44, Arg46, Ala79, Asp80 on the other chain, wherein the IL-17 antagonist (e.g., IL-17 antibody or antigen-binding fragment thereof, e.g., secukinumab) has a $K_D$ of about 100-200 pM, and wherein the IL-17 antagonist (e.g., IL-17 antibody or antigen-binding fragment thereof, e.g., secukinumab) has an in vivo half-life of about 4 weeks.

Additionally disclosed herein are methods of treating a patient having psoriatic arthritis (PsA), comprising intravenously (IV) administering a dose of about 4 mg/kg-about 9 mg/kg (preferably about 6 mg/kg) of an IL-17 antagonist (e.g., secukinumab) to the patient once during week 0, and thereafter, administering about 2-about 4 mg/kg (preferably about 3 mg/kg) of the IL-17 antagonist (e.g., secukinumab) to the patient every 4 weeks (monthly), beginning during week 4.

Additionally disclosed herein are methods of treating a patient having axial spondyloarthritis (axSpA) (i.e., nr-axSpA and AS, e.g., nr-axSpA, e.g., AS), comprising intravenously (IV) administering a dose of about 4 mg/kg-about 9 mg/kg (preferably about 6 mg/kg) of an IL-17 antagonist (e.g., secukinumab) to the patient once during week 0, and thereafter, administering about 2 mg/kg-about 4 mg/kg (preferably about 3 mg/kg) of the IL-17 antagonist (e.g., secukinumab) to the patient every 4 weeks (monthly), beginning during week 4.

Additionally disclosed herein are methods of inhibiting the progression of structural damage in a patient having psoriatic arthritis (PsA) or axial spondyloarthritis (axSpA) (i.e., nr-axSpA and AS, e.g., nr-axSpA, e.g., AS), comprising administering a dose of about 6 m/kg of an IL-17 antagonist (e.g., IL-17 antibody or antigen-binding fragment thereof, e.g., secukinumab) to the patient once during week 0, and thereafter intravenously administering the patient a dose of about 3 mg/kg every 4 weeks (monthly), beginning during week 4, wherein the IL-17 antagonist (e.g., IL-17 antibody or antigen-binding fragment thereof, e.g., secukinumab) binds to an epitope of an IL-17 homodimer having two mature IL-17 protein chains, said epitope comprising Leu74, Tyr85, His86, Met87, Asn88, Val124, Thr125, Pro126, Ile127, Val128, His129 on one chain and Tyr43, Tyr44, Arg46, Ala79, Asp80 on the other chain, wherein the IL-17 antagonist (e.g., IL-17 antibody or antigen-binding fragment thereof, e.g., secukinumab) has a $K_D$ of about 100-200 pM, and wherein the IL-17 antagonist (e.g., IL-17 antibody or antigen-binding fragment thereof, e.g., secukinumab) has an in vivo half-life of about 4 weeks.

Additionally disclosed herein are IL-17 antagonists (e.g., IL-17 antibody or antigen-binding fragment thereof, e.g., secukinumab) for use in treating a patient having axial spondyloarthritis (axSpA) (i.e., nr-axSpA and AS, e.g., nr-axSpA, e.g., AS), wherein the IL-17 antagonist (e.g., IL-17 antibody or antigen-binding fragment thereof, e.g., secukinumab) is to be intravenously administered to the patient at a dose of about 6 m/kg once during week 0, and thereafter intravenously administered to the patient at a dose of about 3 mg/kg every 4 weeks (monthly), beginning during week 4, wherein the IL-17 antagonist (e.g., IL-17 antibody or antigen-binding fragment thereof, e.g., secukinumab) binds to an epitope of an IL-17 homodimer having two mature IL-17 protein chains, said epitope comprising Leu74, Tyr85, His86, Met87, Asn88, Val124, Thr125, Pro126, Ile127, Val128, His129 on one chain and Tyr43, Tyr44, Arg46, Ala79, Asp80 on the other chain, wherein the IL-17 antagonist (e.g., IL-17 antibody or antigen-binding fragment thereof, e.g., secukinumab) has a $K_D$ of about 100-200 pM, and wherein the IL-17 antagonist (e.g., IL-17 antibody or antigen-binding fragment thereof, e.g., secukinumab) has an in vivo half-life of about 4 weeks.

Additionally disclosed herein are IL-17 antagonists (e.g., IL-17 antibody or antigen-binding fragment thereof, e.g., secukinumab) for use in inhibiting the progression of structural damage in an axial spondyloarthritis (axSpA) (i.e., nr-axSpA and AS, e.g., nr-axSpA, e.g., AS) patient, wherein the IL-17 antagonist (e.g., IL-17 antibody or antigen-binding fragment thereof, e.g., secukinumab) is to be intravenously administered to the patient at a dose of about 6 m/kg once during week 0, and thereafter intravenously administered to the patient at a dose of about 3 mg/kg every 4 weeks (monthly), beginning during week 4, wherein the IL-17 antagonist (e.g., IL-17 antibody or antigen-binding fragment thereof, e.g., secukinumab) binds to an epitope of an IL-17 homodimer having two mature IL-17 protein chains, said epitope comprising Leu74, Tyr85, His86, Met87, Asn88, Val124, Thr125, Pro126, Ile127, Val128, His129 on one chain and Tyr43, Tyr44, Arg46, Ala79, Asp80 on the other chain, wherein the IL-17 antagonist (e.g., IL-17 antibody or antigen-binding fragment thereof, e.g., secukinumab) has a $K_D$ of about 100-200 pM, and wherein the IL-17 antibody or antigen-binding fragment thereof has an in vivo half-life of about 4 weeks.

Additionally disclosed herein are IL-17 antagonists (e.g., IL-17 antibody or antigen-binding fragment thereof, e.g., secukinumab) for use in the manufacture of a medicament for treating a patient having axial spondyloarthritis (axSpA) (i.e., nr-axSpA and AS, e.g., nr-axSpA, e.g., AS), wherein the IL-17 antagonist (e.g., IL-17 antibody or antigen-binding fragment thereof, e.g., secukinumab) is to be intravenously administered to the patient at a dose of about 6 m/kg once during week 0, and thereafter intravenously administered to the patient at a dose of about 3 mg/kg every 4 weeks (monthly), beginning during week 4, wherein the IL-17 antagonist (e.g., IL-17 antibody or antigen-binding fragment thereof, e.g., secukinumab) binds to an epitope of an IL-17 homodimer having two mature IL-17 protein chains, said epitope comprising Leu74, Tyr85, His86, Met87, Asn88, Val124, Thr125, Pro126, Ile127, Val128, His129 on one chain and Tyr43, Tyr44, Arg46, Ala79, Asp80 on the other chain, wherein the IL-17 antagonist (e.g., IL-17 antibody or antigen-binding fragment thereof, e.g., secukinumab) has a $K_D$ of about 100-200 pM, and wherein the IL-17 antagonist (e.g., IL-17 antibody or antigen-binding fragment thereof, e.g., secukinumab) has an in vivo half-life of about 4 weeks.

Additionally disclosed herein are IL-17 antagonists (e.g., IL-17 antibody or antigen-binding fragment thereof, e.g., secukinumab) for use in the manufacture of a medicament for inhibiting the progression of structural damage in an axial spondyloarthritis (axSpA) (i.e., nr-axSpA and AS, e.g., nr-axSpA, e.g., AS) patient, wherein the IL-17 antagonist (e.g., IL-17 antibody or antigen-binding fragment thereof, e.g., secukinumab) is to be intravenously administered to the patient at a dose of about 6 m/kg once during week 0, and thereafter intravenously administered to the patient at a dose of about 3 mg/kg every 4 weeks (monthly), beginning during week 4, wherein the IL-17 antagonist (e.g., IL-17 antibody or antigen-binding fragment thereof, e.g., secukinumab) binds to an epitope of an IL-17 homodimer having two mature IL-17 protein chains, said epitope comprising Leu74, Tyr85, His86, Met87, Asn88, Val124, Thr125, Pro126, Ile127, Val128, His129 on one chain and Tyr43, Tyr44, Arg46, Ala79, Asp80 on the other chain, wherein the IL-17 antagonist (e.g., IL-17 antibody or antigen-binding fragment thereof, e.g., secukinumab) has a $K_D$ of about 100-200 pM, and wherein the IL-17 antagonist (e.g., IL-17 antibody or antigen-binding fragment thereof, e.g., secukinumab) has an in vivo half-life of about 4 weeks.

Additionally disclosed herein are IL-17 antagonists (e.g., IL-17 antibody or antigen-binding fragment thereof, e.g., secukinumab) for use in the manufacture of a medicament for treating a patient having psoriatic arthritis (PsA) or axial spondyloarthritis (axSpA) (i.e., nr-axSpA and AS, e.g., nr-axSpA, e.g., AS), wherein the medicament is formulated to comprise containers, each container having a sufficient amount of the IL-17 antagonist (e.g., IL-17 antibody or antigen-binding fragment thereof, e.g., secukinumab) to allow delivery (preferably IV delivery) of at least about 6 mg/kg of the IL-17 antagonist (e.g., IL-17 antibody or antigen-binding fragment thereof, e.g., secukinumab) per unit dose, and further wherein the IL-17 antagonist (e.g., IL-17 antibody or antigen-binding fragment thereof, e.g., secukinumab) binds to an epitope of an IL-17 homodimer having two mature IL-17 protein chains, said epitope comprising Leu74, Tyr85, His86, Met87, Asn88, Val124, Thr125, Pro126, Ile127, Val128, His129 on one chain and Tyr43, Tyr44, Arg46, Ala79, Asp80 on the other chain, wherein the IL-17 antagonist (e.g., IL-17 antibody or antigen-binding fragment thereof, e.g., secukinumab) has a $K_D$ of about 100-200 pM, and wherein the IL-17 antagonist (e.g., IL-17 antibody or antigen-binding fragment thereof, e.g., secukinumab) has an in vivo half-life of about 4 weeks.

Additionally disclosed herein are IL-17 antagonists (e.g., IL-17 antibody or antigen-binding fragment thereof, e.g., secukinumab) for use in the manufacture of a medicament for treating a patient having psoriatic arthritis (PsA) or axial spondyloarthritis (axSpA) (i.e., nr-axSpA and AS, e.g., nr-axSpA, e.g., AS), wherein the medicament is formulated to comprise containers, each container having a sufficient amount of the IL-17 antagonist (e.g., IL-17 antibody or antigen-binding fragment thereof, e.g., secukinumab) to allow delivery (preferably IV delivery) of at least about 3 mg/kg of the IL-17 antagonist (e.g., IL-17 antibody or antigen-binding fragment thereof, e.g., secukinumab) per unit dose, and further wherein the IL-17 antagonist (e.g., IL-17 antibody or antigen-binding fragment thereof, e.g., secukinumab) binds to an epitope of an IL-17 homodimer having two mature IL-17 protein chains, said epitope comprising Leu74, Tyr85, His86, Met87, Asn88, Val124, Thr125, Pro126, Ile127, Val128, His129 on one chain and Tyr43, Tyr44, Arg46, Ala79, Asp80 on the other chain, wherein the IL-17 antagonist (e.g., IL-17 antibody or antigen-binding fragment thereof, e.g., secukinumab) has a $K_D$ of about 100-200 pM, and wherein the IL-17 antagonist (e.g., IL-17 antibody or antigen-binding fragment thereof, e.g., secukinumab) has an in vivo half-life of about 4 weeks.

Additionally disclosed herein are IL-17 antagonists (e.g., IL-17 antibody or antigen-binding fragment thereof, e.g., secukinumab) for use in the manufacture of a medicament for inhibiting the progression of structural damage in an psoriatic arthritis (PsA) or axial spondyloarthritis (axSpA) (i.e., nr-axSpA and AS, e.g., nr-axSpA, e.g., AS) patient, wherein the medicament is formulated to comprise containers, each container having a sufficient amount of the IL-17 antagonist (e.g., IL-17 antibody or antigen-binding fragment thereof, e.g., secukinumab) to allow delivery (preferably IV delivery) of at least about 6 mg/kg IL-17 antagonist (e.g., IL-17 antibody or antigen-binding fragment thereof, e.g., secukinumab) per unit dose, and further wherein the IL-17 antagonist (e.g., IL-17 antibody or antigen-binding fragment thereof, e.g., secukinumab) binds to an epitope of an IL-17 homodimer having two mature IL-17 protein chains, said epitope comprising Leu74, Tyr85, His86, Met87, Asn88, Val124, Thr125, Pro126, Ile127, Val128, His129 on one chain and Tyr43, Tyr44, Arg46, Ala79, Asp80 on the other chain, wherein the IL-17 antibody or antigen-binding fragment thereof has a $K_D$ of about 100-200 pM, and wherein the IL-17 antagonist (e.g., IL-17 antibody or antigen-binding fragment thereof, e.g., secukinumab) has an in vivo half-life of about 4 weeks.

Additionally disclosed herein are IL-17 antagonists (e.g., IL-17 antibody or antigen-binding fragment thereof, e.g., secukinumab) for use in the manufacture of a medicament for inhibiting the progression of structural damage in an psoriatic arthritis (PsA) or axial spondyloarthritis (axSpA) (i.e., nr-axSpA and AS, e.g., nr-axSpA, e.g., AS) patient, wherein the medicament is formulated to comprise containers, each container having a sufficient amount of the IL-17 antagonist (e.g., IL-17 antibody or antigen-binding fragment thereof, e.g., secukinumab) to allow delivery (preferably IV delivery) of at least about 3 mg/kg IL-17 antagonist (e.g., IL-17 antibody or antigen-binding fragment thereof, e.g., secukinumab) per unit dose, and further wherein the IL-17 antagonist (e.g., IL-17 antibody or antigen-binding fragment thereof, e.g., secukinumab) binds to an epitope of an IL-17 homodimer having two mature IL-17 protein chains, said epitope comprising Leu74, Tyr85, His86, Met87, Asn88, Val124, Thr125, Pro126, Ile127, Val128, His129 on one chain and Tyr43, Tyr44, Arg46, Ala79, Asp80 on the other chain, wherein the IL-17 antagonist (e.g., IL-17 antibody or antigen-binding fragment thereof, e.g., secukinumab) has a $K_D$ of about 100-200 pM, and wherein the IL-17 antagonist (e.g., IL-17 antibody or antigen-binding fragment thereof, e.g., secukinumab) has an in vivo half-life of about 4 weeks.

Additionally disclosed herein are methods of improving sleep (e.g., improving sleep quality, decreasing sleep disturbance) in a patient having psoriatic arthritis (PsA) or axial spondyloarthritis (axSpA) (i.e., nr-axSpA and AS, e.g., nr-axSpA, e.g., AS), comprising intravenously (IV) administering a dose of about 4 mg/kg-about 9 mg/kg (preferably about 6 mg/kg) of an IL-17 antagonist (e.g., secukinumab) to the patient once during week 0, and thereafter, administering about 2 mg/kg-about 4 mg/kg (preferably about 3 mg/kg) of the IL-17 antagonist (e.g., secukinumab) to the patient every 4 weeks (monthly), beginning during week 4.

Additionally disclosed herein are methods of reducing nocturnal awakening in a patient having psoriatic arthritis (PsA) or axial spondyloarthritis (axSpA) (i.e., nr-axSpA and AS, e.g., nr-axSpA, e.g., AS), comprising intravenously (IV) administering a dose of about 4 mg/kg-about 9 mg/kg (preferably about 6 mg/kg) of an IL-17 antagonist (e.g., secukinumab) to the patient once during week 0, and thereafter, administering about 2 mg/kg-about 4 mg/kg (preferably about 3 mg/kg) of the IL-17 antagonist (e.g., secukinumab) to the patient every 4 weeks (monthly), beginning during week 4.

Additionally disclosed herein are methods of reducing morning stiffness in a patient having psoriatic arthritis (PsA) or axial spondyloarthritis (axSpA) (i.e., nr-axSpA and AS, e.g., nr-axSpA, e.g., AS), comprising intravenously (IV)

administering a dose of about 4 mg/kg-about 9 mg/kg (preferably about 6 mg/kg) of an IL-17 antagonist (e.g., secukinumab) to the patient once during week 0, and thereafter, administering about 2 mg/kg-about 4 mg/kg (preferably about 3 mg/kg) of the IL-17 antagonist (e.g., secukinumab) to the patient every 4 weeks (monthly), beginning during week 4.

Additionally disclosed herein are methods of improving mobility in a patient having psoriatic arthritis (PsA) or axial spondyloarthritis (axSpA) (i.e., nr-axSpA and AS, e.g., nr-axSpA, e.g., AS), comprising intravenously (IV) administering a dose of about 4 mg/kg-about 9 mg/kg (preferably about 6 mg/kg) of an IL-17 antagonist (e.g., secukinumab) to the patient once during week 0, and thereafter, administering about 2 mg/kg-about 4 mg/kg (preferably about 3 mg/kg) of the IL-17 antagonist (e.g., secukinumab) to the patient every 4 weeks (monthly), beginning during week 4.

As used herein, the phrase "formulated at a dosage to allow [route of administration] delivery of [a designated dose]" is used to mean that a given pharmaceutical composition can be used to provide a desired dose of an IL-17 antagonist, e.g., an IL-17 antibody, e.g., secukinumab, via a designated route of administration (e.g., preferably IV). As an example, if a desired IV dose is 6 mg/kg, and a patient weighs 60 kg, then a clinician may use 14.4 ml of an IL-17 antibody formulation having a concentration of 25 mg/ml to deliver a 360 mg dose to the patient. As another example, if a desired IV dose is 3 mg/kg, and a patient weighs 60 kg, then a clinician may use 17.2 ml of an IL-17 antibody formulation having a concentration of 25 mg/ml to deliver a 180 mg dose to the patient. In this case, a 25 mg/ml formulation is sufficient to deliver a 6 mg/kg loading dose and a 3 mg/kg maintenance dose route.

Most preferably the IL-17 antagonist (e.g., secukinumab) is provided as a liquid composition. Liquid pharmaceutical compositions of secukinumab are provided in WO2016103153, which is incorporated by reference herein in its entirety. Preferred liquid formulations comprise about 25 mg/mL to about 150 mg/mL secukinumab, about 10 mM to about 30 mM histidine pH 5.8, about 200 mM to about 225 mM trehalose, about 0.02% polysorbate 80, and about 2.5 mM to about 20 mM methionine. A most preferred composition for use in the disclosed methods, medicaments, uses, kits, etc. is a liquid pharmaceutical composition comprising about 25 mg/mL secukinumab, about 225 mM trehalose, about 0.02% polysorbate 80, about 5 mM L-methionine, and about 20 mM histidine buffer, pH about 5.8. Preferred liquid formulation are supplied in containers (e.g., vials) having a volume size of 2 ml to 10 ml, preferably 5 ml or 8 ml. Most preferably the IL-17 antagonist (e.g., secukinumab) is provided as a liquid composition in an 8 ml vial.

As used herein, the phrase "containers having a sufficient amount of the IL-17 antagonist to allow delivery of [a designated dose]" is used to mean that a combination of given containers (e.g., vials) have disposed therein, when combined in full or in part, a volume of an IL-17 antagonist (e.g., secukinumab), e.g., as part of a pharmaceutical composition) that can be used to provide a desired dose. As an example, if a desired IV dose is 6 mg/kg, and a patient weighs 60 kg, then a clinician may use 1.8×8 ml vials (total 14.4 ml) of an IL-17 antibody formulation having a concentration of 25 mg/ml to deliver a 360 mg dose to the patient. In this case, these containers have a sufficient amount of the IL-17 antagonist to allow delivery of the desired 6 mg/kg loading dose. As another example, if a desired IV dose is 3 mg/kg, and a patient weighs 60 kg, then a clinician may use 17.2 ml of an IL-17 antibody formulation having a concentration of 25 mg/ml to deliver a 180 mg dose to the patient. In this case, these containers have a sufficient amount of the IL-17 antagonist to allow delivery of the desired 3 mg/kg maintenance dose.

In some embodiments of the disclosed uses, methods, and kits, the patient has axSpA according to the ASAS axSpA criteria. In some embodiments of the disclosed uses, methods, and kits, a) the patient has had inflammatory back pain for at least three, preferably at least six months, b) the onset of the inflammatory back pain of occurred before the patient was 45 years old, c) the patient has active axial SpA, and/or d) the patient has had an inadequate response or failure to respond to at least 2 NSAIDS for a minimum of 4 weeks in total. Additionally, in some embodiments for AS patients, the patient has a diagnosis of moderate to severe AS with prior documented radiologic evidence fulfilling the modified NY criteria for AS. Additionally, in some embodiments for patients with nr-axSpA, the patient has sacroiliitis on MRI with >1 SpA feature OR HLA-B-27 positive with >two SpA features. Additionally, in some embodiments for patients with nr-axSpA, the patient has objective signs of inflammation, evident by either MRI with SIJ inflammation and/or hsCRP >ULN (as defined by lab).

In some embodiments of the disclosed uses, methods, and kits, the patient has objective signs of inflammation as indicated by elevated C-reactive protein (CRP) and/or magnetic resonance imaging (MRI) evidence of sacroiliac joint inflammation. In some embodiments of the disclosed uses, methods, and kits, the patient has objective signs of inflammation as indicated by MRI evidence of sacroiliac joint inflammation determined according to the Berlin sacroiliac joint (SIJ) scoring method. In some embodiments of the disclosed uses, methods, and kits, the patient has objective signs of inflammation as indicated by MRI evidence of inflammation of the spine.

In some embodiments of the disclosed uses, methods, and kits, the patient does not satisfy the radiological criterion according to the modified New York diagnostic criteria for ankylosing spondylitis.

In some embodiments of the disclosed uses, methods, and kits, the patient has active SpA (e.g., active nr-axSpA, e.g., active AS). As used herein, "active" SpA refers to a patient having a total BASDAI≥4 on a scale of 0-10, spinal pain as measured by BASDAI question #2≥4 (0-10), and total back pain as measured by visual analog scale (VAS) >40 mM (0-100 mM). In other embodiments of the disclosed uses, methods, and kits, the patient has total BASDAI≥4. In some embodiments of the disclosed uses, methods, and kits, the patient has spinal pain as measured by BASDAI question number 2≥4 cm (0-10 cm) at baseline. In some embodiments of the disclosed uses, methods, and kits, the patient has total back pain as measured by VAS≥40 mm (0-100 mm) at baseline.

In some embodiments of the disclosed uses, methods, and kits, the patient has active AS. In some embodiments of the disclosed uses, methods, and kits, the patient has active PsA. In some embodiments of the disclosed uses, methods, and kits, the patient has active nr-axSpA. In some embodiments of the disclosed uses, methods, and kits, the patient has active axSpA.

In some embodiments of the disclosed uses, methods, and kits, the patient has moderate-to-severe PsA. In some embodiments of the disclosed uses, methods, and kits, the patient has moderate-to-severe AS. In some embodiments of the disclosed uses, methods, and kits, the patient has moderate AS. In some embodiments of the disclosed uses, methods, and kits, the patient has severe AS. In some embodiments of the disclosed uses, methods, and kits, the patient has moderate-to-severe nr-axSpA. In some embodiments of the disclosed uses, methods, and kits, the patient has severe nr-axSpA. In some embodiments of the disclosed uses, methods, and kits, the patient has active nr-axSpA.

In some embodiments of the disclosed uses, methods, and kits, the patient, e.g., axSpA patient, has concomitant uveitis, e.g., chronic uveitis, e.g., inflammatory non-infectious uveitis, e.g., chronic inflammatory non-infectious uveitis, e.g., non-infectious acute anterior uveitis. Ideally, the treatment will provide improvement in frequency of flares/episodes of uveitis, as well as reduce episodes of axSpA.

In some embodiments of the disclosed uses, methods, and kits, the patient had previously failed to respond to, or had an inadequate response to, treatment with a nonsteroidal anti-inflammatory drug (NSAID). In some embodiments of the disclosed uses, methods, and kits, the patient had previously failed to respond to, or had an inadequate response to, treatment with a TNF-alpha inhibitor (TNF-IR). In some embodiments of the disclosed uses, methods, and kits, the patient has not previously been treated with a TNF-alpha antagonist (TNF-naïve).

In some embodiments of the disclosed uses, methods, and kits, the patient is additionally administered cyclosporine, hydroxychloroquine, methotrexate, an NSAID, sulfasalazine, leflunomide, prednisolone, prednisone, or methylprednisolone.

In some embodiments of the disclosed uses, methods, and kits, the patient is administered 6 mg/kg of the IL-17 antibody or antigen-binding fragment thereof (e.g., secukinumab) by intravenous injection once as a loading dose. In some embodiments of the disclosed uses, methods, and kits, the patient is administered 3 mg/kg of the IL-17 antibody or antigen-binding fragment thereof (e.g., secukinumab) by intravenous injection every month (every 4 weeks). In most preferred embodiments of the disclosed uses, methods, and kits, the patient is administered about 6 mg/kg of the IL-17 antibody or antigen-binding fragment thereof (e.g., secukinumab) by intravenous injection once during week 0, followed by intravenous injection every month (every 4 weeks) thereafter starting at week 4.

In some embodiments of the disclosed uses, methods, and kits, the IL-17 antagonist (e.g., IL-17 antibody or antigen-binding fragment thereof) is secukinumab.

Disclosed herein are compositions, uses, kits, and methods of treating an autoimmune disease (e.g., PsA, axSpA (nr-axSpA, AS), psoriasis (e.g., pustular or plaque-type psoriasis), asthma, acne, tendinopathy (e.g., plantar fasciitis, Achilles tendinopathy, patellar tendinopathy (tendinitis), rotator cuff tendinopathy, jumper's knee, lateral epicondylitis, medial epicondylitis, supraspinatus syndrome, or any combination thereof), Graves' Orbitopathy (thyroid eye disease, Graves' ophthalmopathy, Graves' eye disease), hidradenitis suppurativa, uveitis (including pediatric uveitis), Juvenile Idiopathic Arthritis (JIA) (including JIA associated with uveitis), or vasculitis (e.g., Behcet's syndrome, Buerger's disease (thromboangiitis obliterans), peripheral spondyloarthritis, antineutrophil cytoplasmic autoantibody (ANCA)-associated systemic vasculitis (AASV) (also called AAV-ANCA associated vasculitis), Wegener's granulomatosis (WG) (large vessel vasculitis, granulomatosis with polyangiitis), microscopic polyangiitis (MPA), Churg-Strauss syndrome (CSS) (eosinophilic granulomatosis with polyangiitis (EPGA)), cryoglobulinemia, giant cell arteritis (GCA), Henoch-Schonlein purpura, hypersensitivity vasculitis, Kawasaki disease (mucocutaneous lymph node syndrome), polyarteritis nodosa, rheumatoid vasculitis, Takayasu's arteritis, and polymyalgia rheumatica (PMR)), CRMO (chronic relapsing multifocal osteomyelitis), CNO (chronic non-bacterial osteomyelitis), SAPHO syndrome, peripheral arthritis, reactive arthritis, undifferential peripheral arthritis, IBD associated with PsA. etc.) in a patient, comprising intravenously administering to the patient a dose of about 2 mg/kg to about 4 mg/kg (preferably about 3 m/kg) secukinumab every 4 weeks. In preferred embodiments, the patient is first administered an initial dose of about 4 mg/kg to about 9 mg/kg (preferably about 6 mg/kg) secukinumab during week 0.

Disclosed herein are compositions, uses, kits, and methods of treating psoriatic arthritis (PsA) in a patient, comprising intravenously administering to the patient an initial dose of about 4 mg/kg to about 9 mg/kg (preferably about 6 mg/kg) secukinumab during week 0, and thereafter a dose of about 2 mg/kg to about 4 mg/kg (preferably about 3 m/kg) every four weeks, beginning during week 4.

Disclosed herein are compositions, uses, kits, and methods of treating axial spondyloarthritis (axSpA) in a patient, comprising intravenously administering to the patient an initial dose of about 4 mg/kg to about 9 mg/kg (preferably about 6 mg/kg) secukinumab during week 0, and thereafter a dose of about 2 mg/kg to about 4 mg/kg (preferably about 3 m/kg) every four weeks, beginning during week 4.

Disclosed herein are compositions, uses, kits, and methods of treating AS in a patient, comprising intravenously administering to the patient an initial dose of about 4 mg/kg to about 9 mg/kg (preferably about 6 mg/kg) secukinumab during week 0, and thereafter a dose of about 2 mg/kg to about 4 mg/kg (preferably about 3 m/kg) every four weeks, beginning during week 4.

Disclosed herein are compositions, uses, kits, and methods of treating nr-axSpA in a patient, comprising intravenously administering to the patient an initial dose of about 4 mg/kg to about 9 mg/kg (preferably about 6 mg/kg) secukinumab during week 0, and thereafter a dose of about 2 mg/kg to about 4 mg/kg (preferably about 3 m/kg) every four weeks, beginning during week 4.

Disclosed herein are compositions, uses, kits, and methods of treating hidradenitis suppurativa in a patient, comprising intravenously administering to the patient an initial dose of about 4 mg/kg to about 9 mg/kg (preferably about 6 mg/kg) secukinumab during week 0, and thereafter a dose of about 2 mg/kg to about 4 mg/kg (preferably about 3 m/kg) every four weeks, beginning during week 4.

Disclosed herein are compositions, uses, kits, and methods of treating psoriasis in a patient, comprising intravenously administering to the patient an initial dose of about 4 mg/kg to about 9 mg/kg (preferably about 6 mg/kg) secukinumab during week 0, and thereafter a dose of about 2 mg/kg to about 4 mg/kg (preferably about 3 m/kg) every four weeks, beginning during week 4.

In some embodiments, the disclosed compositions, uses, kits, and methods comprise intravenously administering to the patient a dose of about 3 mg/kg secukinumab every 4 weeks.

In some embodiments, the disclosed compositions, uses, kits, and methods comprise intravenously administering to the patient an initial dose of about 4 mg/kg to about 9 mg/kg (preferably about 6 mg/kg) secukinumab during week 0, and thereafter a dose of about 2 mg/kg to about 4 mg/kg (preferably about 3 m/kg) every four weeks, beginning during week 4.

In some embodiments, the disclosed compositions, uses, kits, and methods comprise intravenously administering to the patient an initial dose of about 6 mg/kg secukinumab during week 0, and thereafter a dose of about 3 mg/kg every four weeks, beginning during week 4.

In some embodiments of the disclosed compositions, uses, kits, and methods the patient has non-radiographic axSpA (nr-axSpA).

In some embodiments of the disclosed compositions, uses, kits, and methods the patient has moderate to severe nr-axSpA.

In some embodiments of the disclosed compositions, uses, kits, and methods the patient has severe nr-axSpA.

In some embodiments of the disclosed compositions, uses, kits, and methods the patient has active nr-axSpA.

In some embodiments of the disclosed compositions, uses, kits, and methods the patient has active nr-axSpA as assessed by total BASDAI≥4 cm (0-10 cm) at baseline, spinal pain as measured by BASDAI question number 2≥4 cm (0-10 cm) at baseline, and total back pain as measured by VAS≥40 mm (0-100 mm) at baseline.

In some embodiments of the disclosed compositions, uses, kits, and methods the patient has nr-axSpA according to the ASAS axSpA criteria.

In some embodiments of the disclosed compositions, uses, kits, and methods: a) the patient has had inflammatory back pain for at least three, preferably at least six months, prior to treatment with secukinumab, b) the onset of the inflammatory back pain of a) occurred before the patient was 45 years old, and c) the patient has MRI evidence of sacroiliac joint (SIJ) inflammation and has at least one SpA feature or the patient is HLA-B27 positive and has at least two SpA features.

In some embodiments of the disclosed compositions, uses, kits, and methods the patient has objective signs of inflammation as indicated by elevated C-reactive protein (CRP) and/or magnetic resonance imaging (MRI) evidence of SIJ inflammation.

In some embodiments of the disclosed compositions, uses, kits, and methods the patient has objective signs of inflammation as indicated by MRI evidence of SIJ inflammation determined according to the Berlin SIJ scoring method.

In some embodiments of the disclosed compositions, uses, kits, and methods the patient has objective signs of inflammation as indicated by MRI evidence of inflammation of the spine.

In some embodiments of the disclosed compositions, uses, kits, and methods the patient has active nr-axSpA as assessed by total BASDAI≥4.

In some embodiments of the disclosed compositions, uses, kits, and methods the patient does not satisfy the radiological criterion according to the modified New York diagnostic criteria for ankylosing spondylitis.

In some embodiments of the disclosed compositions, uses, kits, and methods, when a population of patients having nr-axSpA is treated as described at least 30%, preferably at least 37%, more preferably at least 39%, of the patients achieve Assessment of SpondyloArthritis International Society (ASAS) 40 by week 16 of treatment.

In some embodiments of the disclosed compositions, uses, kits, and methods, when a population of patients having nr-axSpA is treated as described at least 20%, preferably at least 28%, of the patients achieve an ASDAS-CRP major improvement response by week 16 of treatment.

In some embodiments of the disclosed compositions, uses, kits, and methods, when a population of patients having nr-axSpA is treated as described at least 50%, preferably at least 53%, more preferably at least 56%, of the patients achieve ASAS 20 by week 16 of treatment.

In some embodiments of the disclosed compositions, uses, kits, and methods, the patient has PsA.

In some embodiments of the disclosed compositions, uses, kits, and methods, the patient has active PsA.

In some embodiments of the disclosed compositions, uses, kits, and methods, the patient has concomitant moderate-to-severe plaque psoriasis.

In some embodiments of the disclosed compositions, uses, kits, and methods, when a population of patients having PsA is treated as described at least 20%, preferably at least 30% of the patients achieve American College of Rheumatology (ACR) Criteria 50 by week 16 of treatment.

In some embodiments of the disclosed compositions, uses, kits, and methods, when a population of patients having PsA is treated as described at least 40%, preferably at least 50% of the patients achieve ACR20 by week 16 of treatment.

In some embodiments of the disclosed compositions, uses, kits, and methods, when a population of patients having PsA is treated as described at least 50%, preferably at least 70% of the patients achieve Psoriasis Area and Severity Index (PASI) 75 by week 16 of treatment.

In some embodiments of the disclosed compositions, uses, kits, and methods, when a population of patients having PsA is treated as described at least 30%, preferably at least 40% of the patients achieve PASI90 by week 16 of treatment.

In some embodiments of the disclosed compositions, uses, kits, and methods, the patient has ankylosing spondylitis (AS).

In some embodiments of the disclosed compositions, uses, kits, and methods, the patient has active AS.

In some embodiments of the disclosed compositions, uses, kits, and methods, the patient has moderate-to-severe AS.

In some embodiments of the disclosed compositions, uses, kits, and methods, when a population of patients having AS is treated as described at least 40%, preferably at least 42%, of the patients achieve Assessment of SpondyloArthritis International Society (ASAS) 40 by week 16 of treatment.

In some embodiments of the disclosed compositions, uses, kits, and methods, when a population of patients having AS is treated as described at least 20%, preferably at least 28%, of the patients achieve an Ankylosing Spondylitis Disease Activity Score (ASDAS)-C Reactive Protein (CRP) major improvement response by week 16 of treatment.

In some embodiments of the disclosed compositions, uses, kits, and methods, when a population of patients having AS is treated as described at least 15%, preferably at least 20%, of the patients achieve an ASDAS-CRP inactive disease response by week 16 of treatment.

In some embodiments of the disclosed compositions, uses, kits, and methods, when a population of patients having AS is treated as described at least 60%, preferably at least 61%, of the patients achieve ASAS 20 by week 16 of treatment.

In some embodiments of the disclosed compositions, uses, kits, and methods, when a population of patients having AS is treated as described at least 70%, preferably at least 72%, of the patients achieve ASAS 20 by week 104 of treatment.

In some embodiments of the disclosed compositions, uses, kits, and methods, when a population of patients having axSpA is treated as described at least 35%, preferably at least 37%, more preferably at least 39%, of the patients achieve Assessment of SpondyloArthritis International Society (ASAS) 40 by week 16 of treatment.

In some embodiments of the disclosed compositions, uses, kits, and methods, when a population of patients having axSpA is treated as described at least 25%, preferably at least 28%, of the patients achieve an ASDAS-CRP major improvement response by week 16 of treatment.

In some embodiments of the disclosed compositions, uses, kits, and methods, when a population of patients having axSpA is treated as described at least 10%, preferably at least 14%, more preferably at least 17%, of the patients achieve an ASDAS-CRP inactive disease response by week 16 of treatment.

In some embodiments of the disclosed compositions, uses, kits, and methods, when a population of patients having axSpA is treated as described at least 50%, preferably at least 53%, more preferably at least 56% of the patients achieve ASAS 20 by week 16 of treatment.

In some embodiments of the disclosed compositions, uses, kits, and methods, when a population of patients having axSpA is treated as described at least 30%, preferably at least 36%, more preferably at least 50% of the patients achieve ASAS 40 by week 52 of treatment.

In some embodiments of the disclosed compositions, uses, kits, and methods, the patient previously failed to respond to, or had an inadequate response to, treatment with a nonsteroidal anti-inflammatory drug (NSAID).

In some embodiments of the disclosed compositions, uses, kits, and methods, the patient previously failed to respond to, or had an inadequate response to, treatment with a non-biological DMARD.

In some embodiments of the disclosed compositions, uses, kits, and methods, the patient previously failed to respond to, or had an inadequate response to, treatment with a TNF-alpha inhibitor (TNF-IR).

In some embodiments of the disclosed compositions, uses, kits, and methods, the patient has not previously been treated with a TNF-alpha inhibitor (TNF-naïve).

In some embodiments, the disclosed compositions, uses, kits, and methods further comprise administering cyclosporine, hydroxychloroquine, methotrexate, an NSAID, sulfasalazine, leflunomide, prednisolone, prednisone, or methylprednisolone to the patient.

In some embodiments of the disclosed compositions, uses, kits, and methods, secukinumab is supplied in a vial, e.g., an 8 ml vial.

In some embodiments of the disclosed compositions, uses, kits, and methods, secukinumab is supplied in a liquid composition comprising about 25 mg/mL secukinumab.

In some embodiments of the disclosed compositions, uses, kits, and methods, secukinumab is supplied in a liquid composition comprising about 25 mg/mL secukinumab, about 225 mM trehalose, about 0.02% polysorbate 80, about 5 mM L-methionine, and about 20 mM histidine buffer, pH about 5.8.

In some embodiments of the disclosed compositions, uses, kits, and methods, secukinumab is administered to the patient with an infusion duration of about 30 minutes.

In some embodiments of the disclosed compositions, uses, kits, and methods, the patient has concurrent inflammatory non-infectious uveitis.

Kits

The disclosure also encompasses kits for treating autoimmune diseases, e.g., PsA or axSpA (i.e., nr-axSpA and AS, e.g., nr-axSpA, e.g., AS), and/or preventing structural damage (e.g., bone and/or joint) in these patients. Such kits comprise an IL-17 antagonist, e.g., IL-17 binding molecule (e.g., IL-17 antibody or antigen-binding fragment thereof, e.g., secukinumab) or IL-17 receptor binding molecule (e.g., IL-17 antibody or antigen-binding fragment thereof) (e.g., in liquid form) or a pharmaceutical composition comprising the IL-17 antagonist (described supra). Additionally, such kits may comprise means for containing the IL-17 antagonist (e.g., an infusion bag, vial(s)) and instructions for use. These kits may contain additional therapeutic agents (described supra) for treating PsA or axSpA (i.e., nr-axSpA and AS, e.g., nr-axSpA, e.g., AS), e.g., for delivery in combination with the enclosed IL-17 antagonist, e.g., IL-17 binding molecule, e.g., IL-17 antibody, e.g., secukinumab. Such kits may also comprise instructions for administration of the IL-17 antagonist (e.g., IL-17 antibody, e.g., secukinumab) to treat the autoimmune disease, e.g., PsA or axSpA (i.e., nr-axSpA and AS, e.g., nr-axSpA, e.g., AS), and/or to inhibit the progression of structural damage in these patient (e.g., TNF-naïve and/or TNF-IR patients, NSAID failure patients, etc.). Such instructions may provide the dose (e.g., 6 mg/kg and/or 3 mg/kg), route of administration (e.g., IV), and dosing regimen (e.g., about 6 mg/kg once during week 0, and then 3 mg/kg given IV every month [every 4 weeks] during weeks 4, 8, 12, etc. for use with the enclosed IL-17 antagonist, e.g., IL-17 binding molecule, e.g., IL-17 antibody, e.g., secukinumab.

The phrase "means for containing" is used to indicate any available implement for containing a drug, including, but not limited to, a pre-filled syringe, a vial and syringe, an injection pen, an autoinjector, an IV drip and bag, a vial, a pump, etc. A pre-filled vial is the preferred means for containing the enclosed IL-17 antagonist, e.g., IL-17 binding molecule, e.g., IL-17 antibody, e.g., secukinumab.

Disclosed herein are kits for use in treating a patient having PsA or axSpA (i.e., nr-axSpA and AS, e.g., nr-axSpA, e.g., AS) and/or inhibiting the progression of structural damage in such a patient, comprising an IL-17 antagonist (e.g., IL-17 binding molecule, e.g., IL-17 antibody or antigen-binding fragment thereof, e.g., secukinumab). In some embodiments, the kit further comprises means for administering the IL-17 antagonist to the patient. In some embodiments, the kit further comprises instructions for administration of the IL-17 antagonist, wherein the instructions indicate that the IL-17 antagonist (e.g., IL-17 binding molecule, e.g., IL-17 antibody or antigen-binding fragment thereof, e.g., secukinumab) is to be administered to the patient (e.g., TNF naive and/or TNF experienced) intravenously (IV) at about 6 mg/kg once during week 0 (as a loading dose) and then 3 mg/kg every 4 weeks (monthly) during week 4, 8, 12, etc.. In some embodiments, the kit further comprises instructions for administration of the IL-17 antagonist, wherein the instructions indicate that the IL-17 antagonist (e.g., IL-17 binding molecule, e.g., IL-17 antibody or antigen-binding fragment thereof, e.g., secukinumab) is to be administered to the patient IV without a loading regimen, e.g., at about 3 mg/kg every 4 weeks (monthly). In some embodiments, the instructions will provide for dose escalation (e.g., from a maintenance dose of about 3 mg/kg to a higher dose as needed, to be determined by a physician) or dose reduction (e.g., from a maintenance dose of about 3 mg/kg to a lower dose as needed, to be determined by a physician).

General

In some embodiments of the disclosed methods, treatments, medicaments, regimens, uses and kits, the IL-17 antagonist is an IL-17 binding molecule. In preferred embodiments, the IL-17 binding molecule is an IL-17 antibody or antigen-binding fragment thereof. In more preferred embodiments of the disclosed methods, treatments, regimens, uses and kits, the IL-17 antibody or antigen-binding fragment thereof is selected from the group consisting of: a) an IL-17 antibody or antigen-binding fragment thereof that binds to an epitope of IL-17 comprising Leu74, Tyr85, His86, Met87, Asn88, Val124, Thr125, Pro126, Ile127, Val128, His129; b) an IL-17 antibody or antigen-binding fragment thereof that binds to an epitope of IL-17 comprising Tyr43, Tyr44, Arg46, Ala79, Asp80; c) an IL-17 antibody or antigen-binding fragment thereof that binds to an epitope of an IL-17 homodimer having two mature IL-17 protein chains, said epitope comprising Leu74, Tyr85, His86, Met87, Asn88, Val124, Thr125, Pro126, Ile127, Val128, His129 on one chain and Tyr43, Tyr44, Arg46, Ala79, Asp80 on the other chain; and d) an IL-17 antibody or antigen-binding fragment thereof that binds to an epitope of an IL-17 homodimer having two mature IL-17 protein chains, said epitope comprising Leu74, Tyr85, His86, Met87, Asn88, Val124, Thr125, Pro126, Ile127, Val128, His129 on one chain and Tyr43, Tyr44, Arg46, Ala79, Asp80 on the other chain, wherein the IL-17 binding molecule has a $K_D$ of about 100-200 pM, and wherein the IL-17 binding molecule has an in vivo half-life of about 23 to about 35 days.

In even more preferred embodiments of the disclosed methods, treatments, regimens, uses and kits, the IL-17 antibody or antigen-binding fragment thereof comprises: i) an immunoglobulin heavy chain variable domain ($V_H$) comprising the amino acid sequence set forth as SEQ ID NO:8; ii) an immunoglobulin light chain variable domain ($V_L$) comprising the amino acid sequence set forth as SEQ ID NO: 10; iii) an immunoglobulin $V_H$ domain comprising the amino acid sequence set forth as SEQ ID NO:8 and an immunoglobulin $V_L$ domain comprising the amino acid sequence set forth as SEQ ID NO: 10; iv) an immunoglobulin $V_H$ domain comprising the hypervariable regions set forth as SEQ ID NO: 1, SEQ ID NO:2, and SEQ ID NO: 3; v) an immunoglobulin $V_L$ domain comprising the hypervariable regions set forth as SEQ ID NO:4, SEQ ID NO:5 and SEQ ID NO:6; vi) an immunoglobulin $V_H$ domain comprising the hypervariable regions set forth as SEQ ID NO: 11, SEQ ID NO:12 and SEQ ID NO:13; vii) an immunoglobulin $V_H$ domain comprising the hypervariable regions set forth as SEQ ID NO: 1, SEQ ID NO:2, and SEQ ID NO:3 and an immunoglobulin $V_L$ domain comprising the hypervariable regions set forth as SEQ ID NO:4, SEQ ID NO:5 and SEQ ID NO: 6; viii) an immunoglobulin $V_H$ domain comprising the hypervariable regions set forth as SEQ ID NO: 11, SEQ ID NO: 12 and SEQ ID NO:13 and an immunoglobulin $V_L$ domain comprising the hypervariable regions set forth as SEQ ID NO:4, SEQ ID NO:5 and SEQ ID NO: 6; ix) an immunoglobulin light chain comprising the amino acid sequence set forth as SEQ ID NO: 14; x) an immunoglobulin heavy chain comprising the amino acid sequence set forth as SEQ ID NO:15; or xi) an immunoglobulin light chain comprising the amino acid sequence set forth as SEQ ID NO: 14 and an immunoglobulin heavy chain comprising the amino acid sequence set forth as SEQ ID NO:15.

In even more preferred embodiments of the disclosed methods, treatments, regimens, uses and kits, the IL-17 antibody or antigen-binding fragment thereof is a human antibody of the $IgG_1$ isotype.

In most preferred embodiments of the disclosed methods, treatments, regimens, uses and kits, the IL-17 antibody or antigen-binding fragment thereof is secukinumab.

In most preferred embodiments of the disclosed methods, treatments, regimens, uses and kits, the patient (preferably an adult) to be treated has PsA or nr-axSpA, e.g., active nr-axSpA, e.g., moderate to severe nr-axSpA. In some embodiments of the disclosed methods, treatments, regimens, uses and kits, the patient has psoriasis (e.g., plaque-type psoriasis or pustular psoriasis) or hidradenitis suppurativa.

The details of one or more embodiments of the disclosure are set forth in the accompanying description above. Although any methods and materials similar or equivalent to those described herein can be used in the practice or testing of the present disclosure, the preferred methods and materials are now described. Other features, objects, and advantages of the disclosure will be apparent from the description and from the claims. In the specification and the appended claims, the singular forms include plural referents unless the context clearly dictates otherwise. Unless defined otherwise, all technical and scientific terms used herein have the same meaning as commonly understood by one of ordinary skill in the art to which this disclosure belongs. All patents and publications cited in this specification are incorporated by reference. The following Examples are presented in order to more fully illustrate the preferred embodiments of the disclosure. These examples should in no way be construed as limiting the scope of the disclosed patient matter, as defined by the appended claims.

EXAMPLES

Example 1: Study of Efficacy and Safety of Secukinumab in Patients with Non-Radiographic Axial Spondyloarthritis (CAIN45712315)

The purpose of this study is to demonstrate the clinical efficacy, safety and tolerability of two different regimens of secukinumab, with loading and without loading, compared to placebo in patients with nr-axSpA at Week 16 as well as Week 52. Additionally, 1 year progression of structural changes as evidenced by MRI will be assessed at Week 52. This study will also observe the long-term efficacy, safety, and tolerability of secukinumab and the evolution of radiographic correlates of inflammation and structural progression based on the MRI and X-ray results up to Week 104.

At the end of the core phase, an optional 16-week randomized dose escalation treatment period will assess if a treatment escalation from 150 mg to 300 mg secukinumab is of further benefit to patients, as compared to continuous treatment with 150 mg secukinumab. Additionally, long-term efficacy, safety and tolerability of the 300 mg dose will be assessed in a treatment follow-up phase.

This is a randomized, double-blind, placebo-controlled study. Patients will be randomized to one of three treatment groups (secukinumab 150 mg Load, secukinumab 150 mg No Load or placebo in a ratio of 1:1:1):

Group 1 (secukinumab 150 mg Load): secukinumab 150 mg (1 mL, 150 mg/mL) s.c. pre-filled syringe (PFS) at baseline (BSL), Weeks 1, 2 and 3, followed by administration every four weeks starting at Week 4

Group 2 (secukinumab 150 mg No Load): secukinumab 150 mg (1 mL, 150 mg/mL) s.c. PFS at BSL, placebo at Weeks 1, 2 and 3, followed by secukinumab 150 mg PFS administration every four weeks starting at Week 4

Group 3 (placebo): placebo (1 mL) s.c. PFS at BSL, Weeks 1, 2, 3, followed by administration every four weeks starting at Week 4

At Week 104, patients can continue in an optional randomized dose escalation treatment extension phase. The patients will be assessed based on their ASAS20 response at Week 104. Secukinumab 150 mg responders at Week 104 (Core Phase Responders) will be randomized to the following treatment groups in a blinded manner:

Group 4 (Core Phase Responder 150 mg): secukinumab 150 mg (1 mL, 150 mg/mL) s.c. pre-filled syringe (PFS) and placebo (1 mL) s.c. PFS every four weeks Group 5 (Core Phase Responder 300 mg): 2 injections with secukinumab 150 mg (1 mL, 150 mg/mL) s.c. PFS every four weeks Secukinumab 150 mg incomplete-responders at Week 104 (Core Phase Non-Responders) will be escalated to secukinumab 300 mg in an open-label manner Group 6 (Core Phase Non-Responder 300 mg): 2 injections with secukinumab 150 mg (1 mL, 150 mg/mL) s.c. PFS every four weeks open-label Based on the clinical judgment of disease activity by the investigator and the patient, background medications, such as NSAIDs and DMARDs, may be modified or added to treat signs and symptoms of nr-axSpA from Week 16 on. Furthermore, patients who are repeatedly (e.g. at two or more consecutive visits) considered to be inadequate responders based on the clinical judgment of disease activity by the investigator and the patient, may receive secukinumab 150 mg s.c. or other biologics as standard of care treatment from Week 20 on.

Changes in concomitant medications used to treat nr-axSpA will not be allowed before the completion of all Week 16 assessments. Efficacy will be assessed in detail at every study visit, and patients who are deemed not to be benefiting from the study treatment based upon safety and efficacy assessments or for any reason of their own accord will be free to discontinue participation in the study at any time.

Patients will be stratified at randomization according to the subgroup of objective signs of inflammation they belong to (based on their CRP and MRI status at screening). The only condition that will be placed on enrollment is that no less than 15% of patients should belong to either of the three subgroups of objective signs of inflammation: CRP+ and MRI+, CRP+ and MRI−, CRP− and MRI+.

Additionally, it is planned to enroll no more than approximately 20% TNF-IR patients in the study. Due to the long wash out required for some TNF-IR patients, enrolment of TNF-IR patients will end two months prior to the projected end of screening period.

Starting at Week 52, all patients will be assigned to receive secukinumab 150 mg s.c. in an open-label fashion except for those patients who discontinued blinded study treatment (secukinumab 150 mg or placebo) during the initial 52 weeks of the study.

The originally randomized treatment assignment (secukinumab 150 mg or placebo) will remain blinded until all patients have completed the Week 52 visit. After all patients have completed the Treatment Period 2 (Week 52) and the Week 52 database lock has occurred, site personnel and patients may be unblinded to the original randomized treatment assignment at baseline. All patients will continue to receive secukinumab as open-label treatment up to Week 100, unless they have discontinued study treatment.

Starting at Week 104, all patients who finish the core phase according to the protocol on study medication will be asked to continue in an additional extension phase. The patients will be assessed as having been Core Phase Responders (i.e., achieving ASAS20 at Week 104) or Core Phase Non-Responders (i.e., not achieving ASAS20 at Week 104). Core Phase Responders will be randomized 1:1 to continue on secukinumab 150 mg or escalated to 300 mg treatment. Core Phase Non-Responders will receive 300 mg treatment open-label.

At the end of the 16-week dose escalation treatment period, all patients will continue on their current treatment until the last patient has finished the 16-week dose escalation treatment period (i.e., continuous treatment period).

Starting from Week 156 onward, a patient can be up-titrated to secukinumab 300 mg open-label based on the clinical judgment of disease activity by the investigator. The original dose of the extension phase will only be unblinded on an individual patient level at the end of the extension phase for each patient to enable continuous treatment on the same dose, if available.

A follow-up visit is to be done 12 weeks after last administration of study treatment for all patients, regardless of whether they complete the entire study (either core or extension phase) as planned or discontinue prematurely.

Subjects who complete the 2-year Core Phase are eligible to enter the extension phase.

A detailed protocol summary is provided below.

| | |
|---|---|
| Purpose and rationale | To demonstrate the clinical efficacy, safety and tolerability of secukinumab compared to placebo in patients with nr-axSpA at Week 16 as well as Week 52 and long term efficacy and safety up to Week 104 followed by an optional 16-week randomized dose escalation treatment period and a continuous treatment period for up to Week 208. |
| Primary Objective(s) | ANALYSIS PLANS<br>To demonstrate superiority of secukinumab 150 mg s.c. with loading over placebo at Week 16, based on the proportion of TNF naive patients achieving an ASAS40 response (Assessment of SpondyloArthritis International Society criteria).<br>To demonstrate superiority of secukinumab 150 mg s.c. without loading over placebo at Week 52, based on the proportion of TNF naive patients achieving an ASAS40 response (Assessment of SpondyloArthritis International Society criteria) |
| Secondary Objectives | ANALYSIS PLANS<br>1. To demonstrate that the efficacy of secukinumab 150 mg s.c., with or without loading, at Week 16 is superior to placebo based on the proportion of all patients achieving an ASAS40 response<br>2. To demonstrate that the efficacy of secukinumab 150 mg s.c., without loading, at Week 16 is superior to placebo based on the proportion of TNF naive patients achieving an ASAS40 response<br>3. To demonstrate that the efficacy of secukinumab 150 mg s.c. with or without loading at Week 16 is superior to placebo based on the proportion of patients meeting the ASAS 5/6 response criteria<br>4. To demonstrate that the efficacy of secukinumab 150 mg s.c. with or without loading at Week 16 is superior to placebo based on the change from baseline in total Bath Ankylosing Spondylitis Disease Activity Index (BASDAI)<br>5. To demonstrate that the efficacy of secukinumab 150 mg s.c. with or without loading at Week 16 is superior to placebo based on the proportion of patients achieving BASDAI 50<br>6. To demonstrate that the efficacy of secukinumab 150 mg s.c., with or without loading, at Week 16 is superior to placebo based on the change from baseline of high sensitivity C-Reactive Protein (hsCRP)<br>7. To demonstrate that the efficacy of secukinumab 150 mg ws.c. ith or without loading at Week 16 is superior to placebo based on the change from baseline in total Bath Ankylosing Spondylitis Functional Index (BASFI)<br>8. To demonstrate that the efficacy of secukinumab 150 mg s.c. with or without loading at Week 16 is superior to placebo based on the change from screening in sacroiliac (SI) joint edema on MRI |

9. To demonstrate that the efficacy of secukinumab 150 mg s.c., with or without loading, at Week 16 is superior to placebo based on the proportion of subjects achieving an ASAS20 response
10. To demonstrate that the efficacy of secukinumab 150 mg s.c. with or without loading at Week 16 is superior to placebo based on the change from baseline in Short Form-36 Physical Component Summary (SF-36 PCS)
11. To demonstrate that the efficacy of secukinumab 150 mg s.c., with or without loading, at Week 16 is superior to placebo based on the change from baseline in Ankylosing Spondylitis Quality of Life (ASQoL) scores
12. To demonstrate that the efficacy of secukinumab 150 mg s.c. with or without loading at Week 16 is superior to placebo based on the proportion of patients achieving ASAS partial remission
13. Overall safety and tolerability of secukinumab
1. To demonstrate that the efficacy of secukinumab 150 mg s.c., with or without loading, at Week 52 is superior to placebo based on the proportion of all patients achieving an ASAS40 response
2. To demonstrate that the efficacy of secukinumab 150 mg s.c., with loading, at Week 52 is superior to placebo based on the proportion of TNF naive patients achieving an ASAS40 response
3. To demonstrate that the efficacy of secukinumab 150 mg s.c., with or without loading, at Week 16 is superior to placebo based on the proportion of subjects achieving an ASAS40 response
4. To demonstrate that the efficacy of secukinumab 150 mg s.c. with or without loading at Week 16 is superior to placebo based on the change from baseline in total Bath Ankylosing Spondylitis Disease Activity Index (BASDAI)
5. To demonstrate that the efficacy of secukinumab 150 mg s.c., with or without loading, at Week 16 is superior to placebo based on the proportion of patients achieving BASDAI 50
6. To demonstrate that the efficacy of secukinumab 150 mg s.c. with or without loading at Week 52 is superior to placebo based on the proportion of patients achieving BASDAI 50
7. To demonstrate that the efficacy of secukinumab 150 mg s.c., with or without loading, at Week 16 is superior to placebo based on the change from baseline of high sensitivity C-Reactive Protein (hsCRP)
8. To demonstrate that the efficacy of secukinumab 150 mg s.c. with or without loading at Week 16 is superior to placebo based on the change from baseline in Short Form-36 Physical Component Summary (SF-36 PCS)
To demonstrate that the efficacy of secukinumab 150 mg s.c., with or without loading, at Week 16 is superior to placebo based on the change from baseline in Ankylosing Spondylitis Quality of Life (ASQoL) scores
9. To demonstrate that the efficacy of secukinumab 150 mg s.c. with or without loading at Week 16 is superior to placebo based on the proportion of patients meeting the ASAS 5/6 response criteria
10. To demonstrate that the efficacy of secukinumab 150 mg s.c. with or without loading at Week 16 is superior to placebo based on the proportion of subjects achieving an ASAS20 response
11. To demonstrate that the efficacy of secukinumab 150 mg s.c.with or without loading at Week 16 is superior to placebo based on the change from baseline in total Bath Ankylosing Spondylitis Functional Index (BASFI)
12. To demonstrate that the efficacy of secukinumab 150 mg ws.c. ith or without loading at Week 16 is superior to placebo based on the change from screening in SI joint edema on MRI
13. To demonstrate that the efficacy of secukinumab 150 mg s.c. with or without loading at Week 52 is superior to placebo based on the proportion of patients achieving Ankylosing Spondylitis Disease Activity Score (ASDAS)-C-Reactive Protein (CRP) inactive disease as defined by ASDAS < 1.3
14. To demonstrate that the efficacy of secukinumab 150 mg s.c. with or without loading at Week 52 is superior to placebo based on the change from screening in SI joint edema on MRI
15. To demonstrate that the efficacy of secukinumab 150 mg s.c. with or without loading at Week 52 is superior to placebo based on the change from baseline in Ankylosing Spondylitis Quality of Life (ASQoL) scores
16. Overall safety and tolerability of secukinumab Study design: This is a randomized, double-blind, placebo-controlled study Population: The study population will consist of male and female patients ($\geq$ 18 years old at the time of consent) fulfilling the ASAS classification criteria for axSpA, with no radiographic evidence of changes in the sacroiliac joints that would meet the modified New York criteria for AS.

Inclusion criteria:
Patient must be able to understand and communicate with the investigator and comply with the requirements of the study and must give a written, signed and dated informed consent before any study assessment is performed
Male or non-pregnant, non-nursing female patients at least 18 years of age
Diagnosis of axSpA according to ASAS axSpA criteria:
Inflammatory back pain for at least 6 months
Onset before 45 years of age
Sacroiliitis on MRI with $\geq$1 SpA feature OR HLA-B-27 positive with $\geq$2 SpA features
Objective signs of inflammation at screening, evident by
Either MRI with Sacroiliac Joint inflammation
OR hsCRP > ULN (as defined by the central lab)
Active axSpA as assessed by total BASDAI $\geq$4 cm (0-10 cm) at baseline
Spinal pain as measured by BASDAI question #2 $\geq$4 cm (0-10 cm) at baseline
Total back pain as measured by VAS $\geq$40 mm (0-100 mm) at baseline
Patients should have been on at least 2 different NSAIDs at the highest recommended dose for at least 4 weeks in total prior to randomization with an inadequate response or failure to respond, or less if therapy had to be withdrawn due to intolerance, toxicity or contraindications
Patients who are regularly taking NSAIDs (including COX-2 inhibitors) as part of their axSpA therapy are required to be on a stable dose for at least 2 weeks before randomization
Patients who have been on a TNFα inhibitor (not more than one) must have experienced an inadequate response to previous or current treatment given at an approved dose for at least 3 months prior to randomization or have been intolerant to at least one administration of an anti-TNFα agent
Patients who have previously been on a TNFα inhibitor will be allowed entry into study after an appropriate wash-out period prior to randomization:
4 weeks for Enbrel ® (etanercept)—with a terminal half-life of 102 ± 30 hours (s.c. route)
8 weeks for Remicade ® (infliximab)—with a terminal half-life of 8.0-9.5 days (i.v. infusion)
10 weeks for Humira ® (adalimumab)—with a terminal half-life of 10-20 days (average 2 weeks) (s.c. route)
10 weeks for Simponi ® (golimumab)—with a terminal half-life of 11-14 days
10 weeks for Cimzia ® (certolizumab)—with a terminal half-life of 14 days
Patients taking MTX ($\leq$25 mg/week) or sulfasalazine ($\leq$3 g/day) are allowed to continue their medication and must have taken it for at least 3 months and have to be on a stable dose for at least 4 weeks prior to randomization
Patients on MTX must be on stable folic acid supplementation before randomization
Patients who are on a DMARD other than MTX or sulfasalazine must discontinue the DMARD 4 weeks prior to randomization, except for leflunomide, which has to be discontinued for 8 weeks prior to randomization unless a cholestyramine washout has been performed
Patients taking systemic corticosteroids have to be on a stable dose of $\leq$10 mg/day prednisone or equivalent for at least 2 weeks before randomization
For extension phase:
Patients who have completed the full study treatment period (104 weeks) in the core phase on study treatment.

-continued

| | |
|---|---|
| Exclusion criteria | Patients with radiographic evidence for sacroiliitis, grade ≥2 bilaterally or grade ≥3 unilaterally (radiological criterion according to the modified New York diagnostic criteria for AS) as assessed by central reader<br>Inability or unwillingness to undergo MRI (e.g., patients with pacemakers, aneurysm clips or metal fragments/foreign objects in the eyes, skin or body)<br>Chest X-ray or MRI with evidence of ongoing infectious or malignant process, obtained within 3 months of screening and evaluated by a qualified physician<br>Patients taking high potency opioid analgesics (e.g., methadone, hydromorphone, morphine)<br>Previous exposure to secukinumab or any other biologic drug directly targeting IL-17 or IL-17 receptor<br>Use of any investigational drug and/or devices within 4 weeks of randomization, or a period of 5 half-lives of the investigational drug, whichever is longer<br>History of hypersensitivity to the study drug or its excipients or to drugs of similar chemical classes<br>Any therapy by intra-articular injections (e.g., corticosteroid) within 4 weeks before randomization<br>Any intramuscular corticosteroid injection within 2 weeks before randomization<br>Patients previously treated with any biological immunomodulating agents, except those targeting TNFα<br>Patients who have taken more than one anti-TNFα agent<br>Previous treatment with any cell-depleting therapies including but not limited to anti-CD20 or investigational agents (e.g., CAMPATH, anti-CD4, anti-CD5, anti-CD3, anti-CD19)<br>Pregnant or nursing (lactating) women, where pregnancy is defined as the state of a female after conception and until the termination of gestation, confirmed by a positive human chorionic gonadotropin (hCG) laboratory test<br>Women of child-bearing potential, defined as all women physiologically capable of becoming pregnant, unless they are using effective methods of contraception during entire study or longer if required by locally approved prescribing information.<br>Active ongoing inflammatory diseases other than axSpA that might confound the evaluation of the benefit of secukinumab therapy, including inflammatory bowel disease or uveitis<br>Underlying metabolic, hematologic, renal, hepatic, pulmonary, neurologic, endocrine, cardiac, infectious or gastrointestinal conditions, which in the opinion of the investigator immunocompromises the patient and/or places the patient at unacceptable risk for participation in an immunomodulatory therapy<br>Significant medical problems or diseases, including but not limited to the following: uncontrolled hypertension (≥160/95 mmHg), congestive heart failure (New York Heart Association status of class III or IV), uncontrolled diabetes, or very poor functional status unable to perform self-care<br>History of clinically significant liver disease or liver injury as indicated by abnormal liver function tests such as SGOT (AST), SGPT (ALT), alkaline phosphatase, or serum bilirubin.<br>History of renal trauma, glomerulonephritis, or patients with one kidney only, or a serum creatinine level exceeding 1.5 mg/dL (132.6 µmol/L)<br>Screening total WBC count <3,000/µL, or platelets <100,000/µL or neutrophils <1,500/µL or hemoglobin <8.5 g/dL (85 g/L)<br>Active systemic infections during the last two weeks prior to randomization (exception: common cold)<br>History of ongoing, chronic or recurrent infectious disease or evidence of tuberculosis infection as defined by either a positive purified protein derivative (PPD) skin test (the size of induration will be measured after 48-72 hours, and a positive result is defined as an induration of ≥5 mm or according to local practice/guidelines) or a positive QuantiFERON TB-Gold. Patients with a positive test may participate in the study if further work up (according to local practice/guidelines) establishes conclusively that the patient has no evidence of active tuberculosis. If presence of latent tuberculosis is established, then treatment according to local country guidelines must have been initiated<br>Known infection with human immunodeficiency virus (HIV), hepatitis B or hepatitis C at screening or randomization<br>History of lymphoproliferative disease or any known malignancy or history of malignancy of any organ system within the past 5 years (except for basal cell carcinoma or actinic keratoses that have been treated with no evidence of recurrence in the past 3 months, carcinoma in situ of the cervix or non-invasive malignant colon polyps that have been removed)<br>Current severe progressive or uncontrolled disease which in the judgment of the clinical investigator renders the patient unsuitable for the trial<br>Inability or unwillingness to undergo repeated venipuncture (e.g., because of poor tolerability or lack of access to veins)<br>Inability or unwillingness to receive injections with PFS<br>Any medical or psychiatric condition which, in the Investigator's opinion, would preclude the participant from adhering to the protocol or completing the study per protocol<br>Donation or loss of 400 mL or more of blood within 8 weeks before dosing<br>History or evidence of ongoing alcohol or drug abuse, within the last six months before randomization<br>Plans for administration of live vaccines during the study period or 6 weeks prior to randomization |
| Investigational and reference therapy | Secukinumab 150 mg s.c.<br>Matching placebo |
| Efficacy assessments | Assessment of SpondyloArthritis International Society criteria (ASAS)<br>Patient's global assessment of disease activity (VAS)<br>Patient's assessment of back pain intensity (VAS)<br>Bath Ankylosing Spondylitis Functional Index (BASFI)<br>Bath Ankylosing Spondylitis Disease Activity Index (BASDAI)<br>Spinal mobility assessed by BASMI (Bath Ankylosing Spondylitis Metrology Index)<br>Maastricht Ankylosing Spondylitis Enthesitis Score (MASES) and expanded enthesis sites<br>hsCRP and ESR<br>ASDAS-ESR, ASDAS-CRP and ASDAS response categories<br>44-tender and swollen joint-count<br>MRI of spine and sacroiliac joints<br>X-ray of the cervical and thoraco-lumbar spine assessed by modified Stoke Ankylosing Spondylitis Spinal Score (mSASSS)<br>X-ray of the sacroiliac joints |
| Safety assessments | QuantiFERON TB-Gold test or PPD skin test<br>Chest X-ray or MRI<br>Physical examination<br>Vital signs<br>Height and weight<br>Laboratory evaluations<br>Immunogenicity<br>Electrocardiogram<br>Pregnancy and assessment of fertility<br>Local tolerability (Injection site reactions)<br>Tolerability of secukinumab |
| Other assessments | Health-related Quality of Life<br>SF-36<br>ASQoL<br>FACIT-Fatigue<br>EQ-5D<br>WPAI-GH<br>Cumulative NSAID intake<br>HLA-B27<br>Pharmacokinetics<br>Pharmacogenetics<br>Serum biomarkers |

| Data analysis | The statistical hypothesis for ASAS40 being tested is that there is no difference in the proportion of patients fulfilling the ASAS40 criteria at Week 16 (analysis plan A) or 52 (analysis plan B), respectively in the secukinumab regimens versus placebo regimen |
|---|---|

Results:

The study enrolled 555 male and female adult patients with active nr-axSpA (with onset before 45 years of age, spinal pain rated as >40/100 on a visual analog scale (VAS) and Bath Ankylosing Spondylitis Disease Activity Index (BASDAI) >4) and who had been taking at least two different non-steroidal anti-inflammatory drugs (NSAIDs) at the highest dose up to 4 weeks prior to study start. Patients may have previously taken a TNF inhibitor (not more than one) but had had an inadequate response. Of the 555 patients enrolled in the study, 501 (90%) were biologic naive.

The ongoing Phase III trial met its primary endpoint of ASAS40 at Week 16, showing a significant and clinically meaningful reduction in disease activity for nr-axSpA patients treated with secukinumab versus placebo. All secondary endpoints were also met.

The primary endpoints are the proportion of patients achieving an ASAS40 response with secukinumab 150 mg at weeks 16 and 52. Secondary endpoints include change in BASDAI over time and change in the Ankylosing Spondylitis Disease Activity Score with CRP (ASDAS-CRP) The trial demonstrated a favorable safety profile consistent with previous clinical trials.

Example 2: Pharmacokinetic Modelling and Simulation of Secukinumab Regimens for Treating PsA and axSpA Patients Methods:

The determination of the i.v. regimen was based on the following considerations: the dose was selected such that the average secukinumab concentration at steady-state would be approximately in the range of that of safe and considered efficacious secukinumab s.c. regimens. A q4w dosing interval was selected to limit the peak-to-trough concentration ratio while avoiding too frequent administration visits. The use of higher first dose to reach faster the steady-state considerations was explored. Several i.v. regimens meeting the aforementioned conditions were investigated. PK simulation was used to explore their characteristics and to compare them to relevant s.c. regimens. The simulations were conducted using the weight distribution from the Phase 3 registrations studies. Two unpublished population PK models developed from the secukinumab PsA and AS registration studies, but with similar characteristics to a published model (Bruin et al. (2017) Clin Pharmacol. 57(7): 876-885), i.e., 2-compartment PK models with first-order absorption for subcutaneous administration and with zero-order infusion for intravenous administration and with linear elimination and weight as only covariate affecting the clearance, were used for this purpose. The models were fitted using NONMEM software versions 7.2 and 7.3 Beal, S., Sheiner, L. B., Boeckmann, A., & Bauer, R. J., NONMEM User's Guides. (1989-2009), Icon Development Solutions, Ellicott City, MD, USA, 2009). The models were subsequently recoded in Monolix Model Coding Language (Mlxtran) for simulation purpose; the simulation presented here were performed in R version 3.4.3 using the mlxR package version 3.3.0 (R Core Team (2017). R: A language and environment for statistical computing. R Foundation for Statistical Computing, Vienna, Austria. Available at worldwideweb.R-project.org/).

Results:

The characteristics of nine regimens defined as the combination of three high first (loading/induction) dose (4 mg/kg, 6 mg/kg, and 9 mg/kg) followed by three maintenance dose (2 mg/kg, 3 mg/kg, and 4 mg/kg) administered every 4 weeks from Week 4 onward were investigated. The median secukinumab time-concentration profile of those nine regimens is displayed in FIG. 1 (AS) and FIG. 2 (PSA) along with the corresponding profiles from two registered s.c. regimens: 150 mg q1w until Week 4 then q4w from Week 8 (week 0, 1, 2, 3, 4, 8, 12, 16, etc.) and 300 mg q1w until Week 4 then q4w from Week 8 (week 0, 1, 2, 3, 4, 8, 12, 16, etc.). While all maintenance i.v. doses at least match the steady-state trough concentrations of the 150 s.c regimen, the 3 mg/kg i.v. maintenance dose, which approximately matches the average steady-state concentration of the 300 s.c. regimen, was selected for studies CAIN457P12301 and CAIN457P12302, in combination with the 6 mg/kg first (loading) dose. Notably, the i.v. regimens achieve steady state at approximately week 4, while both s.c. regimens require 16-20 weeks to achieve steady-state. Thus, the proposed i.v. regimens, where patients are dosed proportionally to their weight, ensure a more consistent exposure across the weight range than the s.c. regimens (FIGS. 3A-C and FIGS. 4A-C).

Example 3: Pharmacodynamic Modelling and Simulation of Secukinumab Regimens (Switching Patients from Secukinumab 150 mg and 300 mg SC to Secukinumab 6 mg/kg/3 Mg/Kg IV does not Impact Efficacy)

The use of meta-analysis to assess how the efficacy of an i.v. regimen administered in a study compares to that of an s.c. regimen administered in other studies can be challenging due to variability between studies in drug effect. Conversely, from a pharmaco-dynamic standpoint, the difference of efficacy between an i.v. regimen and a s.c regimen of comparable average exposure should be guided by how direct is the drug effect. Indeed, if the effect is direct, i.e., the plasma drug concentration is seen as having an immediate effect, an i.v. regimen should be less efficacious by the end of the dosing interval given its lower trough concentrations; but if the effect is indirect, i.e., there is a delay in the observed effect with respect to the plasma drug concentration the efficacy of the i.v. regimen at trough may still benefit from the higher peak generated after an i.v. administration. Preliminary internal work with data from the registration studies suggest that there is a delay in the concentration-effect relationship. Our objective is therefore to quantify this delay with sufficient precision, and, ultimately, to predict the resulting difference in effect that a patient can expect when switching from a registered s.c. regimen (150 mg or 300 mg s.c. at week 0, 1, 2, 3, and 4, and then monthly (q4w) thereafter, beginning during week 8) to the secukinumab i.v. regimen used in CAIN457P12301 and CAIN457P12302. To this end, we will use a pharmacometric PK/PD approach using a non-linear mixed effect model approach to estimate the relationship secukinumab time-varying concentration and relevant efficacy endpoints (e.g., BASDAI in AS). This analysis will be performed on the pool of the Phase 3 studies and will account for between-study variability on all relevant parameters, to ensure prediction robustness with respect to such variability.

Example 4: Clinical Trial CAIN457P12302

This multicenter study uses a randomized, double-blind, placebo-controlled, parallel-group design to study efficacy, safety and tolerability of treatment with intravenous secukinumab (Initial dose of i.v. secukinumab 6 mg/kg at baseline (BSL) followed by the administration of secukinumab 3 mg/kg every four weeks starting at week 4) in patients with active PsA. The study population comprises patients with active PsA, despite current or previous NSAID, DMARD and/or TNF inhibitor therapy or intolerance to these therapies.

Study Design:

At baseline, patients with active PsA will be randomized to one of the two treatment groups in a 1:1 ratio:
  Group 1: secukinumab i.v. (6 mg/kg) at BSL, followed by secukinumab 3 mg/kg i.v. every four weeks starting at Week 4 through Week 48 (exposure through week 52).
  Group 2: placebo i.v. at BSL, Week 4, 8 and 12 followed by secukinumab 3 mg/kg i.v. every four weeks starting at Week 16 through Week 48 (exposure through week 52).

This study will consist of 4 periods: the screening period (up to 10 weeks), the treatment period 1 (total duration of 16 weeks) and the treatment period 2 (total duration of 32 weeks) followed by the safety follow up period of 8 weeks after the end of treatment visit (i.e., Week 52). The study will have a primary endpoint at Week 16. A Primary endpoint analysis will be performed with Week 16 data (last patient completing Treatment period 1 (Week 16)). Long-term efficacy and safety assessments will be performed up to Week 52.

Figure 5A:
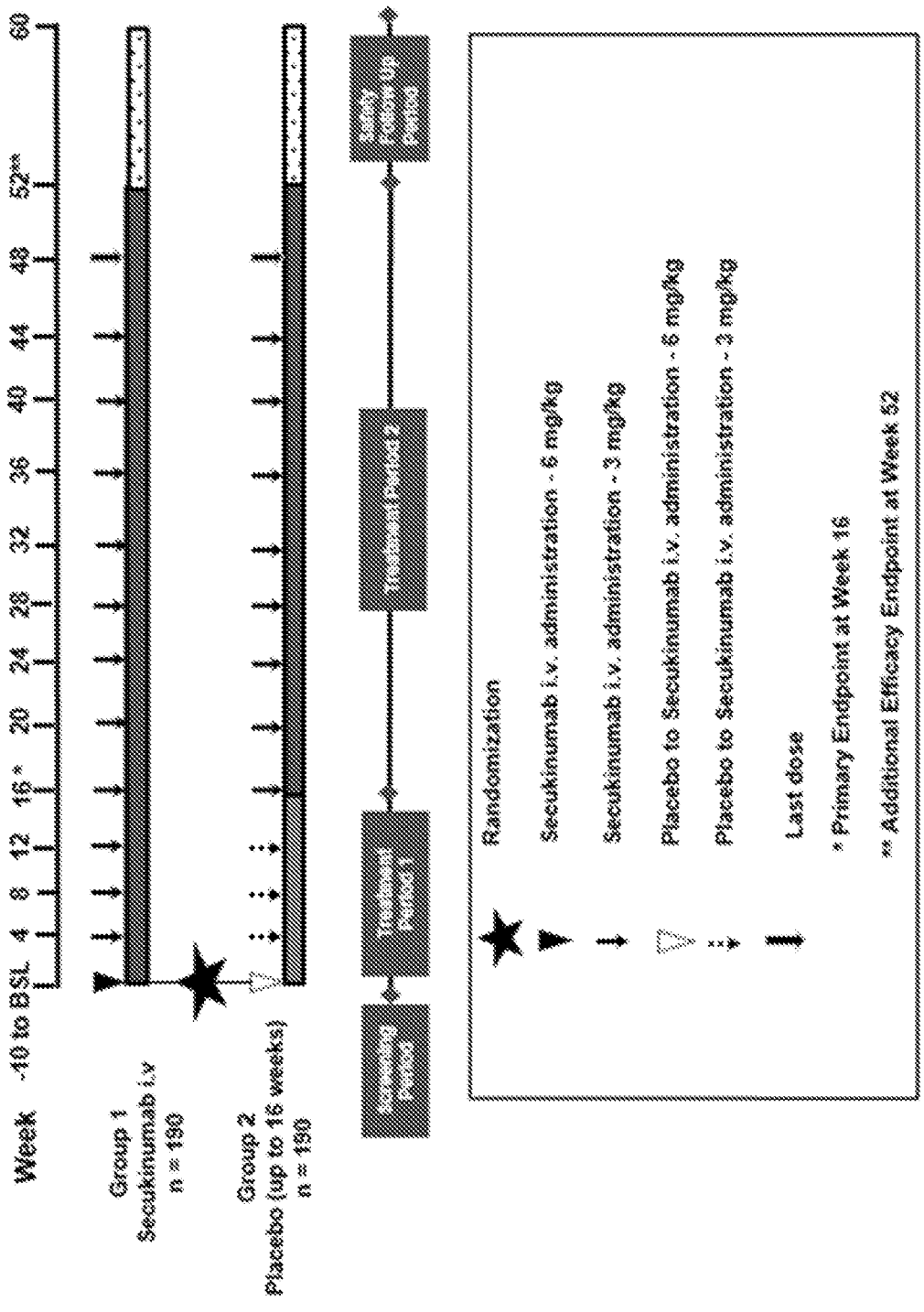
FIG. 5 shows the study design for the most preferred secukinumab IV regimen, i.e., 6 mg/kg IV (load) and 3 mg/kg IV (maintenance), in human clinical trials in PsA (FIG. 5A) and ax-SpA (FIG. 5B) patients.

The patients will be stratified at randomization according to response to TNF-inhibitor therapy, in order to evaluate the efficacy and safety in both TNF-inhibitor naive (TNF-naive) and TNF-IR subject populations. Starting at Week 16, all patients will switch to open-label i.v. secukinumab, including all placebo patients. The study design is shown in FIG. 5A.

Rationale for Dose, Regimen, and Duration of Treatment

Phase 3 studies in subjects with active PsA (CAIN457F2312, CAIN457F2318 and CAIN457F2342) demonstrated the superior efficacy of secukinumab 150 mg s.c. and 300 mg s.c. regimens over placebo. Secukinumab 150 mg s.c. and 300 mg s.c. regimens had a rapid onset of response and similar magnitude of efficacy across several endpoints.

While secukinumab 150 mg s.c. and 300 mg s.c. regimens are both more efficacious than placebo regardless of TNF-naive or TNF-IR status, the 300 mg s.c. regimen provided the greatest efficacy across multiple PsA domains including ACR20, ACR50, ACR70, HAQ-DI, PASI75, PASI90, SF-36 PCS, in the resolution of dactylitis and enthesitis as well as in the inhibition of structural progression.

In a pooled analysis of 2049 patients with PsA in the phase III program, evidence of higher efficacy was shown in the overall population and several subsets of PsA patients including, but not limited to, TNF-IR patients and patients who do not use concomitant MTX, favoring secukinumab 300 mg s.c. over 150 mg s.c. at Week 16 for several endpoints. This trend was maintained up to Week 52.

Furthermore, secukinumab 300 mg s.c. was more efficacious than 150 mg s.c. in achieving clinically meaningful improvements in skin disease, particularly with respect to clear/almost clear skin (PASI90, IGA mod 2011 0/1) in subjects with moderate to severe psoriasis (defined as ≥10% BSA). There was a clear dose response favoring secukinumab 300 mg s.c. in the higher thresholds of skin clearance. The difference between 300 mg s.c. and 150 mg s.c. regimens was more pronounced in the more difficult-to-achieve PASI90 and IGA mod 2011 0/1 endpoints, with 21.9% and 27.4% more patients with ≥10% BSA compared to 8.2% and 3.3% more patients with <10% BSA reaching PASI 90 and IGA mod 2011 0/1 responses, respectively, at Week 24. Thus, secukinumab 300 mg s.c. afforded greater improvement in psoriasis than 150 m.g. s.c., particularly in achieving clear/almost clear skin, in subjects with psoriasis at baseline.

In addition, pertaining to safety assessment, there were no clinically meaningful differences among the secukinumab doses of 300 mg and 150 mg in the exposure adjusted incidence rates of the key risks over the entire treatment period in the phase III trials in PsA patients.

The overall safety data in the PsA population was consistent with prior extensive experience in psoriasis and show that secukinumab 300 mg and 150 mg are acceptable for chronic use in adult patients with active PsA. However, despite the demonstrated clinical efficacy with 150 mg s.c. and 300 mg s.c, the fixed dose nature of these posologies imposes constraints in certain patient populations. Towards overcoming these constraints and to offer a weight based posology with its attendant flexibility, a regimen of i.v. secukinumab is being developed. The i.v. regimen of secukinumab—6 mg/kg at BSL and 3 mg/kg every 4 weeks thereafter—is designed as a result of extensive PK analysis and modelling based on an extensive database of 150 mg s.c. and 300 mg s.c. secukinumab.

Figure 6:
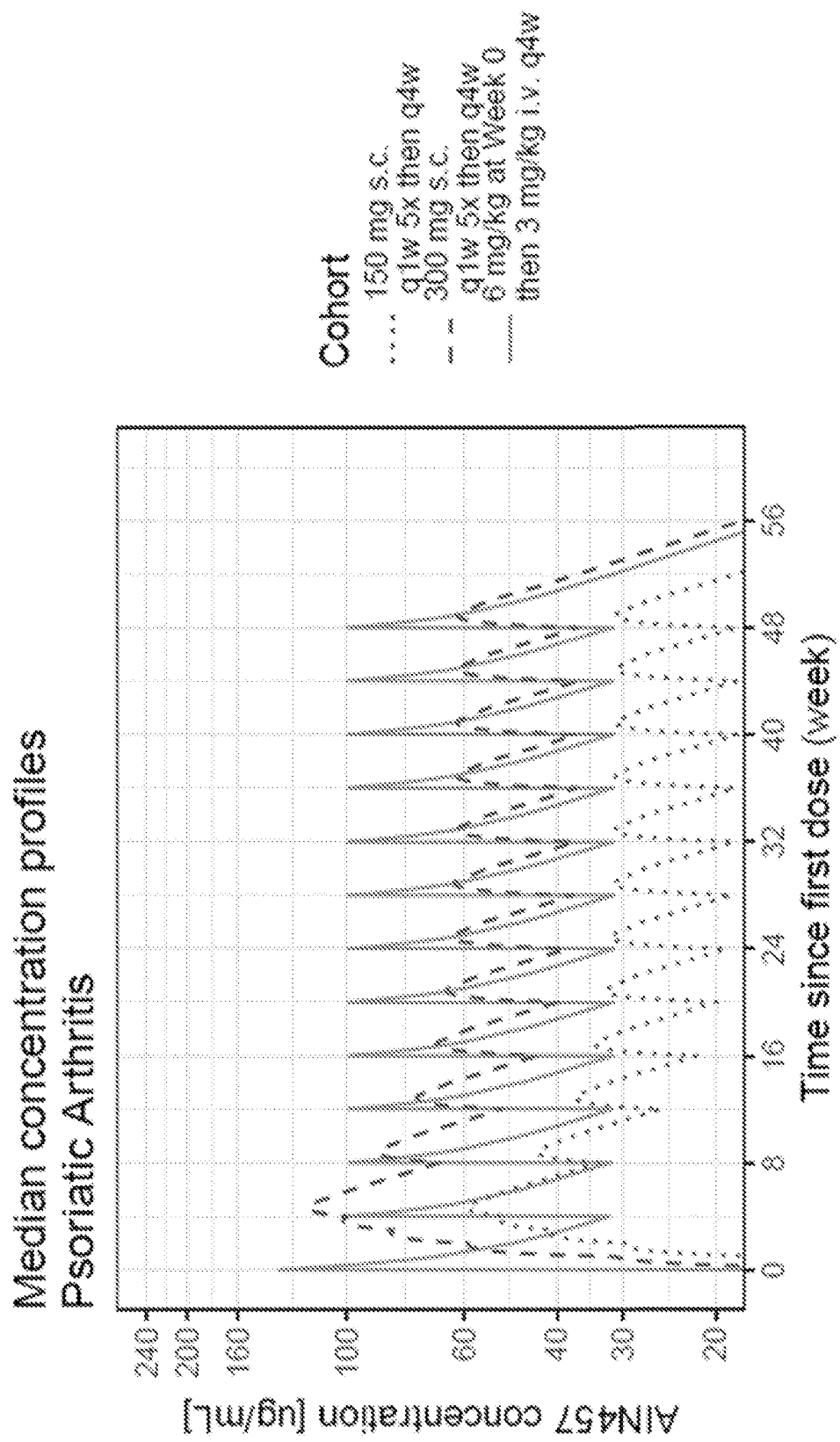
FIG. 6 shows the median concentration profiles at steady state for a secukinumab 150 mg fixed SC regimen (weekly during week 0, 1, 2, and 3, and then monthly [q4w] beginning during week 4), a secukinumab 300 mg fixed SC regimen (weekly during week 0, 1, 2, and 3, and then monthly [q4w] beginning during week 4), and a secukinumab IV regimen (6 mg/kg at baseline (week 0), and 3 mg/kg monthly [q4w] thereafter) in PsA patients.

This i.v. regimen of secukinumab—6 mg/kg at BSL and 3 mg/kg q4wkly thereafter—is modelled to target a Cmin that is consistently above that achieved with 150 mg s.c. with a Cavg and Cmax close to that achieved with 300 mg. s.c. as illustrated in FIG. 6. Hence, the proposed i.v. regimen of secukinumab is expected to deliver an exposure that would approximate the 300 mg s.c. Given the amount of data collected so far and the understanding achieved on the PK profile for secukinumab in PsA, it is expected that the clinical response with the proposed i.v. regimen will be similar with that observed with the s.c. regimen.

A detailed protocol summary is below:

| | |
|---|---|
| Full Title | A randomized, double-blind, placebo-controlled, parallel group, phase III multicenter study of intravenous secukinumab to compare efficacy at 16 week swith placebo and to assess safety and tolerability up to 52 weeks in subjects with active Psoriatic Arthritis |
| Brief title | Study to demonstrate the efficacy, safety and tolerability of intravenous secukinumab upto 52 weeks in subjects with active Psoriatic Arthritis |
| Purpose and rationale | The purpose of this global study is to provide up to 52 weeks of efficacy, safety and tolerability data to support registration of intravenous (i.v.) secukinumab (Initial dose of 6 mg/kg at Baseline (BSL) followed there- |

|                        | -continued |
|------------------------|------------|
|                        | after with 3 mg/kg administered every four weeks) in patients with active psoriatic arthritis (PsA) despite current or previous NSAID, DMARD and/or anti-TNF therapy.<br>Efficacy and safety data from this clinical study will be used to support the registration of i.v. secukinumab in the US and other countries for treatment of patients with active psoriatic arthritis. |
| Primary Objective(s)   | To demonstrate that the efficacy of i.v. secukinumab at Week 16 is superior to placebo in subjects with active psoriatic arthritis (PsA) based on the proportion of patients achieving an American College of Rheumatology 50 (ACR50) response. |
| Secondary Objectives   | The efficacy of i.v. secukinumab at Week 16 is superior to placebo based on the proportion of subjects achieving an ACR20 response.<br>The efficacy of i.v secukinumab at Week 16 is superior to placebo based on the proportion of patients achieving Minimal Disease Activity MDA 5/7.<br>The efficacy of i.v. secukinumab at Week 16 is superior to placebo based on the proportion of subjects achieving a PASI90 response in the subgroup of subjects who have ≥3% skin involvement with psoriasis.<br>The improvement (change) from baseline on i.v. secukinumab is superior to placebo for the PASDAS at Week 16.<br>The improvement (change) from baseline on i.v. secukinumab is superior to placebo for the HAQ-DI at Week 16.<br>The improvement (change) from baseline on i.v. secukinumab is superior to placebo for the SF36-PCS at Week 16.<br>The improvement (change) from baseline on i.v. secukinumab is superior to placebo for the FACIT-fatigue at Week 16.<br>The improvement (change) from baseline on i.v. secukinumab is superior to placebo for the mNAPSI at Week 16 for the subgroup of patients with nail involvement.<br>The efficacy of i.v. secukinumab at Week 16 is superior to placebo based on the proportion of subjects with resolution of dactylitis by the Leeds Dactylytis Index in the subset of subjects who have dactylitis at baseline.<br>The efficacy of i.v. secukinumab at Week 16 is superior to placebo based on the proportion of subjects with resolution of enthesitis by the Leeds Enthesitis Index in the subset of subjects who have enthesitis at baseline.<br>The overall safety and tolerability of i.v. secukinumab compared to placebo as assessed by vital signs, clinical laboratory values, and adverse events monitoring. |
| Study design           | This multicenter study uses a randomized, double-blind, placebo-controlled, parallel-group design. A screening (SCR) period running up to 10 weeks before randomization will be used to assess subject eligibility followed by a treatment period of 52 weeks.<br>At baseline, approximately 380 patients with active psoriatic arthritis will be randomized to one of the two treatment groups in a 1:1 randomzation:<br>Group 1: Approximatly 190 patients with active psoriatic arthritis; These patients will receive secukinumab 6 mg/kg i.v. at BSL, followed by the administration of secukinumab 3 mg/kg i.v. every four weeks starting at Week 4.<br>Group 2: Approximately 190 patients with active psoratic arthritis; These patients will receive i.v. placebo at BSL and at Weeks 4, 8, and 12, followed by the administration of secukinumab 3 mg/kg i.v. every four weeks starting at Week 16.<br>Study will consist of 4 periods: a screening period (up to 10 weeks), treatment period 1 (total duration of 16 weeks) and treatment period 2 (total duration of 36 weeks) followed by a safety follow up period of 8 weeks after the end of treatment visit (i.e., Week 52).<br>Primary endpoint analysis will be performed with Week 16 data (last patient completing Treatment period 1 (Week 16). Long-term efficacy and safety assessments will be performed up to Week 52. |
| Population             | The study population will consist of male or female subjects at least 18 years of age, fulfilling the Classification criteria for Psoriatic Arthritis (CASPAR), and PsA for at least 6 months and have active PsA disease defined as ≥3 swollen and ≥3 tender joints.<br>Subjects must report active disease despite current or previous NSAIDs, DMARDs and/or TNF inhibitor therapy or intolerance to these therapies. Concomitant therapy with MTX (≤25 mg/week) will be acceptable, if dose has been stable for at least four weeks prior to the randomization visit and should remain on a stable dose upto Week 16.<br>Randomization will be stratified by previous TNFα inhibitor-use (TNFα inhibitor-naïve vs. TNFα inhibitor-inadequate responder). |
| Key Inclusion criteria | Subjects eligible for inclusion in this study have to fulfill all of the following criteria:<br>Diagnosis of PsA classified by CASPAR criteria and with symptoms for at least 6 months with moderate to severe PsA who must have at BSL ≥3 tender joints out of 78 and >3 swollen joints out of 76 (dactylitis of a digit counts as one joint each).<br>Rheumatoid factor (RF) and anti-cyclic citrullinated peptide (anti-CCP) antibodies negative at screening. |

|  | -continued |
| --- | --- |
|  | Subjects with PsA should have taken NSAIDs for at least 4 weeks prior to randomization with inadequate control of symptoms or at least one dose if stopped due to intolerance to NSAIDs.<br>Subjects who are regularly taking NSAIDs as part of their PsA therapy are required to be on a stable dose for at least 2 weeks before study randomization and should remain on a stable dose up to Week 16.<br>Subjects taking corticosteroids must be on a stable dose of ≤10 mg/day prednisone or equivalent for at least 2 weeks before randomization and should remain on a stable dose up to Week 16.<br>Subjects taking MTX (≤25 mg/week) are allowed to continue their medication if the dose and route of administration is stable for at least 4 weeks before randomization and should remain on a stable dose up to Week 16. |
| Key Exclusion criteria | Patients fulfilling any of the following criteria are not eligible for inclusion in this study:<br>Chest X-ray or chest MRI with evidence of ongoing infectious or malignant process, obtained within 3 months prior to screening and evaluated by a qualified physician<br>Subjects taking high potency opioid analgesics (e.g. methadone, hydromorphone, morphine)<br>Previous exposure to secukinumab or other biologic drug directly targeting IL-17 or IL-17 receptor<br>Ongoing use of prohibited psoriasis treatments/medications (e.g., topical corticosteroids, UV therapy) at randomization. The following wash-out periods need to be observed:<br>Oral or topical retinoids—4 weeks<br>Photochemotherapy (e.g. PUVA)—4 weeks<br>Phototherapy (UVA or UVB)—2 weeks<br>Topical skin treatments (except in face, eyes, scalp and genital area during screening, only corticosteroids with mild to moderate potency)—2 weeks<br>Any intramuscular or intravenous corticosteroid treatment within 4 weeks before randomization.<br>Any therapy by intra-articular injections (e.g. corticosteroid) within 4 weeks before randomization.<br>Subjects who have previously been treated with more than 3 different TNF inhibitors (investigational or approved).<br>Subjects who have ever received biologic immunomodulating agents, investigational or approved except for those targeting TNFα.<br>Previous treatment with any cell-depleting therapies including but not limited to anti-CD20 or investigational agents (e.g., CAMPATH, anti-CD4, anti-CD5, anti-CD3, anti-CD19) |
| Study treatment | At baseline, eligible subjects will be randomized to one of the following two treatment arms in a 1:1 ratio<br>Group 1: secukinumab i.v. (6 mg/kg) at BSL, followed by secukinumab 3 mg/kg i.v. every four weeks starting at Week 4 through Week 48 (exposure through week 52).<br>Group 2: placebo i.v. at BSL, Week 4, 8 and 12 followed by secukinumab 3 mg/kg i.v. every four weeks starting at Week 16 through Week 48 (exposure through week 52). |
| Efficacy assessments | Key assessments for ACR response (Primary Objective)<br>Swollen Joint Count (SJC)/Tender Joint Count (TJC)<br>Patient's global assessment of disease activity (VAS)<br>Physician's global assessment of disease activity (VAS)<br>Patient's assessment of PsA pain intensity (VAS)<br>Health Assessment Questionnaire—Disability Index (HAQ-DI©)<br>high sensitivity C-Reactive Protein (hsCRP) and/or Erythrocyte Sedimentation Rate (ESR)<br>Key assessments for Secondary Objectives:<br>Minimal disease activity<br>Psoriasis Area and Severity Index (PASI)<br>Psoriatic Arthritis Disease Activity Score (PASDAS)<br>Health Assessment Questionnaire—Disability Index (HAQ- DI)<br>Short Form Health Survey (SF-36)<br>Functional Assessment of Chronic Illness Therapy (FACIT)—Fatigue<br>Modified Nail Psoriasis Severity Index (mNAPSI)<br>Leeds Dactylitis Index (LDI)<br>Leeds Enthesitis Index (LEI) |
| Key safety assessments | Following are the key safety assessments:<br>Evaluation of AE's/SAE's<br>Physical examination and Vital signs<br>QuantiFERON TB-Gold test or PPD skin test<br>Electrocardiogram<br>Local tolerability (Injection site reactions)<br>Laboratory evaluations (Hematology, Clinical Chemistry, Lipid Panel, Urinalysis and cardiovascular panel)<br>Immunogenicity |

| | |
|---|---|
| Other assessments | Quality of Life questionnaires/Patient reported outcomes (PROs)<br>Pharmacokinetics<br>Pharmacogenetics<br>Serum biomarkers related to targeted pathways |
| Data analysis | The primary endpoint in the study is the proportion of subjects who achieve an ACR50 response at Week 16. The statistical hypothesis for ACR50 being tested is that there is no difference in the proportion of subjects fulfilling the ACR50 criteria at Week 16 in the i.v. regimen vs. placebo.<br>Let $P_j$ denote the proportion of ACR50 responders at Week 16 for treatment regimens j, j = 0, 1 where<br>0 corresponds to placebo,<br>1 corresponds to i.v. regimen<br>in statistical terms, $H_1: P_1 = P_0$, $H_{A1}: P_1 \neq P_0$, for the i.v. secukinumab regimen, i.e.<br>$H_1$: i.v. regimen is not different to placebo for signs and symptoms (ACR50 response) at Week 16<br>The primary endpoint of ACR50 at Week 16 in the FAS will be evaluated using a logistic regression with treatment and randomization stratum (TNFα status—naïve or IR) as factors and weight as a covariate. Marginal response proportion will be computed for comparisons of i.v. regimen vs. placebo utilizing the logistic regression model fitted.<br>Safety analyses will include summaries of AEs, laboratory measurements, and vital signs. |
| Key words | Active Psoriatic Arthritis, Intravenous secukinumab |

Example 5: Clinical Trial CAN457P12301

This multicenter study uses a randomized, double-blind, placebo-controlled, parallel-group design to study the efficacy, safety, and tolerability of treatment with intravenous secukinumab (initial dose of 6 mg/kg followed thereafter with 3 mg/kg administered every four weeks) in subjects with active ax-SpA. The study population consists of subjects with active AS and subjects with nr-ax-SpA, despite current or previous NSAID, DMARD and/or TNF inhibitor therapy, or intolerance to these therapies.

Study Design:

At baseline, subjects with active AS and nr-axSpA will be randomized to one of the two treatment groups:
- Group 1: AS subjects and nr-axSpA subjects; These subjects will receive secukinumab 6 mg/kg i.v. at BSL, followed by the administration of secukinumab 3 mg/kg i.v. every four weeks starting at Week 4 through Week 48
- Group 2: AS subjects and nr-axSpA subjects; These subjects will receive i.v. placebo matching secukinumab 6 mg/kg i.v. at randomization and at Weeks 4, 8, and 12, followed by the administration of secukinumab 3 mg/kg i.v. at Week 16 and every four weeks through Week 48

This study will consist of 4 periods: the screening period (up to 10 weeks), the treatment period 1 (total duration of 16 weeks) and the treatment period 2 (total duration of 32 weeks) followed by the safety follow up period of 8 weeks after the end of treatment visit (i.e., Week 52). The subjects will be stratified at randomization according to response to TNF-inhibitor therapy and disease condition (i.e., AS or nr-ax-SpA). Starting at Week 16, all subjects will switch to open-label intravenous secukinumab, including all placebo subjects. An end of treatment visit (Week 52) is to be done 4 weeks after last study treatment administration and a post treatment follow-up visit (week 60) is to be done 12 weeks after last study treatment administration for all subjects (regardless of whether they complete the entire study as planned or discontinue prematurely).

Figure 5B:
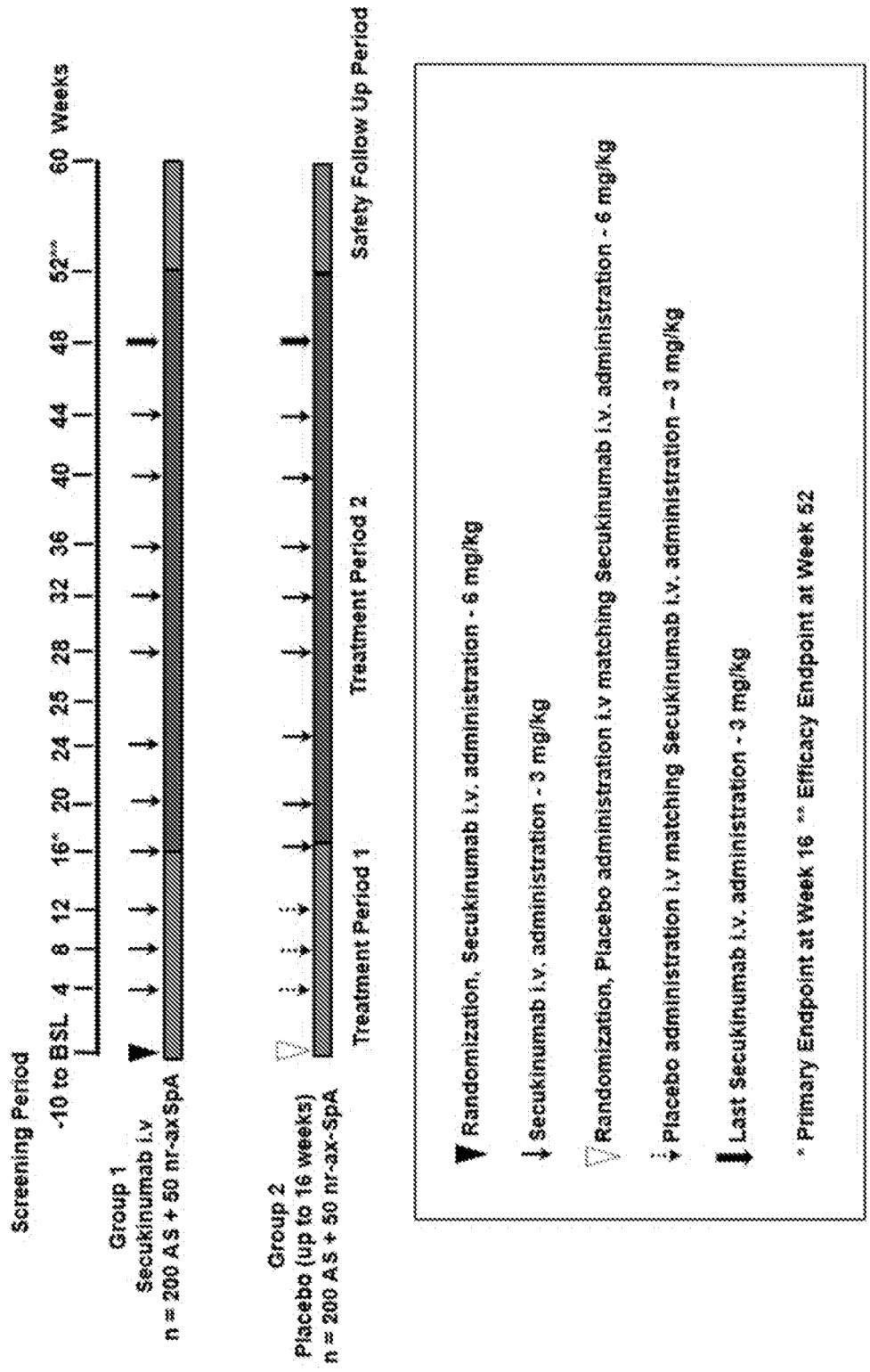

The study will have a primary endpoint analysis at Week 16. Therefore, the primary analysis will be performed with Week 16 data once the last subject has completed the Treatment Period. The study design is shown in FIG. 5B.

Rationale for Dose, Regimen, and Duration of Treatment

Figure 7:
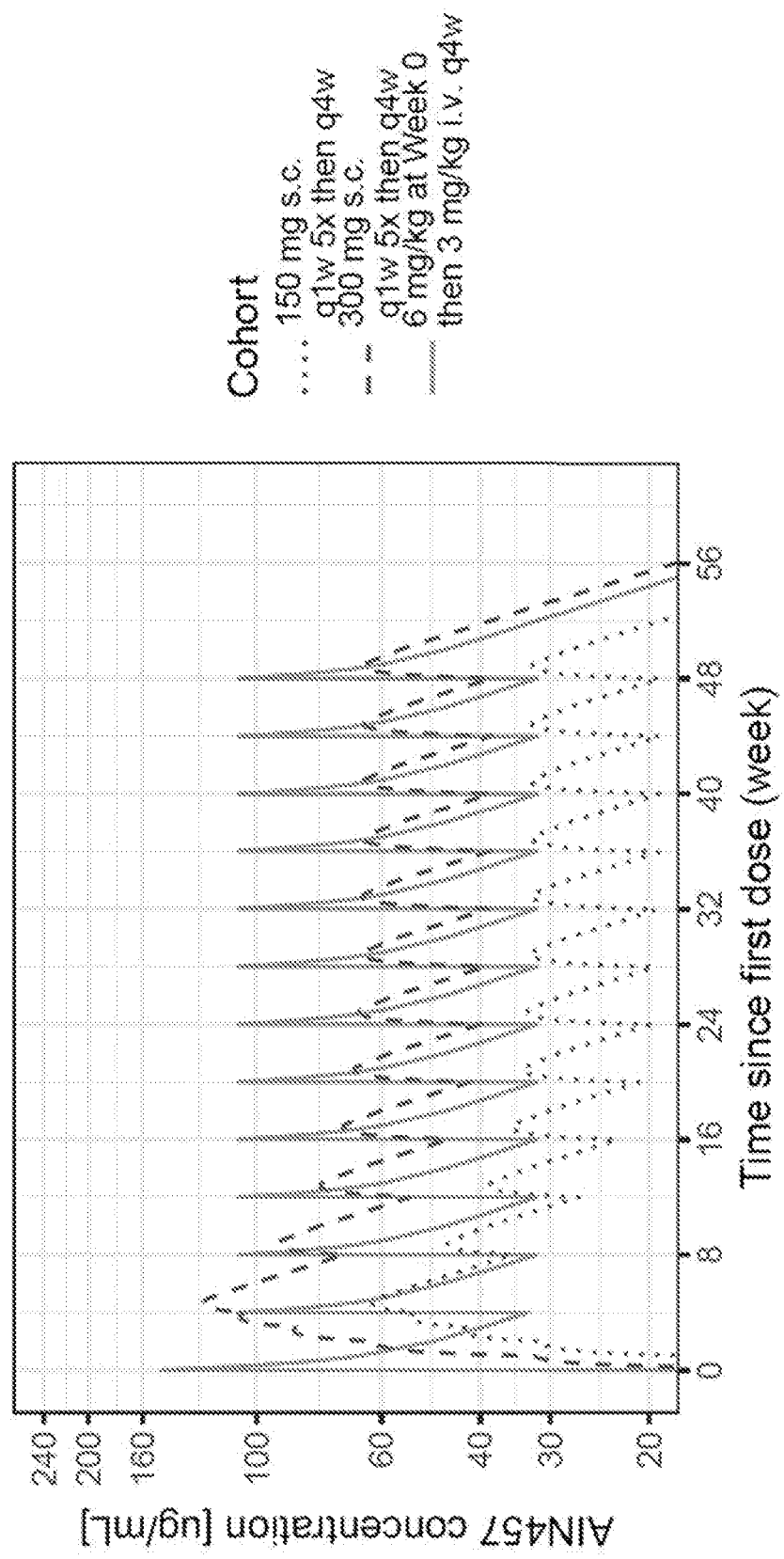
FIG. 7 shows the median concentration profiles at steady state for a secukinumab 150 mg fixed SC regimen (weekly during week 0, 1, 2, and 3, and then monthly [q4w] beginning during week 4), a secukinumab 300 mg fixed SC regimen (weekly during week 0, 1, 2, and 3, and then monthly [q4w] beginning during week 4), and a secukinumab IV regimen (6 mg/kg at baseline (week 0), and 3 mg/kg monthly [q4w] thereafter) in AS patients.

This i.v. regimen of secukinumab—6 mg/kg at BSL and 3 mg/kg every four weeks—is modelled to target a Cmin that is consistently above that achieved with 150 mg s.c. with a Cavg and Cmax close to that achieved with 300 mg s.c. as illustrated in FIG. 7. Hence, the proposed i.v. regimen is expected to deliver an exposure within the approved s.c. doses of secukinumab. Considering the large amount of clinical data collected so far and understanding of the PK profile for secukinumab in AS, it is expected that the clinical response with the proposed i.v. regimen will be similar to that observed with current approved s.c. regimens.

A detailed protocol summary is below:

| | |
|---|---|
| Full Title | A randomized, double-blind, placebo-controlled, parallel group, phase III multicenter study of intravenous secukinumab to compare efficacy at 16 weeks with placebo and to assess safety and tolerability up to 52 weeks in subjects with active Ankylosing Spondylitis or non-radiographic axial SpondyloArthritis |
| Brief title | Study to demonstrate the efficacy, safety and tolerability of an intravenous (i.v.) regimen of secukinumab compared to placebo in subjects with active axSpA |
| Purpose and rationale | The purpose of this global study is to demonstrate the efficacy, safety, and tolerability of an intravenous (i.v.) regimen of secukinumab compared to placebo in subjects with active axSpA at Week 16 despite current or previous NSAID, DMARD and/or anti Tumor Necrosis Factor (TNF) therapy. In addition, to further support efficacy and safety of an i.v. regimen, data will be collected for up to 52 weeks of treatment. Efficacy and safety data may be used to support the registration of i.v. secukinumab in the US and other countries for treatment of subjects with active axSpA. |

| | |
|---|---|
| Primary Objective(s) | To demonstrate that the efficacy of i.v. secukinumab at Week 16 is superior to placebo in subjects with active axspA (AS and nr-axSpA) based on the proportion of subjects achieving an ASAS40 (Assessment of SpondyloArthritis International Society criteria) response. |
| Secondary Objectives | 1. To demonstrate that the efficacy of i.v. secukinumab at Week 16 is superior to placebo based on the proportion of subjects achieving Ankylosing Spondylitis Disease Activity Score (ASDAS)-C-Reactive Protein (CRP) major improvement<br>2. To demonstrate that the efficacy of i.v. secukinumab at Week 16 is superior to placebo based on the change from baseline in total Bath Ankylosing Spondylitis Disease Activity Index (BASDAI)<br>3. To demonstrate that the efficacy of i.v. secukinumab at Week 16 is superior to placebo based on the proportion of subjects meeting the ASAS 5/6 response criteria<br>4. To demonstrate that the efficacy of i.v. secukinumab at Week 16 is superior to placebo based on Bath Ankylosing Spondylitis Functional Index (BASFI)<br>5. To evaluate the efficacy of i.v. secukinumab compared to placebo after 16 weeks of treatment by assessing Short Form-36 Physical Component Summary (SF-36 PCS)<br>6. To demonstrate that the efficacy of i.v. secukinumab at Week 16 is superior to placebo based on the change from baseline in Ankylosing Spondylitis Quality of Life (ASQoL) scores<br>7. To demonstrate that the efficacy of i.v. secukinumab at Week 16 is superior to placebo based on the change from baseline in high sensitivity C-Reactive Protein (hsCRP)<br>8. To demonstrate that the efficacy of i.v. secukinumab at Week 16 is superior to placebo based on the proportion of subjects achieving an ASAS20 response<br>9. To demonstrate that the efficacy of i.v. secukinumab at Week 16 is superior to placebo based on the proportion of subjects achieving Ankylosing Spondylitis Disease Activity Score (ASDAS)-C-Reactive Protein (CRP) inactive disease<br>10. To demonstrate that the efficacy of i.v. secukinumab at Week 16 is superior to placebo based on the proportion of subjects achieving ASAS partial remission<br>11. To demonstrate that the efficacy of i.v. secukinumab at Week 16 is superior to placebo based on the change from baseline in Pittsburgh Sleep Quality Index (PSQI)<br>12. Overall safety and tolerability of i.v. secukinumab compared to placebo as assessed by physical exams, vital signs, laboratory assessments and adverse event monitoring |
| Study design | This multicenter study uses a randomized, double-blind, placebo-controlled, parallel-group design to study the efficacy, safety, and tolerability of treatment with intravenous secukinumab (initial dose of 6 mg/kg followed thereafter with 3 mg/kg administered every four weeks starting at Week 4) in subjects with active axSpA. |
| Population | The study population will consist of male and female subjects (≥18 years old at the time of consent) with active axSpA (radiographic AS or non-radiographic axSpA). The diagnosis of axSpA must fulfill the ASAS criteria of inflammatory back pain for at least 6 months AND onset before 45 years of age. The diagnosis of radiographic AS must fulfill the Modified New York criteria for ankylosing spondylitis with prior documented radiological evidence (x-ray or a radiologists report).<br>Subjects with nr-axSpA (no definitive radiographic evidence of changes in the sacroiliac joints that would meet the modified New York criteria for AS) must fulfill the following ASAS classification criteria for axSpA:<br>a. Sacroiliitis on MRI with ≥1 SpA feature OR HLA-B-27 is positive with ≥2 SpA features AND<br>b. Objective signs of inflammation at screening, evident by either MRI with SI joint inflammation AND/OR hsCRP > ULN (as defined by the central lab)<br>In addition, all subjects must have evidence of active axSpA as measured by the following three assessments:<br>total BASDAI ≥4 cm on a scale of 0-10 cm<br>spinal pain as measured by BASDAI question #2 ≥4 cm (0-10 cm)<br>total back pain as measured by visual analog scale (VAS) ≥40 mm (0-100 mm)<br>Included subjects must have evidence of active disease despite current or previous NSAID, conventional DMARD and/or anti-TNF therapy.<br>This is a global interventional study and it expected that approximately 500 subjects are randomized (400 with active AS and 100 with nr-axSpA) to evaluate the efficacy and safety of intravenous secukinumab in this subject population. |
| Key Inclusion criteria | 1. Subject must be able to understand and communicate with the investigator, comply with the requirements of the study, and must give written, signed and dated informed consent before any study assessment is performed<br>2. Male and non-pregnant, non-lactating female patients ≥18 years of age<br>3. Diagnosis of axSpA according to ASAS criteria<br>a. Inflammatory back pain for at least 6 months<br>b. Onset before 45 years of age<br>4. For subjects with AS: Diagnosis of moderate to severe AS with prior documented radiologic evidence (x-ray or radiologist's report) fulfilling the Modified New York criteria for AS |

|  |  |
|---|---|
|  | 5. For subjects with nr-axSpA:<br>X-ray of SIJ negative (centrally read) for AS by Modified NY criteria AND<br>a. Sacroiliitis on MRI (centrally read) with ≥1 SpA feature OR HLA-B-27 positive with ≥2 SpA features AND<br>b. Objective signs of inflammation at screening, evident by either MRI with SIJ inflammation (centrally read) AND/OR hsCRP > ULN (as defined by the central lab)<br>6. Active axial SpA assessed by BASDAI ≥4 cm (0-10 cm) at Baseline<br>7. Spinal pain as measured by BASDAI question #2 ≥4 cm (0-10 cm) at Baseline<br>8. Total back pain as measured by VAS ≥40 mm (0-100 mm) at Baseline<br>9. Subjects should have had inadequate response or failure to respond to at least 2 NSAIDs at an approved dose for a minimum of 4 weeks in total and a minimum of 2 weeks for each NSAID prior to randomization, or less than 4 weeks if therapy had to be withdrawn due to intolerance, toxicity or contraindications<br>10. Subjects who are regularly taking NSAIDs (including COX-1 or COX-2 inhibitors) as part of their AS or nr-axSpA therapy are required to be on a stable dose for at least 2 weeks before randomization<br>11. Subjects who are intolerant or have been inadequate responders to a TNF inhibitor (not more than one) will be allowed to enter into the study (not more than 20% per group). They must have experienced an inadequate response to previous or current treatment at an approved dose for at least 3 months prior to randomization, or have been intolerant to at least one administration of an anti-TNF agent. These subjects will undergo an appropriate wash-out period prior to randomization, if required<br>a. 4 weeks for Enbrel ® (etanercept)—with a terminal half-life of 102 ± 30 hours<br>b. 8 weeks for Remicade ® (infliximab)—with a terminal half-life of 8.0-9.5 days<br>c. 10 weeks for Humira ® (adalimumab)—with a terminal half-life of 10-20 days (average 2 weeks)<br>d. 10 weeks for Simponi ® (golimumab)—with a terminal half-life of 11-14 days<br>e. 10 weeks for Cimzia ® (certolizumab)—with a terminal half-life of 14 days<br>12. Subjects taking methotrexate (MTX) (≤25 mg/week) or sulfasalazine (≤3 g/day) are allowed to continue their medication and must have taken it for at least 3 months and have to be on a stable dose for at least 4 weeks prior to randomization. Subjects on MTX must be on folic acid supplementation before randomization<br>13. Subjects who are on a conventional DMARD other than MTX or sulfasalazine must discontinue the DMARD 4 weeks prior to randomization, except for leflunomide, which must be be discontinued 8 weeks prior to randomization, unless a cholestyramine washout has been performed<br>14. Subjects taking systemic corticosteroids must be on a stable dose of <10 mg/day prednisone or equivalent for at least 2 weeks before randomization |
| Key Exclusion criteria | Subjects meeting any of the following criteria are not eligible for inclusion in this study<br>1. Subjects with total ankylosis of the spine<br>2. Chest x-ray or MRI with evidence of ongoing infectious or malignant process obtained within 3 months of screening and evaluated by a qualified physician<br>3. Subjects taking moderate and high potency opioid analgesics (e.g. methadone, hydromorphone, morphine)<br>4. Presence of significant medical problems which at investigator's discretion, will prevent the subject from participating in the study, including but not limited to the following: Subjects with severely reduced kidney function (estimated glomerular filtration rate (eGFR) <29 ml/min/1.73 m$^2$), history of renal trauma, glomerulonephritis, or patients with one kidney only, or a serum creatinine level exceeding 1.5 mg/dl (132.6 μmol/L)<br>5. Any therapy by intra-articular injections (e.g. corticosteroid) within 4 weeks before Randomization<br>6. Underlying conditions (including, but not limited to metabolic, hematologic, renal, hepatic, pulmonary, neurologic, endocrine, cardiac, infectious or gastrointestinal) which in the opinion of the investigator significantly immunocompromises the subject and/or places the subject at unacceptable risk for receiving an immunomodulatory therapy<br>7. Any medical or psychiatric condition which, in the Investigator's opinion, would preclude the participant from adhering to the protocol or completing the study per protocol<br>8. Active systemic infections during the last two weeks (exception: common cold) prior to randomization or any infection that reoccurs on a regular basis<br>9. History of ongoing, chronic or recurrent infectious disease or evidence of tuberculosis infection as defined by either a positive purified protein derivative (PPD) skin test (the size of induration will be measured after 48-72 hours, and a positive result is defined as an induration of ≥5 mm or according to local practice/guidelines) or a positive QuantiFERON TB-Gold test Subjects with a positive test may participate in the study if further work up (according to local practice/guidelines) establishes conclusively that the subject has no evidence of active tuberculosis. If presence of latent tuberculosis is established, then treatment according to local country guidelines must have been initiated<br>10. Past medical history of infection with HIV or hepatitis B prior to randomization or active infection or on treatment for Hepatitis C at randomization<br>11. History of lymphoproliferative disease or any known malignancy, or history of malignancy of any organ system treated or untreated within the past 5 years, regardless of whether there is evidence of local recurrence or metastases (except for skin Bowen's disease, or basal cell carcinoma or actinic keratoses that have been treated with no evidence of recurrence in the past 12 weeks; carcinoma in situ of the cervix or non-invasive malignant colon polyps that have been removed) |

| | |
|---|---|
| | 12. Inability or unwillingness to undergo repeated venipuncture (e.g., because of poor tolerability or lack of access to veins)
13. Pregnant or nursing (lactating) women, where pregnancy is defined as the state of a female after conception and until the termination of gestation, confirmed by a positive hCG laboratory test
14. Screening total WBC count <3,000/μl, or platelets <100,000/μl or neutrophils <1,500/μl or hemoglobin <8.5 g/dl (85 g/L)
15. History of clinically significant liver disease or liver injury indicated by abnormal liver function tests, such as SGOT (AST), SGPT (ALT), alkaline phosphatase and serum bilirubin. The investigator should be guided by the following criteria:
Any single parameter may not exceed 2 × the upper limit of normal (ULN). A single parameter elevated up to and including 2 × ULN should be re-checked once more as soon as possible, and in all cases, at least prior to randomization, to rule-out laboratory error.
If the total bilirubin concentration is increased above 2 × ULN, total bilirubin should be differentiated into the direct and indirect reacting bilirubin. In any case, serum bilirubin should not exceed the value of 1.6 mg/dL (27 μmol/L)
16. Significant medical problems or diseases, including but not limited to the following: uncontrolled hypertension (≥160/95 mmHg), congestive heart failure (New York Heart Association status of class III or IV), uncontrolled diabetes, or very poor functional status precluding ability to perform self-care
17. Women of child-bearing potential, defined as all women physiologically capable of becoming pregnant, unless they are using effective methods of contraception during the entire study or longer if required by locally approved prescribing information (e.g., 20 weeks in EU)
18. Active ongoing inflammatory diseases other than axSpA that might confound the evaluation of the benefits of secukinumab therapy, including inflammatory bowel disease or uveitis
19. Current severe progressive or uncontrolled disease which in the judgment of the clinical investigator renders the subject unsuitable for the trial
20. Use of other investigational drugs at the time of enrollment, or within 5 half-lives of enrollment, or within 4 weeks until the expected pharmacodynamic effect has returned to baseline, whichever is longer; or longer if required by local regulations
21. Previous exposure to secukinumab (AIN457) or any other biologic drug directly targeting IL-17 or the IL-17 receptor
22. Previous treatment with any cell-depleting therapies including but not limited to anti-CD20 or investigational agents (e.g., CAMPATH, anti-CD4, anti-CD5, anti-CD3, anti-CD19) |
| Study treatment | At baseline, subjects with active AS and nr-axSpA will be randomized to one of the two treatment groups:
Group 1: approximately 200 AS subjects and 50 nr-axSpA subjects; These subjects will receive secukinumab 6 mg/kg i.v. at randomization (Baseline (BSL) visit), followed by the administration of secukinumab 3 mg/kg i.v. every four weeks starting at Week 4 through Week 48 (exposure through week 52).
Group 2: approximately 200 AS subjects and 50 nr-axSpA subjects; These subjects will receive i.v. placebo at randomization (BSL visit), Weeks 4, 8, and 12 , followed by the administration of secukinumab 3 mg/kg i.v. at Week 16 and every four weeks through Week 48 (exposure through week 52). |
| Efficacy assessments | Assessment of SpondyloArthritis International Society (ASAS) response criteria; ASAS40, ASAS20, ASAS 5/6 and ASAS partial remission
Bath Ankylosing Spondylitis Disease Activity Index (BASDAI)
Bath Ankylosing Spondylitis Disease Activity Index 50 (BASDAI 50)
Bath Ankylosing Spondylitis Functional Index (BASFI)
Patient's global assessment of disease activity (VAS)
Patient's assessment of back pain intensity (VAS)
Spinal mobility assessed by BASMI (Bath Ankylosing Spondylitis Metrology Index)
Medical Outcome Short Form Health Survey (SF-36) Version 2 (Acute Form)
Ankylosing Spondylitis Quality of Life (ASQoL)
High sensitivity C-Reactive Protein (hsCRP)
Erythrocyte Sedimentation rate (ESR)
Maastricht Ankylosing Spondylitis Enthesitis Score (MASES) and expanded Enthesitis sites
Ankylosing Spondylitis Disease Activity Score (ASDAS)-C-Reactive Protein (CRP) and ASDAS response categories
44-tender and swollen joint-count
Spondyloarthritis Research Consortium of Canada (SPARCC) index
Sleep improvement (actigraphy and sleep PROs) |
| Key safety assessments | Physical examination
Vital signs
Height and weight
QuantiFERON TB-Gold test or PPD skin test
Hepatitis and human immunodeficiency virus (HIV) screen
Laboratory evaluations (Hematology, clinical chemistry, lipid panel, cardiovascular Panel, urinalysis and pregnancy test)
Evaluation of AE/SAE's
Local tolerability (Injection site reactions)
Pregnancy and assessment of fertility
Tolerability of secukinumab
Immunogenicity |

| | |
|---|---|
| Other assessments | Quality of Life questionnaires/ Patient reported outcomes (PROs)<br>Trial Feedback Questionnaires<br>Cumulative NSAID intake<br>HLA-B27<br>Pharmacokinetics<br>Biomarkers/Pharmacogenetics<br>Activity/Mobility improvement<br>Sacroiliac Joint X-ray<br>Sacroiliac Joint MRI |
| Data analysis | The primary endpoint in the study is the proportion of subjects who achieve an ASAS40 response at Week 16. The statistical hypothesis for ASAS40 being tested is that there is no difference in the proportion of subjects fulfilling the ASAS40 criteria at Week 16 in the secukinumab i.v. regimen versus placebo.<br>Let $p_0$ denote the proportion of ASAS40 responders at Week 16 for placebo regimen and $p_1$ denote the proportion of ASAS40 responders at Week 16 for secukinumab i.v. regimen.<br>In statistical terms, $H_1:p_1= p_0$, $H_{A1}: p_1 \neq p_0$, i.e.,<br>$H_1$: secukinumab i.v. regimen is not different to placebo regimen with respect to ASAS40 response at Week 16<br>The primary endpoint of ASAS40 at Week 16 in the FAS will be evaluated using a logistic regression with treatment and randomization stratum (disease condition) as factors and weight as a covariate. Difference in marginal response proportions with p-value and respective 95% confidence interval will be estimated from the logistic regression model for the comparison of secukinumab i.v. regimen versus placebo.<br>The secondary endpoints include ASDAS-CRP major improvement, BASDAI, ASAS 5/6, BASFI, SF-36 PCS, ASQoL, hsCRP, ASAS20, ASDAS-CRP inactive disease, ASAS partial remission and PSQI at Week 16.<br>The binary secondary endpoints (e.g., ASAS 5/6, etc.) will be evaluated via a logistic regression with treatment and randomization stratum (disease condition) as factors and weight as a covariate.<br>The change from baseline in continuous secondary endpoints (e.g., BASDAI, etc.) will be evaluated using MMRM with treatment group, stratification factor (disease condition) and analysis visit as categorical factors, baseline measure and weight as continuous covariates, and treatment by analysis visit and baseline measure by analysis visit as interaction terms. An unstructured covariance structure will be assumed for the model.<br>Safety analyses will include summaries of AEs, laboratory measurements, and vital signs. |
| Key words | Active axSpA, Axial spondyloarthritis, non-radiographic-axSpA, nr-axSpA, ankylosing spondylitis, AS, inflammatory back pain, sacroiliitis, intravenous secukinumab |

What is claimed is:

1. A method of treating active psoriatic arthritis (PsA) or active axial spondyloarthritis (axSpA) comprising intravenously administering to a patient in need thereof a dose of about 6 mg/kg secukinumab, followed by intravenously administering a dose of about 2 mg/kg secukinumab every 4 weeks.

2. The method of claim 1, wherein the patient has active PsA.

3. The method of claim 2, wherein the patient is an American College of Rheumatology (ACR) 50 responder by week 16 of treatment.

4. The method of claim 2, wherein the patient is an ACR20 responder by week 16 of treatment.

5. The method of claim 2, wherein the patient achieves Psoriasis Area and Severity Index (PASI) 75 by week 16 of treatment.

6. The method of claim 2, wherein the patient achieves PASI90 by week 16 of treatment.

7. The method of claim 1, wherein the patient has active axSpA.

8. The method of claim 7, wherein the patient achieves Assessment of SpondyloArthritis International Society (ASAS) 40 by week 16 of treatment.

9. The method of claim 7, wherein the patient achieves ASAS 20 by week 16 of treatment.

10. The method of claim 7, wherein the active axSpA is active ankylosing spondylitis (AS).

11. The method of claim 10, wherein the patient achieves an Ankylosing Spondylitis Disease Activity Score (ASDAS)-C Reactive Protein (CRP) major improvement response by week 16 of treatment.

12. The method of claim 10, wherein the patient achieves an ASDAS-CRP inactive disease response by week 16 of treatment.

13. The method of claim 7, wherein the active axSpA in the patient is active non-radiographic axial spondyloarthritis (nr-axSpA).

14. The method of claim 13, wherein the patient achieves ASAS 40 by week 16 of treatment.

15. The method of claim 13, wherein the patient achieves ASAS 20 by week 16 of treatment.

16. The method of claim 13, wherein the patient achieves an ASDAS-CRP major improvement response by week 16 of treatment.

17. The method of claim 1, wherein secukinumab is supplied in a vial.

18. The method of claim 1, wherein secukinumab is supplied in a liquid composition comprising about 25 mg/mL secukinumab.

19. The method of claim 1, wherein secukinumab is supplied in a liquid composition comprising about 25 mg/mL secukinumab, 225 mM trehalose, about 0.02% polysorbate 80, about 5 mM L-methionine, and about 20 mM histidine buffer, pH about 5.8.

20. The method of claim 1, wherein secukinumab is administered to the patient with an infusion duration of about 30 minutes.

21. The method of claim 1, wherein the patient is further intravenously administered a dose of about 3 mg/kg secukinumab every 4 weeks.

22. A method of treating active psoriatic arthritis (PsA) or active axial spondyloarthritis (axSpA) comprising intravenously administering to a patient in need thereof a dose of about 2 mg/kg secukinumab every 4 weeks, wherein the patient has previously been intravenously administered a single loading dose of about 6 mg/kg secukinumab.

23. The method of claim 22, wherein the patient has active PsA.

24. The method of claim 23, wherein the patient achieves American College of Rheumatology (ACR) Criteria 50 by week 16 of treatment.

25. The method of claim 23, wherein the patient achieves ACR20 by week 16 of treatment.

26. The method of claim 23, wherein the patient achieves Psoriasis Area and Severity Index (PASI) 75 by week 16 of treatment.

27. The method of claim 23, wherein the patient achieves PASI90 by week 16 of treatment.

28. The method of claim 22, wherein the patient has active axSpA.

29. The method of claim 28, wherein the patient achieves Assessment of SpondyloArthritis International Society (ASAS) 40 by week 16 of treatment.

30. The method of claim 28, wherein the patient achieves ASAS 20 by week 16 of treatment.

31. The method of claim 28, wherein the active axSpA is active ankylosing spondylitis (AS).

32. The method of claim 31, wherein the patient achieves an Ankylosing Spondylitis Disease Activity Score (ASDAS)-C Reactive Protein (CRP) major improvement response by week 16 of treatment.

33. The method of claim 31, wherein the patient achieves an ASDAS-CRP inactive disease response by week 16 of treatment.

34. The method of claim 27, wherein the active axSpA in the patient is active non-radiographic axial spondyloarthritis (nr-axSpA).

35. The method of claim 34, wherein the patient achieves ASAS 40 by week 16 of treatment.

36. The method of claim 34, wherein the patient achieves ASAS 20 by week 16 of treatment.

37. The method of claim 34, wherein the patient achieves an ASDAS-CRP major improvement response by week 16 of treatment.

38. The method of claim 22, wherein secukinumab is supplied in a vial.

39. The method of claim 22, wherein secukinumab is supplied in a liquid composition comprising about 25 mg/mL secukinumab.

40. The method of claim 22, wherein secukinumab is supplied in a liquid composition comprising about 25 mg/mL secukinumab, 225 mM trehalose, about 0.02% polysorbate 80, about 5 mM L-methionine, and about 20 mM histidine buffer, pH about 5.8.

41. The method of claim 22, wherein secukinumab is administered to the patient with an infusion duration of about 30 minutes.

42. The method of claim 22, wherein the patient is intravenously administered a dose of about 3 mg/kg secukinumab every 4 weeks after the patient has been intravenously administered at least one dose of about 2 mg/kg secuinumab.

* * * * *